(12) United States Patent  
Elad et al.

(10) Patent No.: US 8,407,263 B2  
(45) Date of Patent: Mar. 26, 2013

(54) COLLABORATION PORTAL—COPO—A SCALEABLE METHOD, SYSTEM AND APPARATUS FOR PROVIDING COMPUTER-ACCESSIBLE BENEFITS TO COMMUNITIES OF USERS

(75) Inventors: Joseph B. Elad, Claymont, DE (US); Apperson Hunter Johnson, Wilmington, DE (US); Bin Yu, Wilmington, DE (US); Srikanth V. Kallurkar, Chadds Ford, PA (US); Jonathan Dale, Mountain View, CA (US)

(73) Assignee: Quantum Leap Research, Inc., Claymont, DE (US)

( * ) Notice: Subject to any disclaimer, the term of this patent is extended or adjusted under 35 U.S.C. 154(b) by 0 days.

(21) Appl. No.: 13/021,690

(22) Filed: Feb. 4, 2011

(65) Prior Publication Data

US 2012/0011170 A1     Jan. 12, 2012

(51) Int. Cl.  
*G06F 17/30* (2006.01)
(52) U.S. Cl. .................. 707/803; 707/728; 707/912
(58) Field of Classification Search .................. 707/803, 707/728  
See application file for complete search history.

(56) References Cited

U.S. PATENT DOCUMENTS

| | | | |
|---|---|---|---|
| 6,507,829 B1* | 1/2003 | Richards et al. | 706/45 |
| 7,493,333 B2* | 2/2009 | Hill et al. | 1/1 |
| 2005/0197783 A1* | 9/2005 | Kuchinsky et al. | 702/19 |
| 2006/0074980 A1* | 4/2006 | Sarkar | 707/104.1 |
| 2008/0091634 A1* | 4/2008 | Seeman | 706/59 |
| 2008/0263038 A1* | 10/2008 | Judge et al. | 707/6 |

\* cited by examiner

*Primary Examiner* — Robert Beausoliel, Jr.  
*Assistant Examiner* — Noosha Arjomandi  
(74) *Attorney, Agent, or Firm* — Gomez Int'l Patent Office, LLC

(57) ABSTRACT

The present invention, known as The Collaboration Portal (COPO), relates generally to the field of automated entity, data processing, system control, and data communications, and more specifically to an integrated method, system, and apparatus for providing computer-accessible benefits for communities of users. It provides a framework for provisioning computer-accessible benefits for communities of users, and can efficiently and robustly distribute the processing in behalf of those users over a decentralized network of computers. The field of the invention generally encompasses enabling appropriate and desired communication among communities of users and organizations, and providing information, goods, services, a works, opportunities, and connections among users and organizations.

22 Claims, 42 Drawing Sheets

COPO system behavior

FIG. 1 COPO system behavior
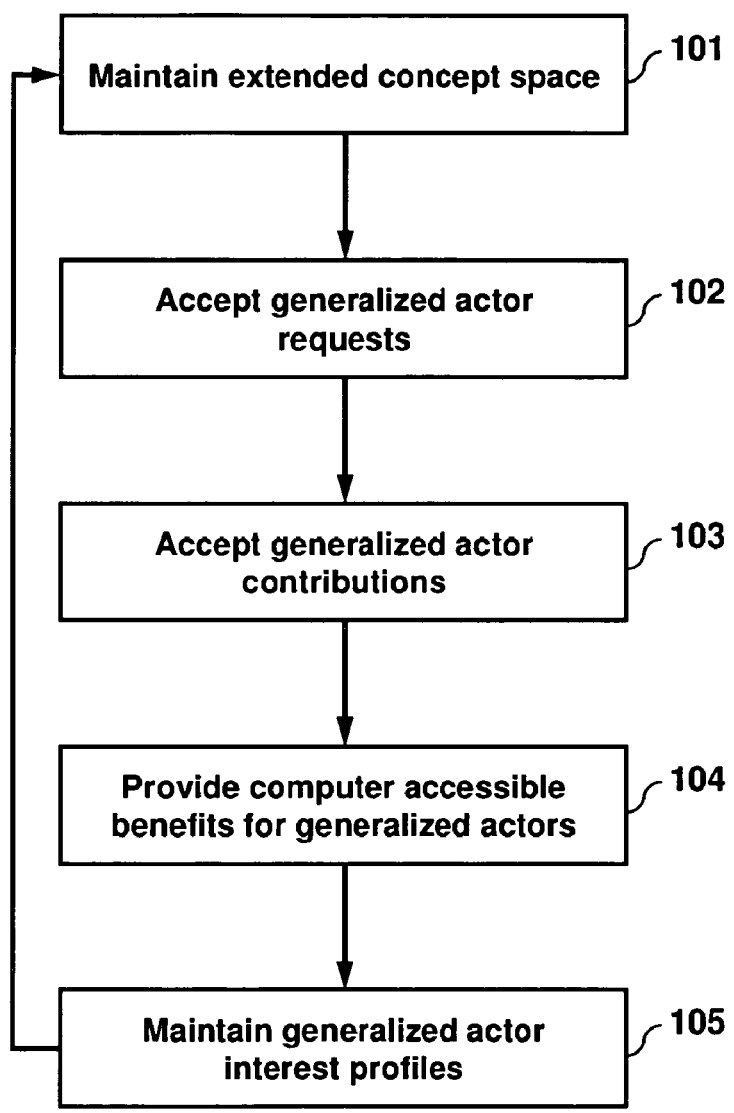

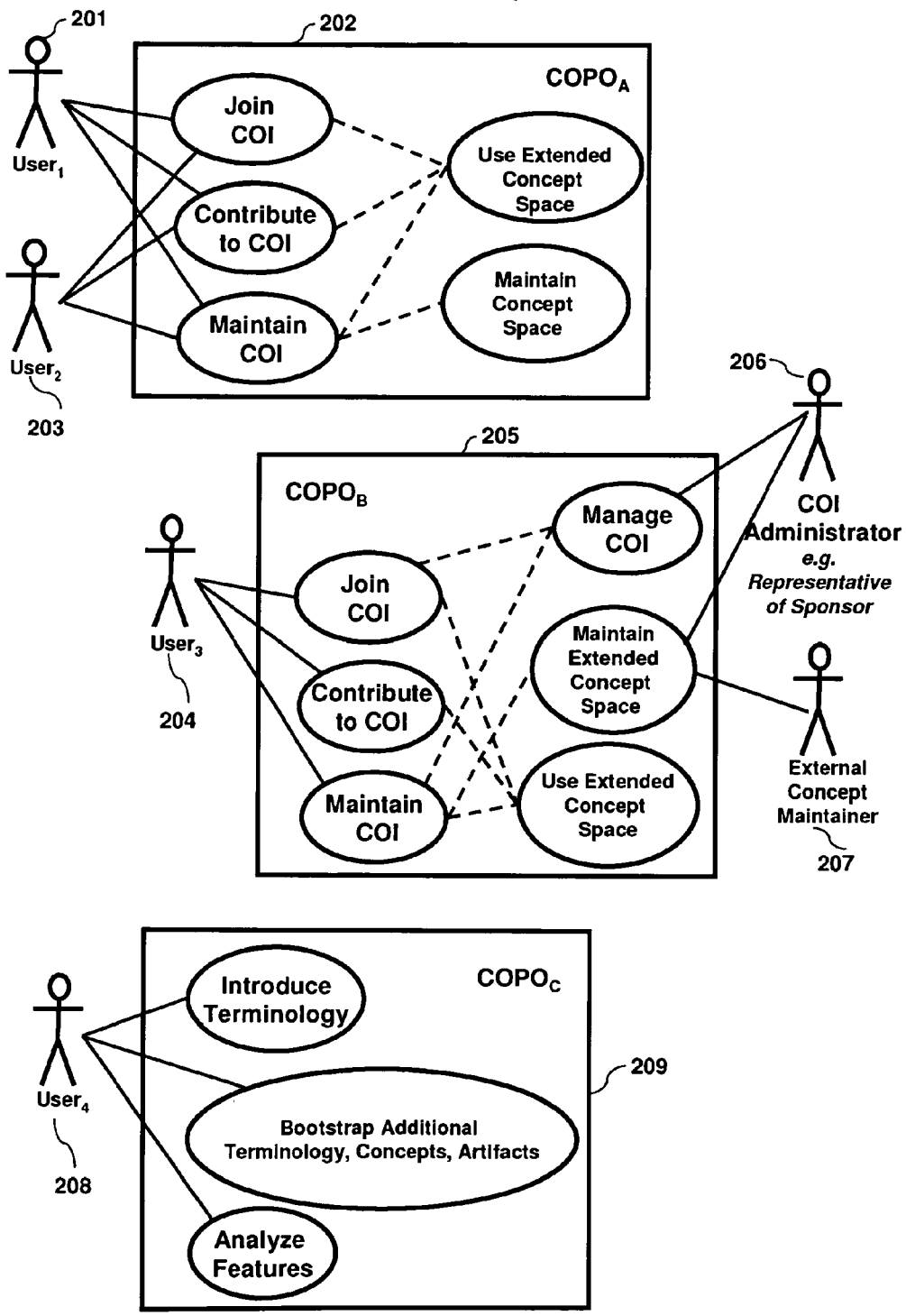

FIG. 3    Maintain concept space
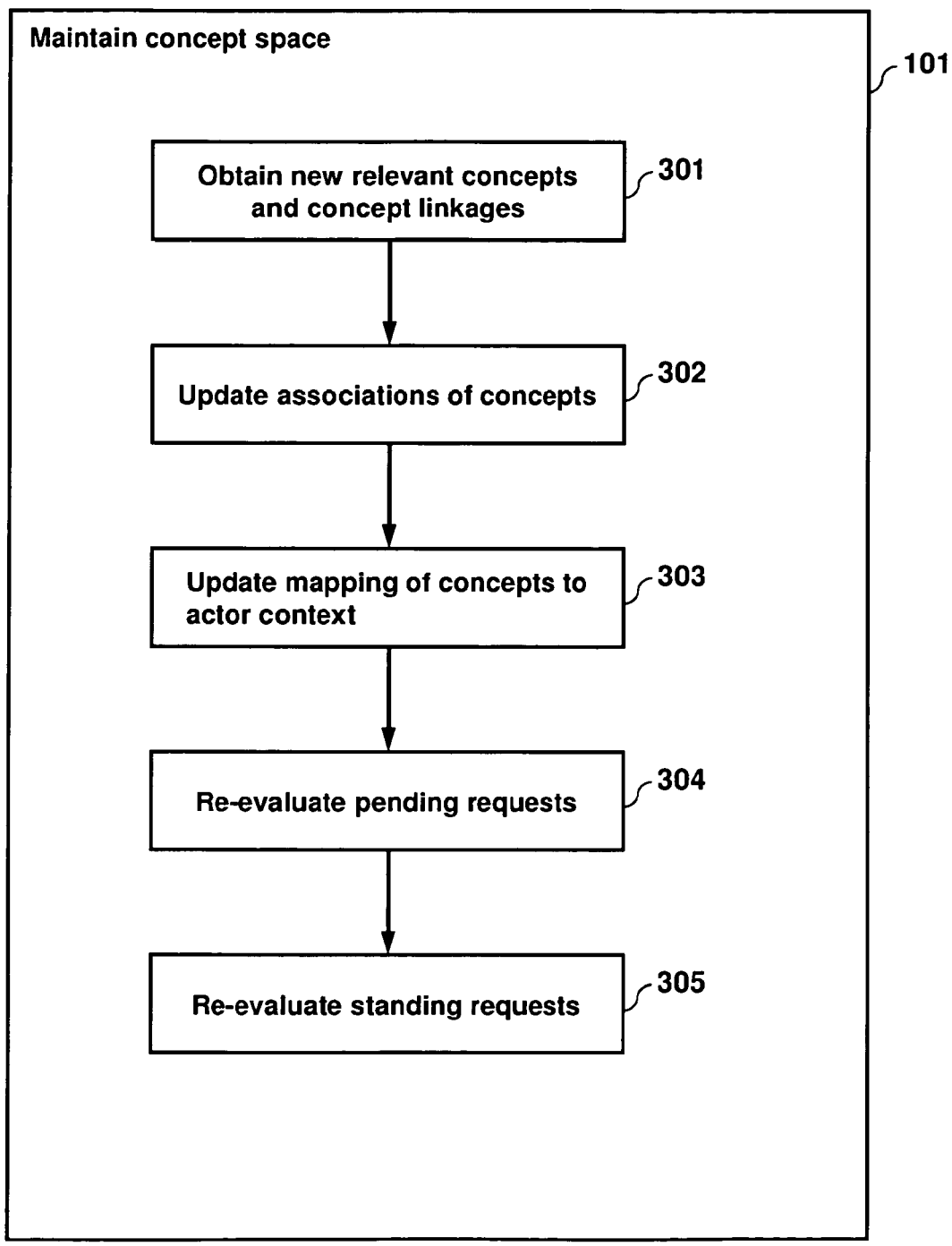

FIG. 4                      Handle actor requests
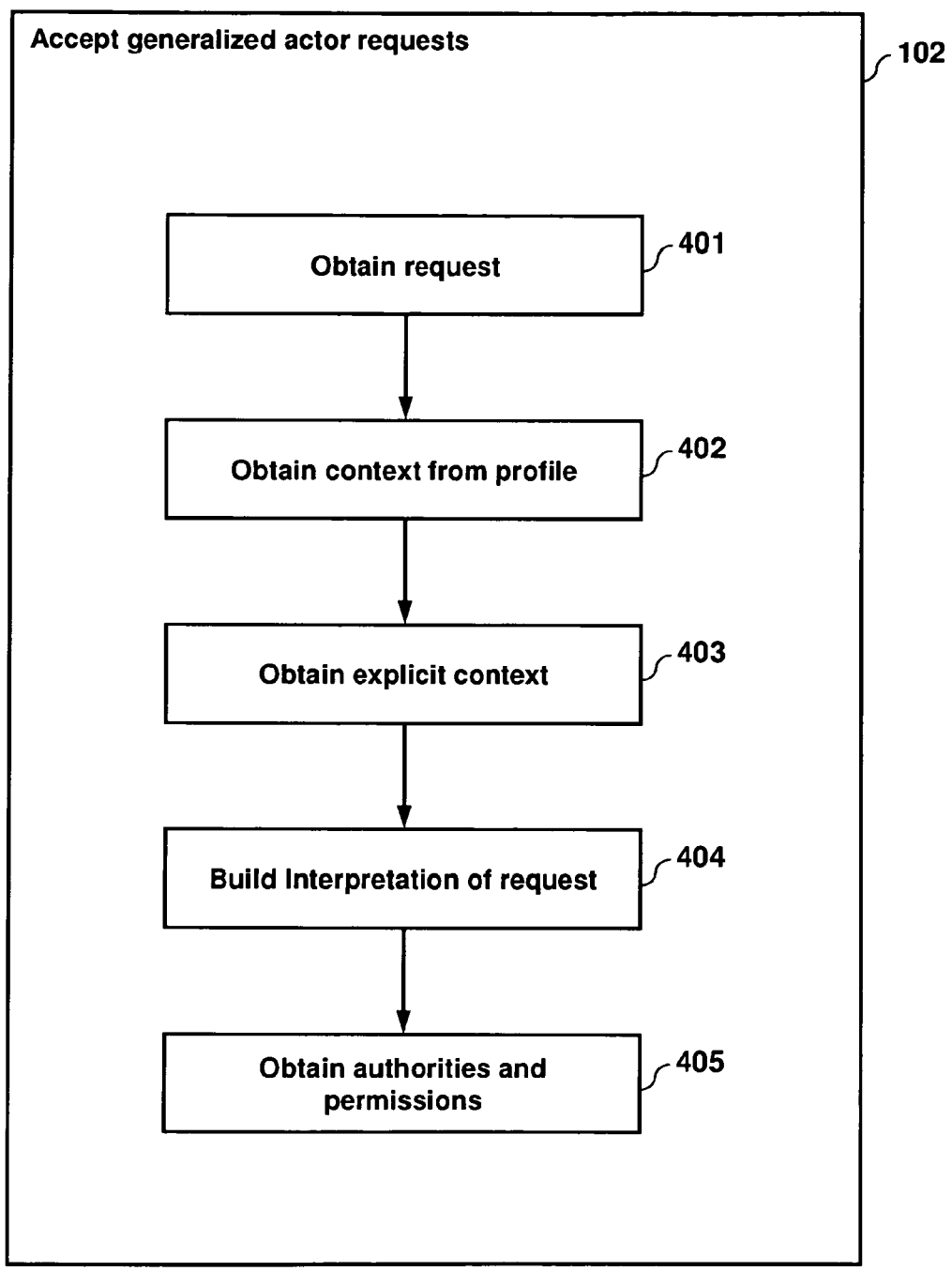

FIG. 5 — Accept actor contributions
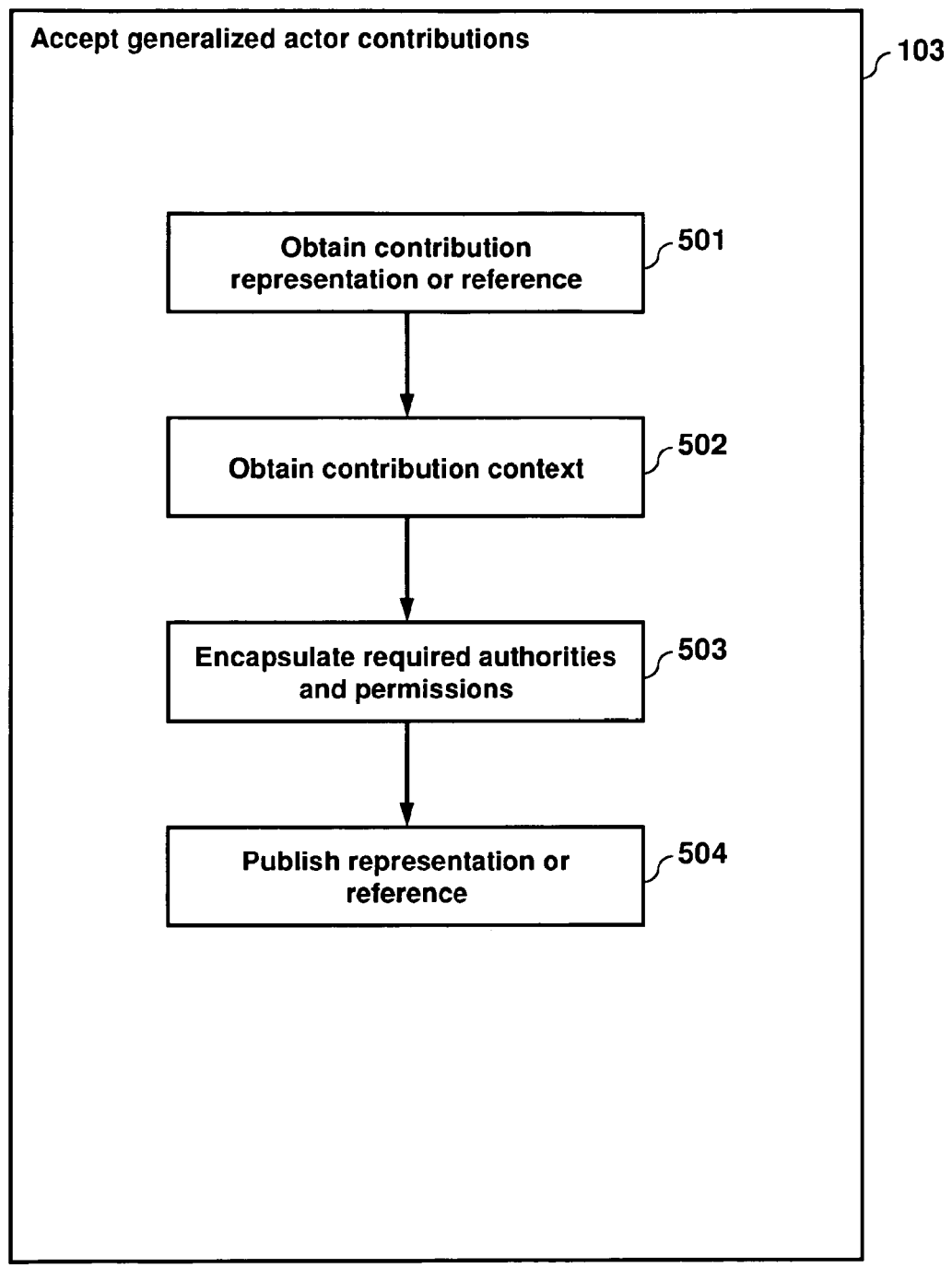

FIG. 6     Provide computer accessible benefits
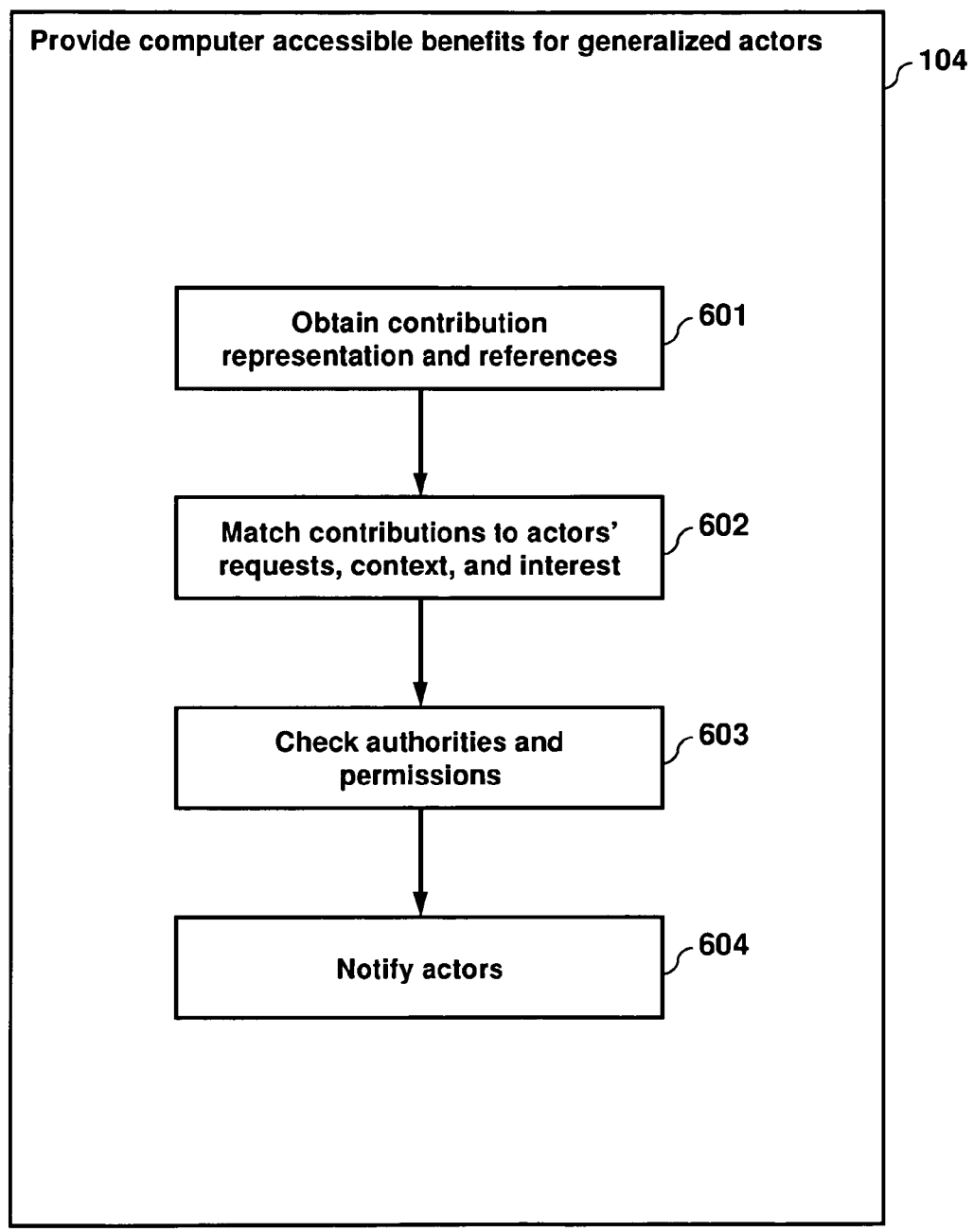

FIG. 7　　　　　　　　　Maintain actor profiles
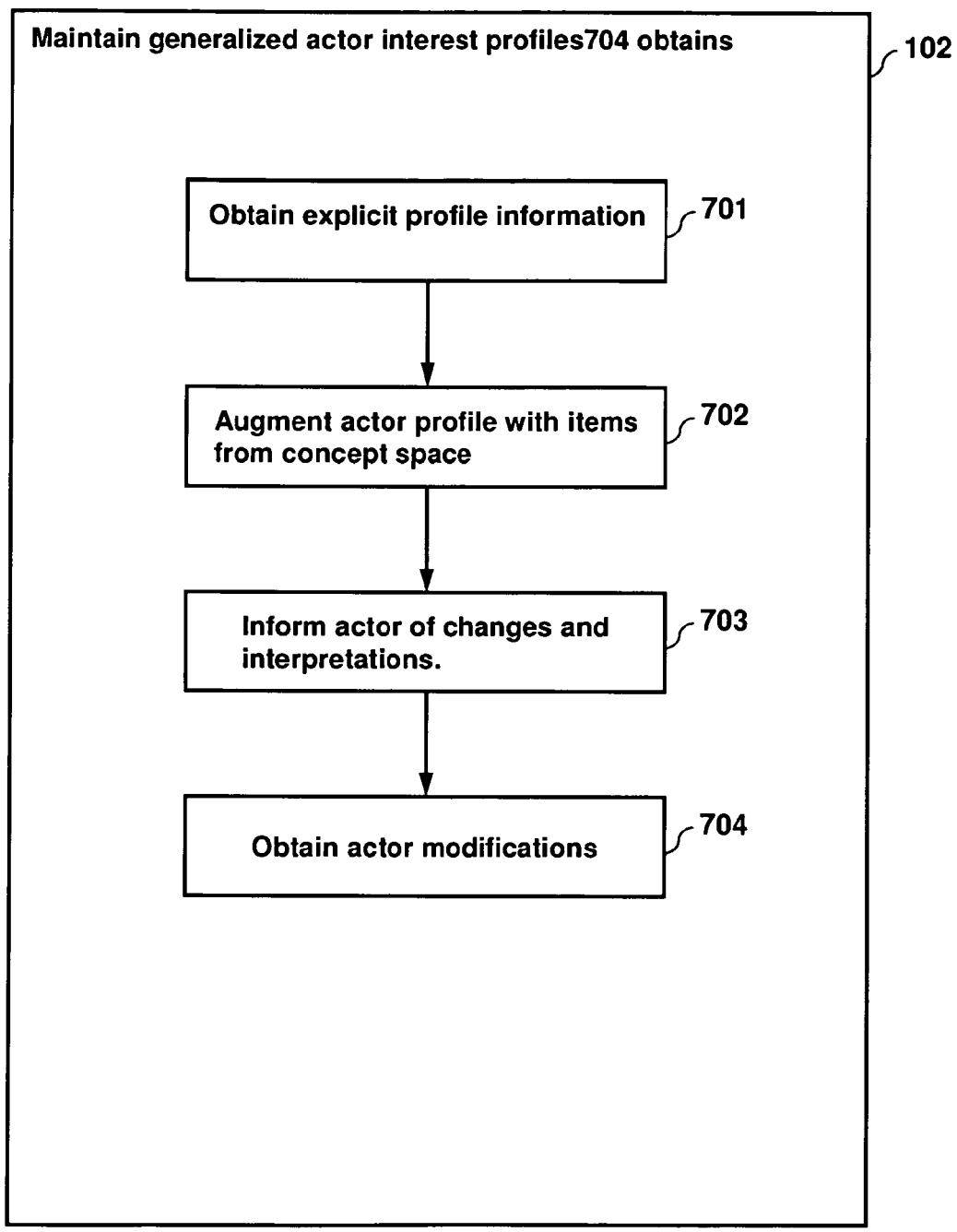

FIG. 8  Examples of two COPO configurations
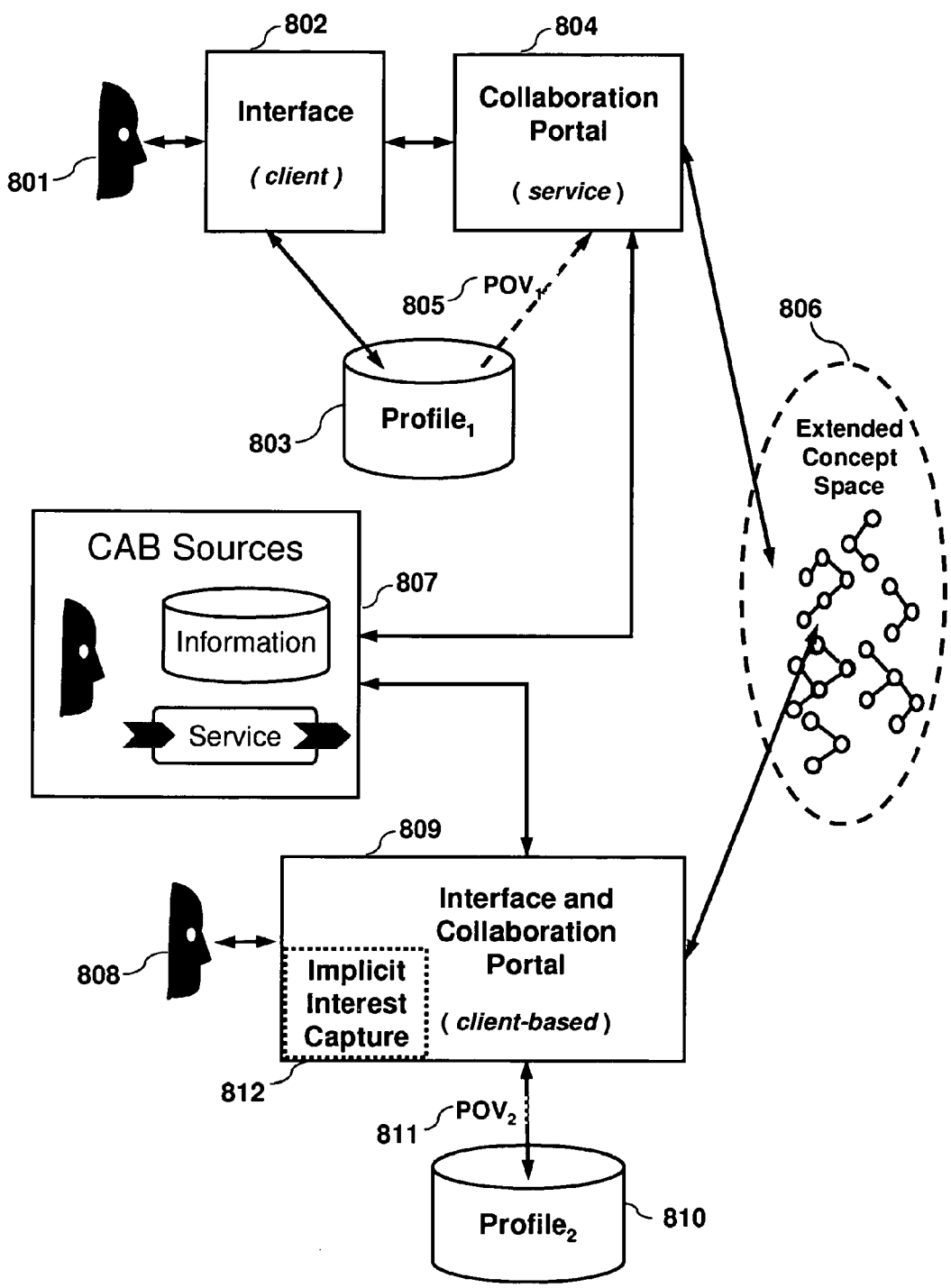

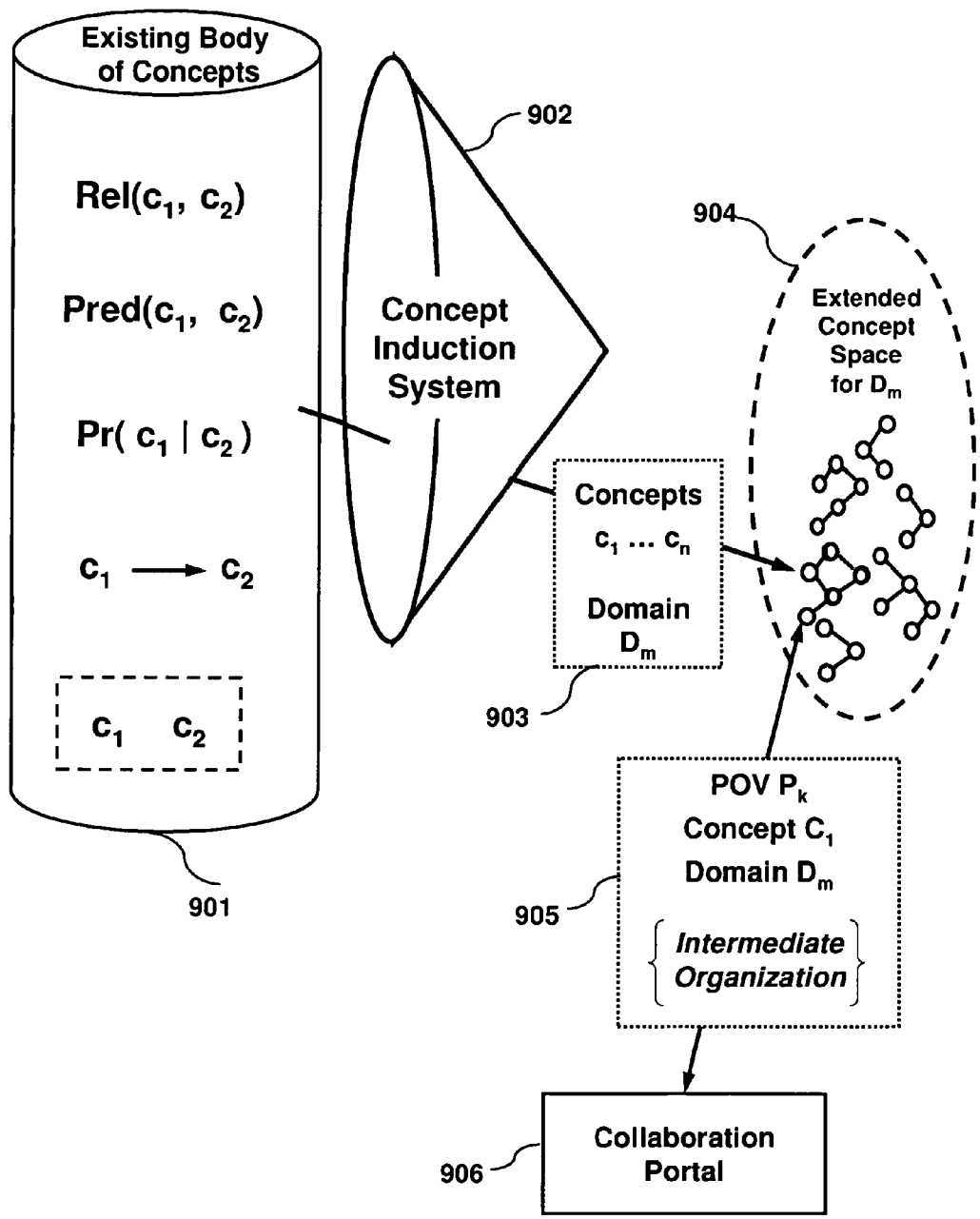
FIG. 9  Induction of concept organization

FIG. 10    Concept nodes induced from various representations
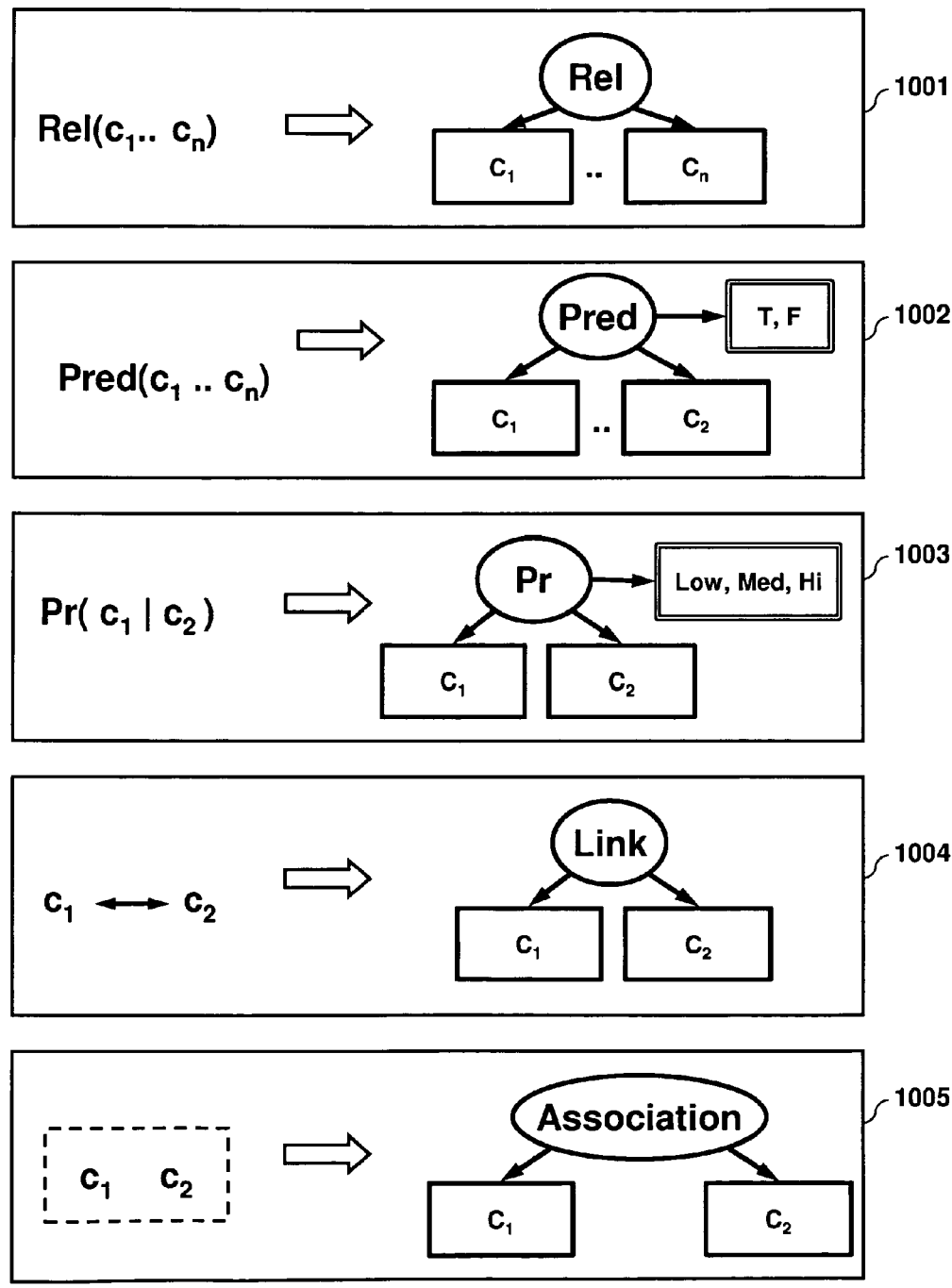

FIG. 11        Organization of concept spaces
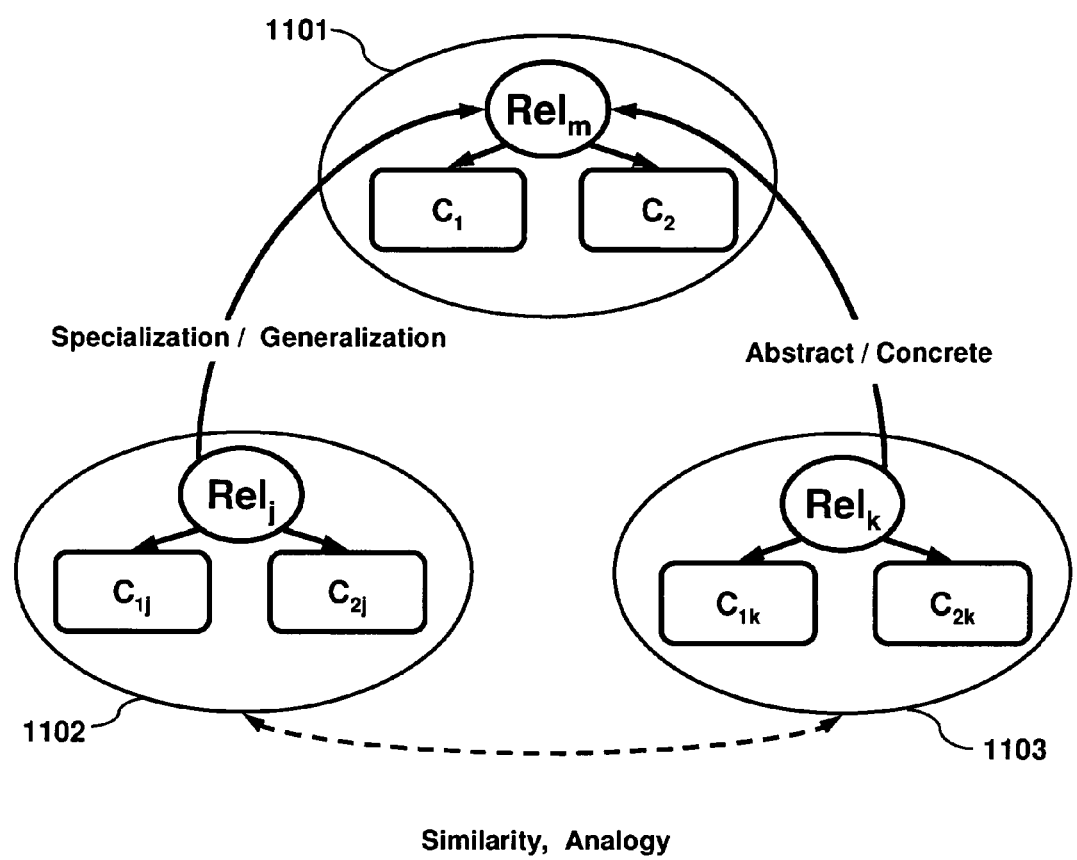
Similarity, Analogy

FIG. 12          Concept-centric view of relations
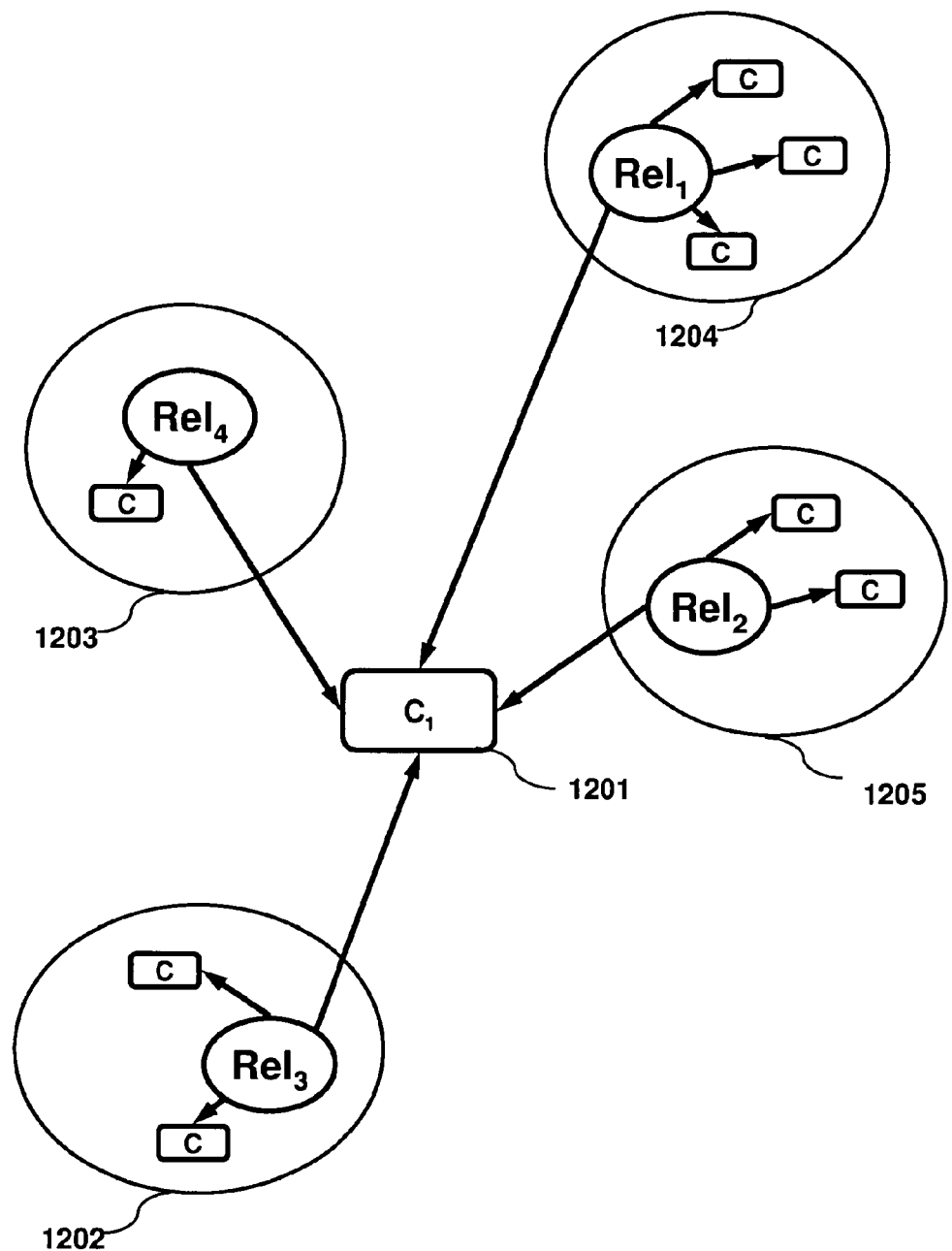

FIG. 13     Concept spaces with evolved organization
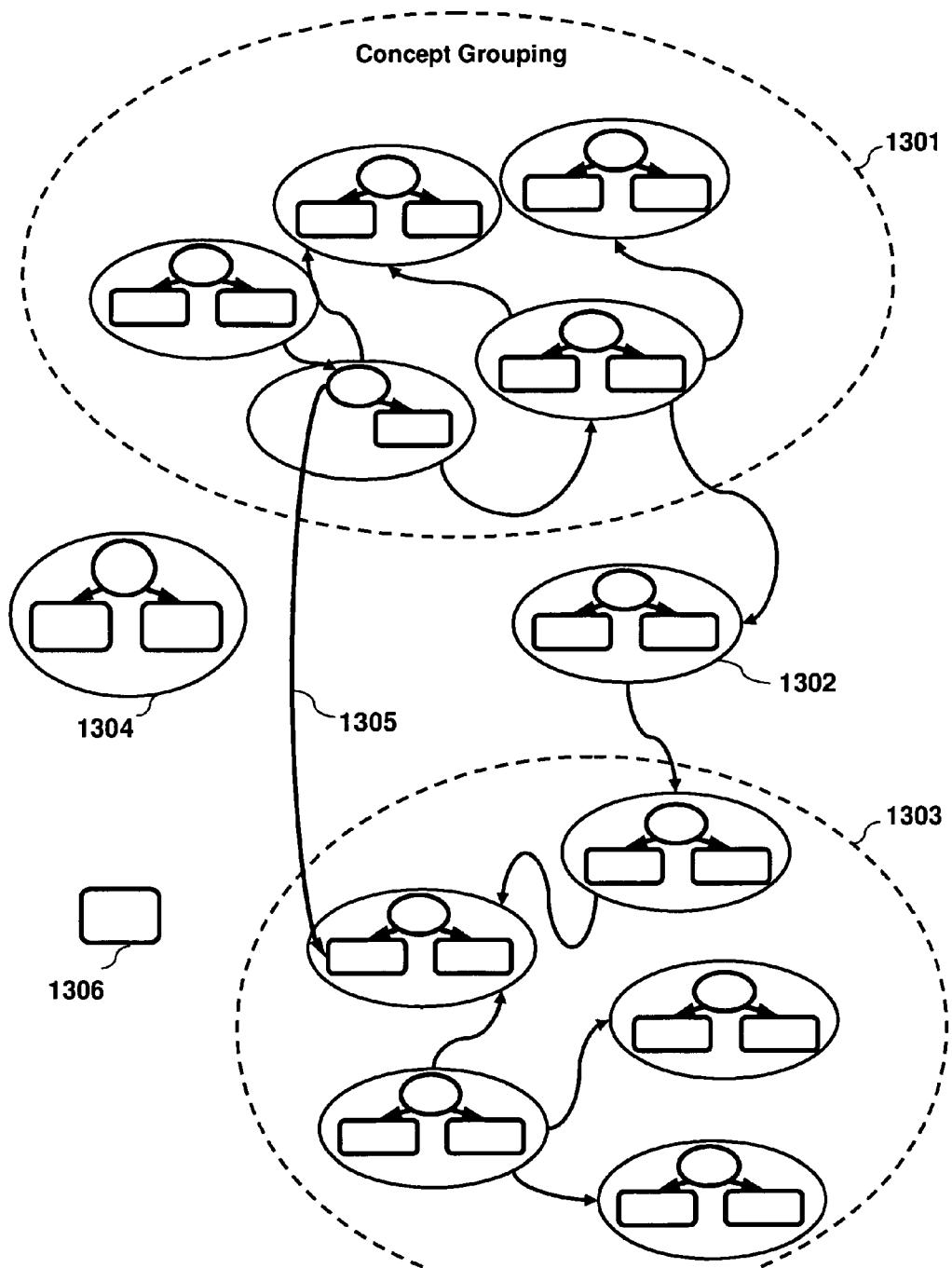

FIG. 14    Concept space releases and concept space differencing
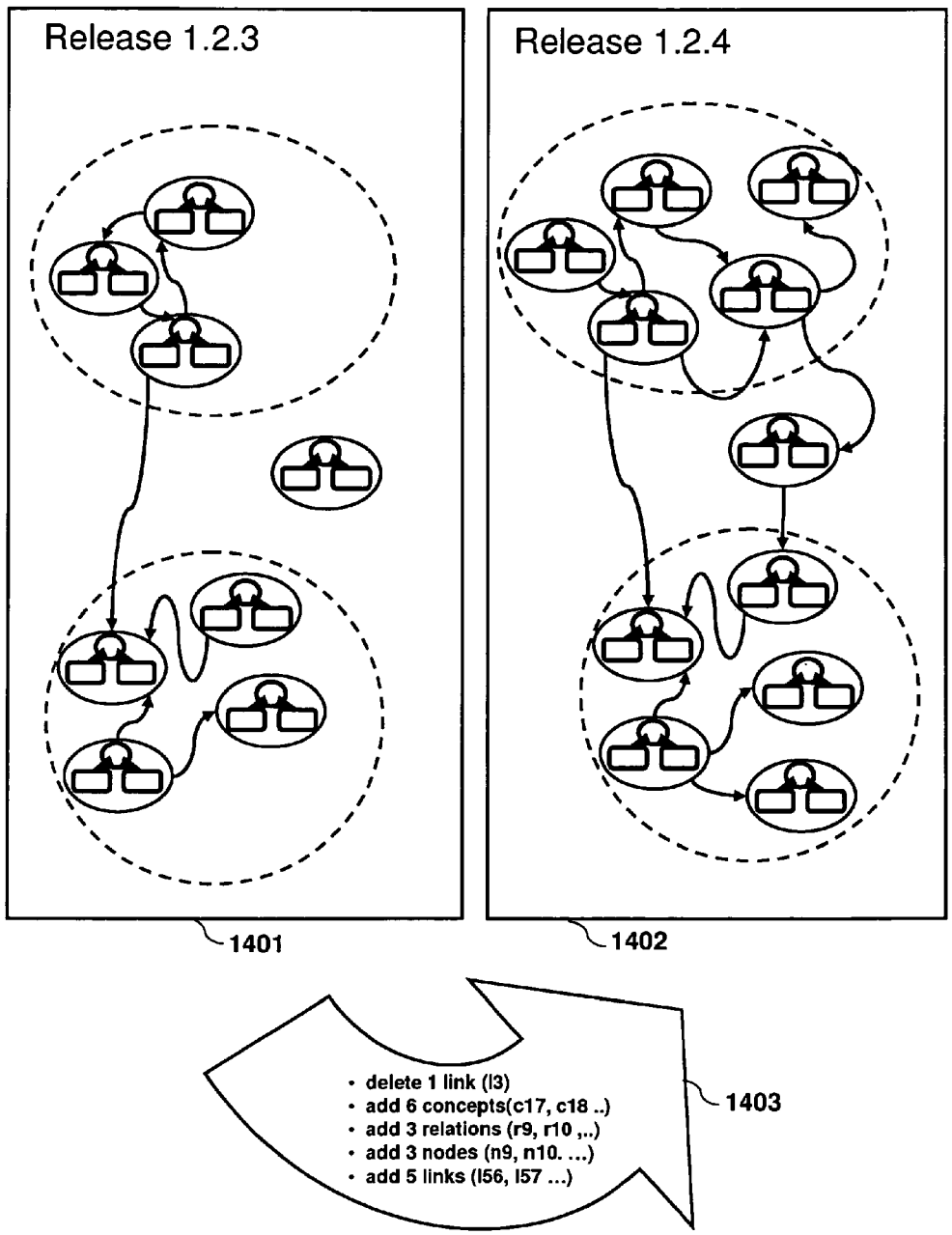

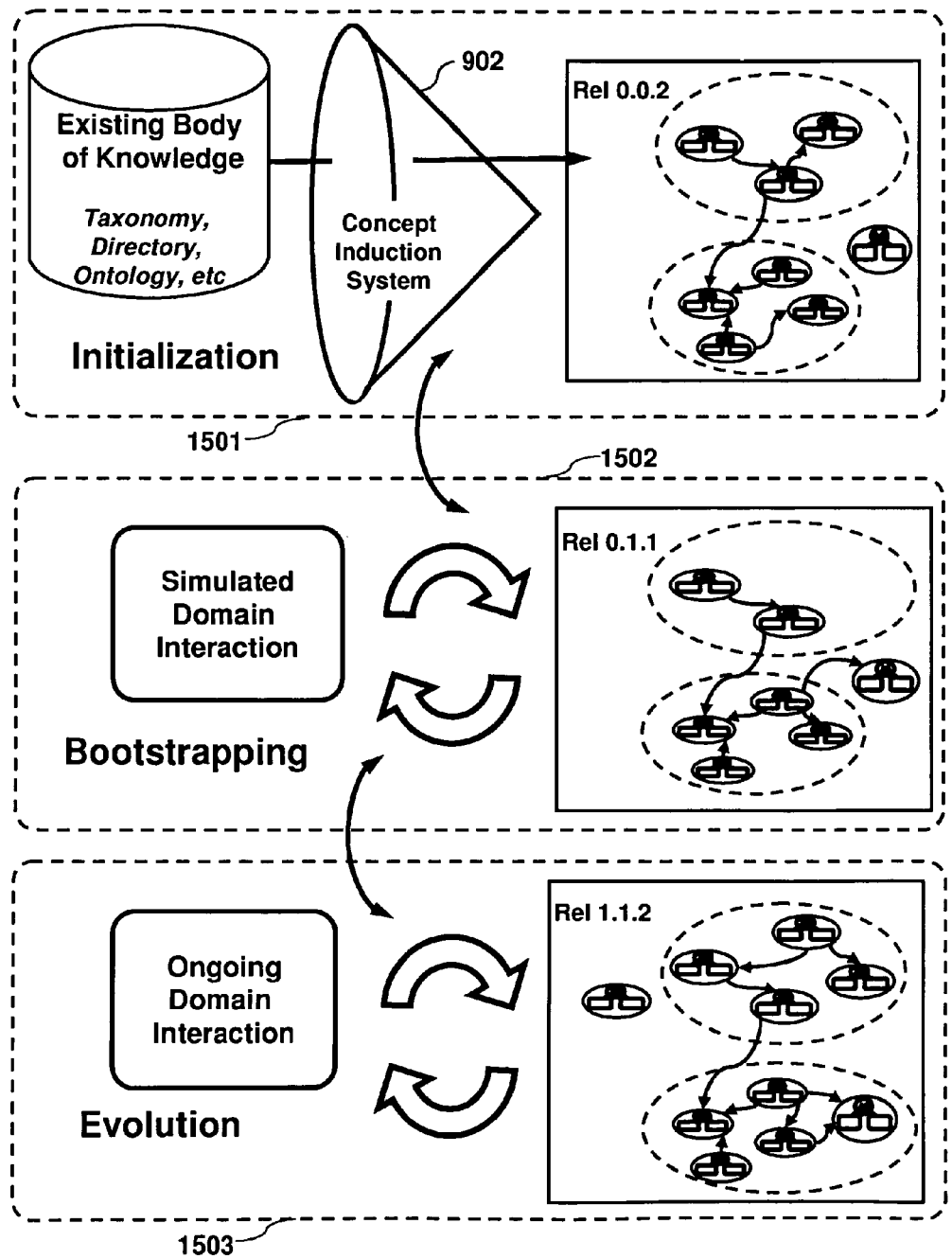
FIG. 15  Concept space initialization, bootstrapping, and evolution

FIG. 16  Decentralized provisioning of terms, concepts, virtual interest groups (VIGs), and Computer Accessible Benefits (CABs)
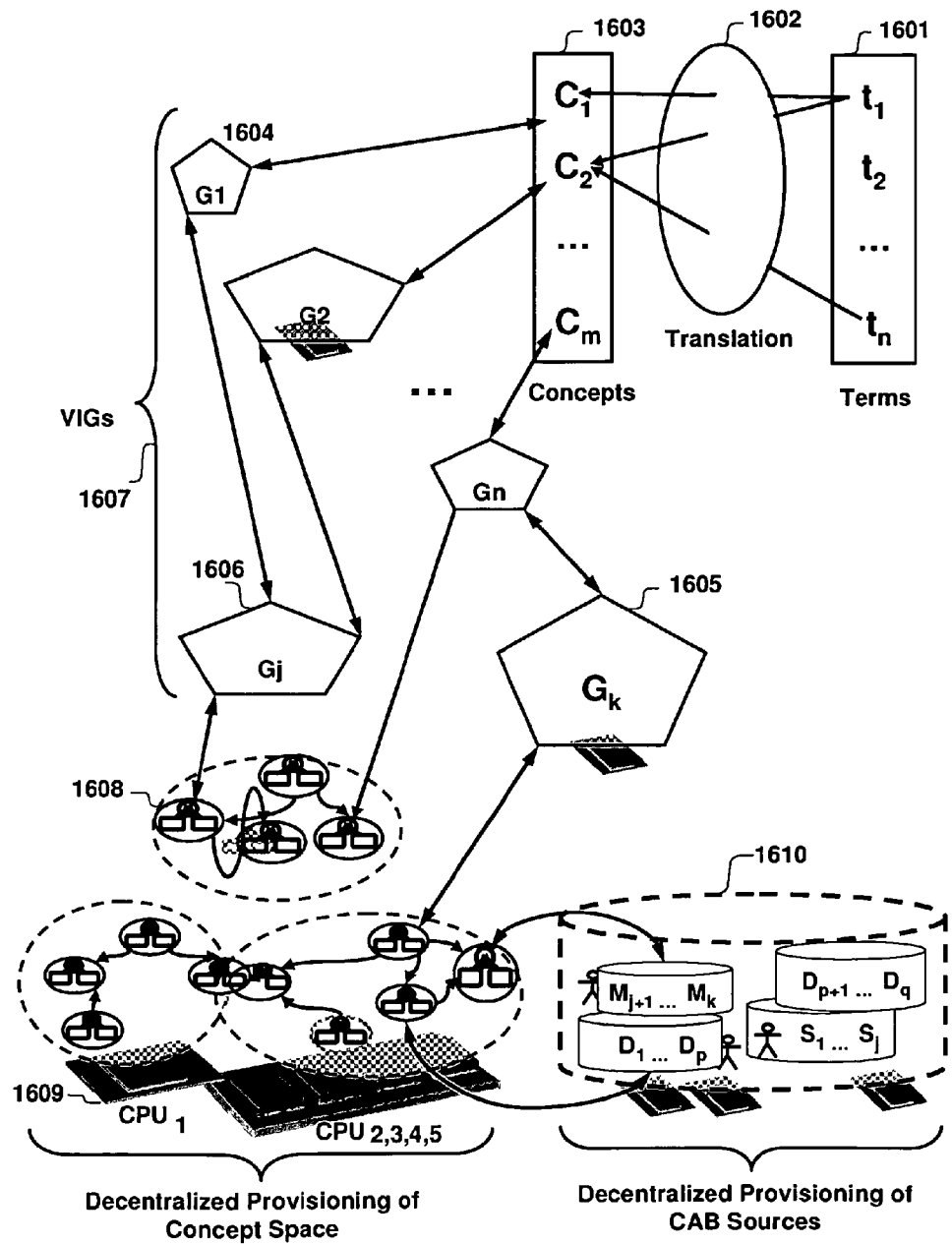

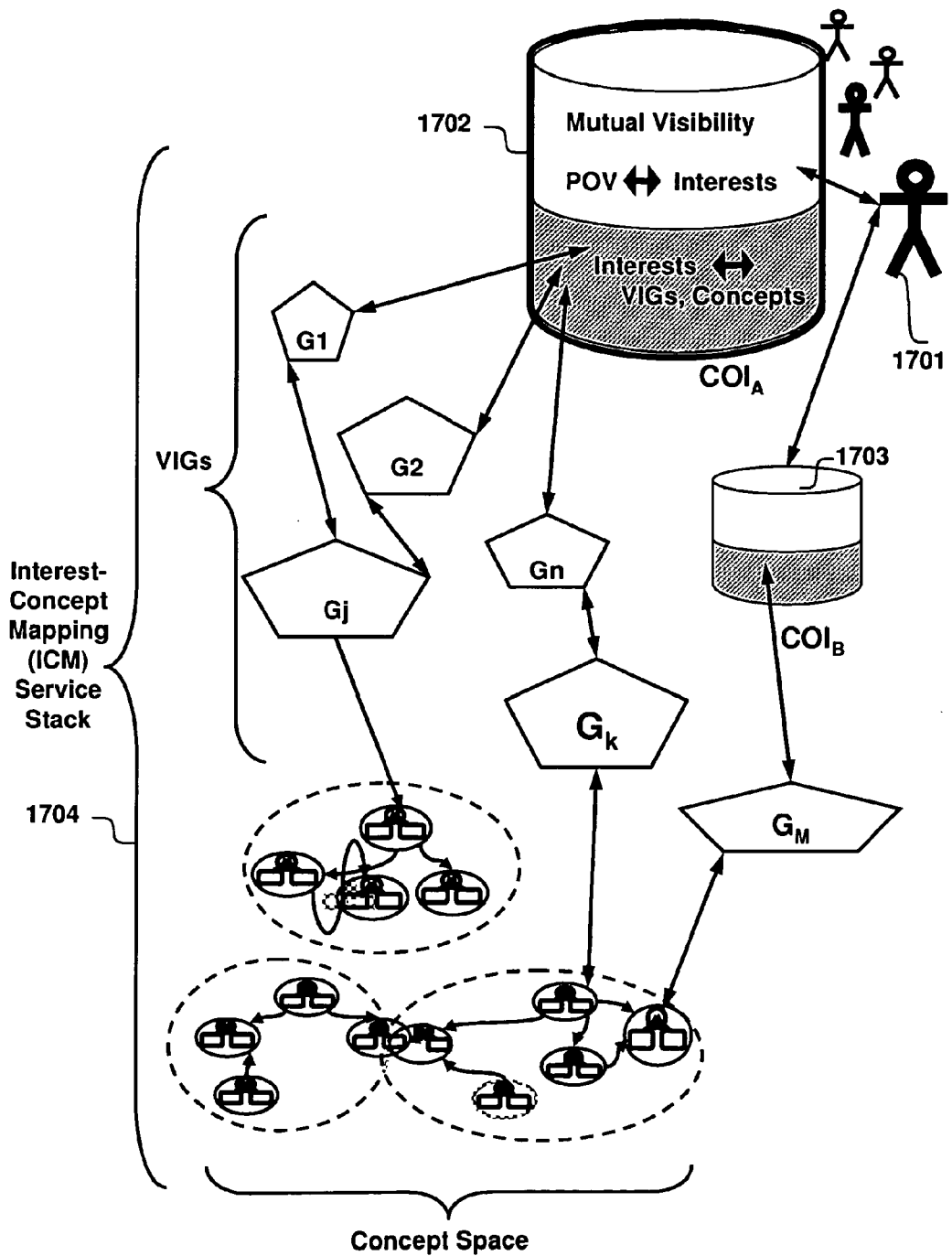
FIG. 17 Virtual interest groups (VIGs) supporting communities of interest (COIs)

FIG. 18    Hardware deployment of concept spaces, VIGs, and COIs
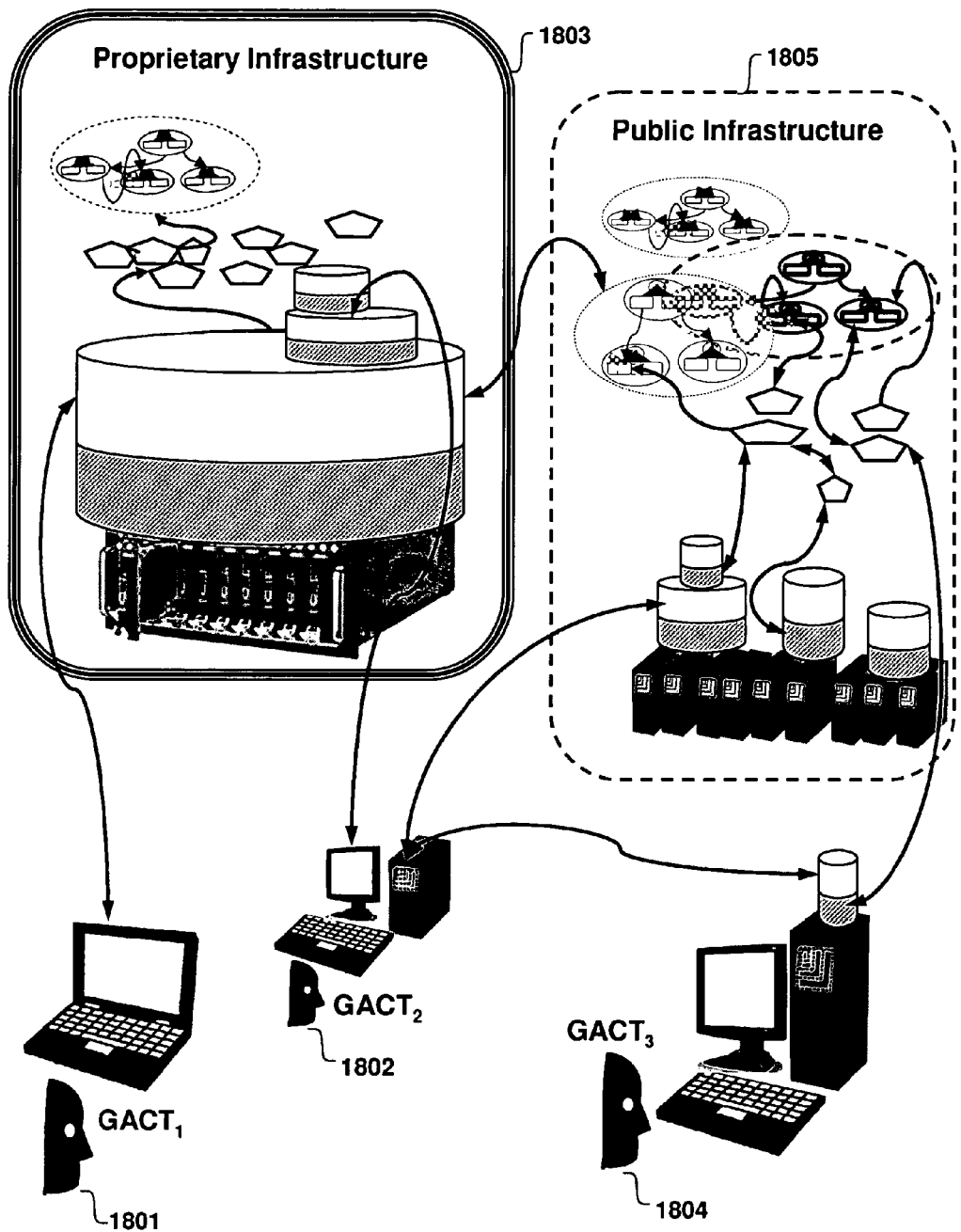

FIG. 19  Rational agent stack supporting composition, scalability and robustness
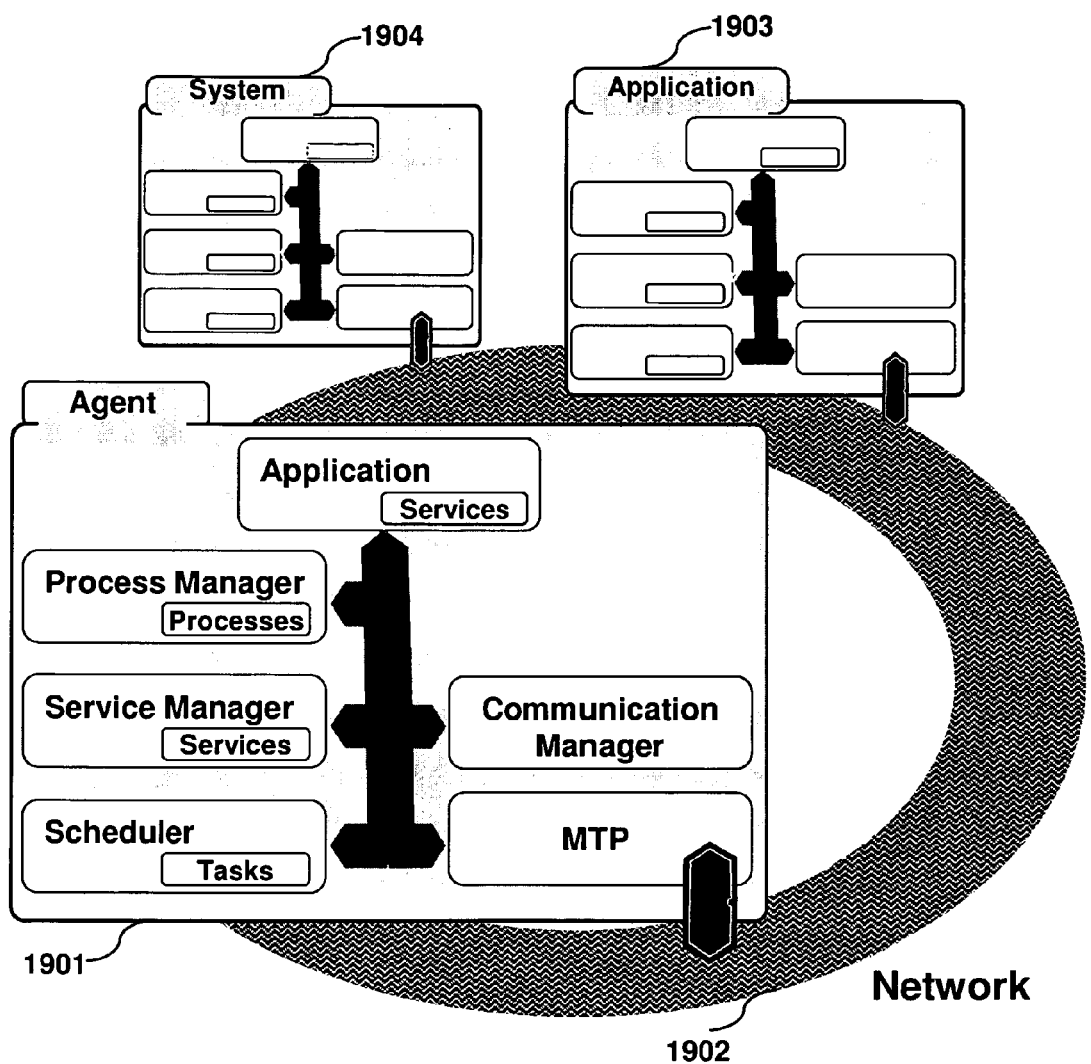

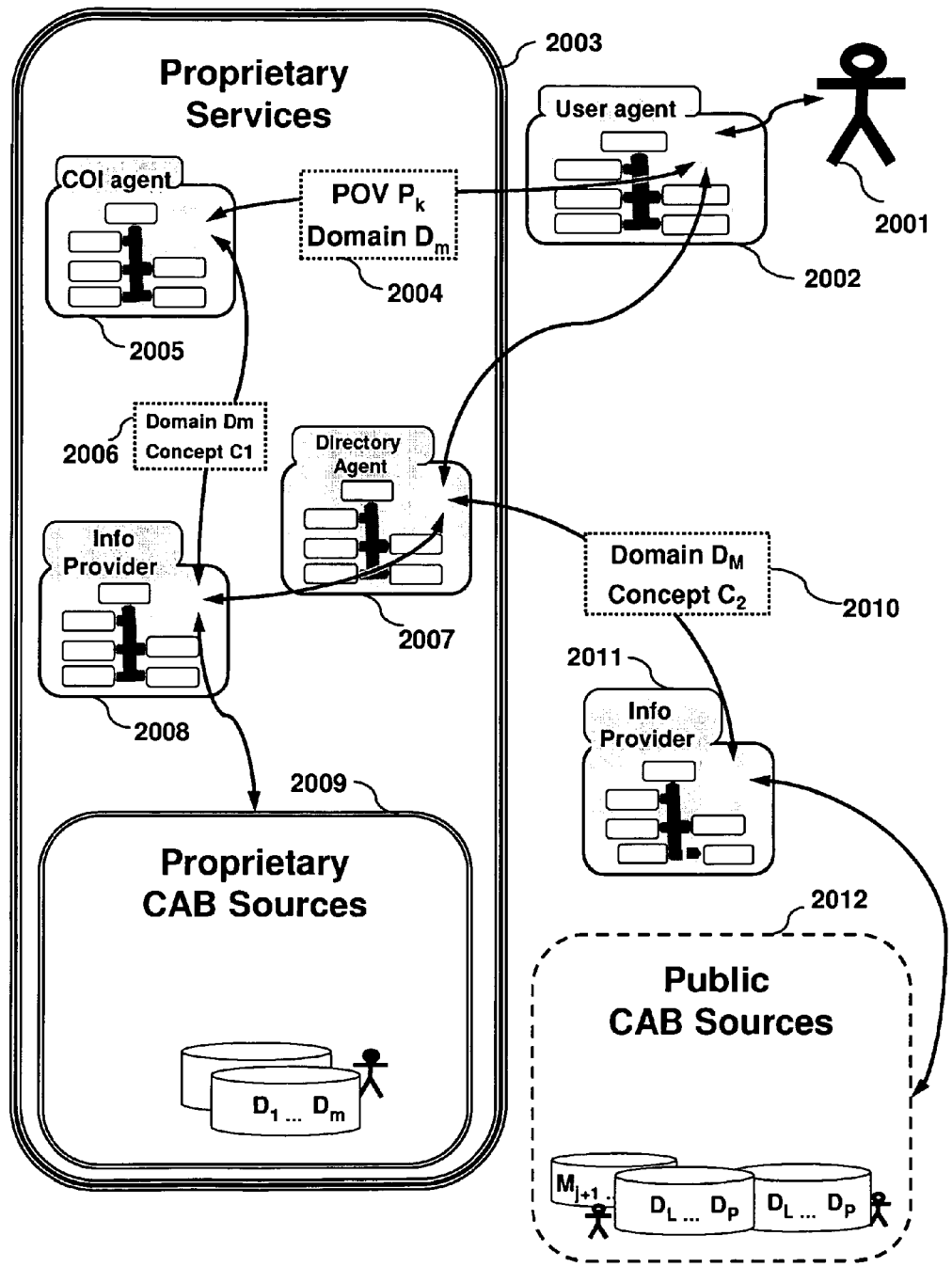
FIG. 20  Agent-based representation, intermediation

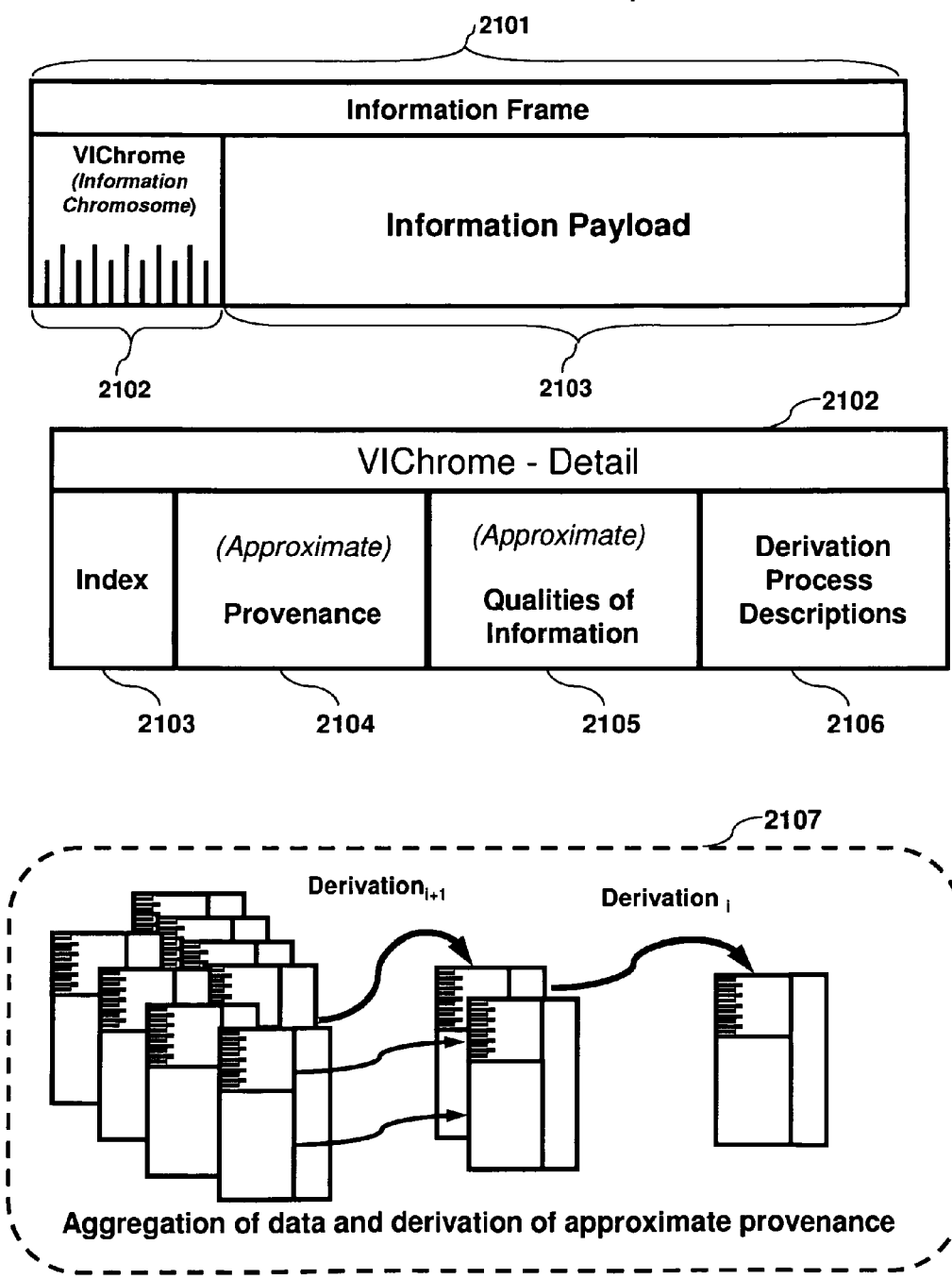
FIG. 21 VIChromes – information provenance

FIG. 22      VIChromes – provenance services
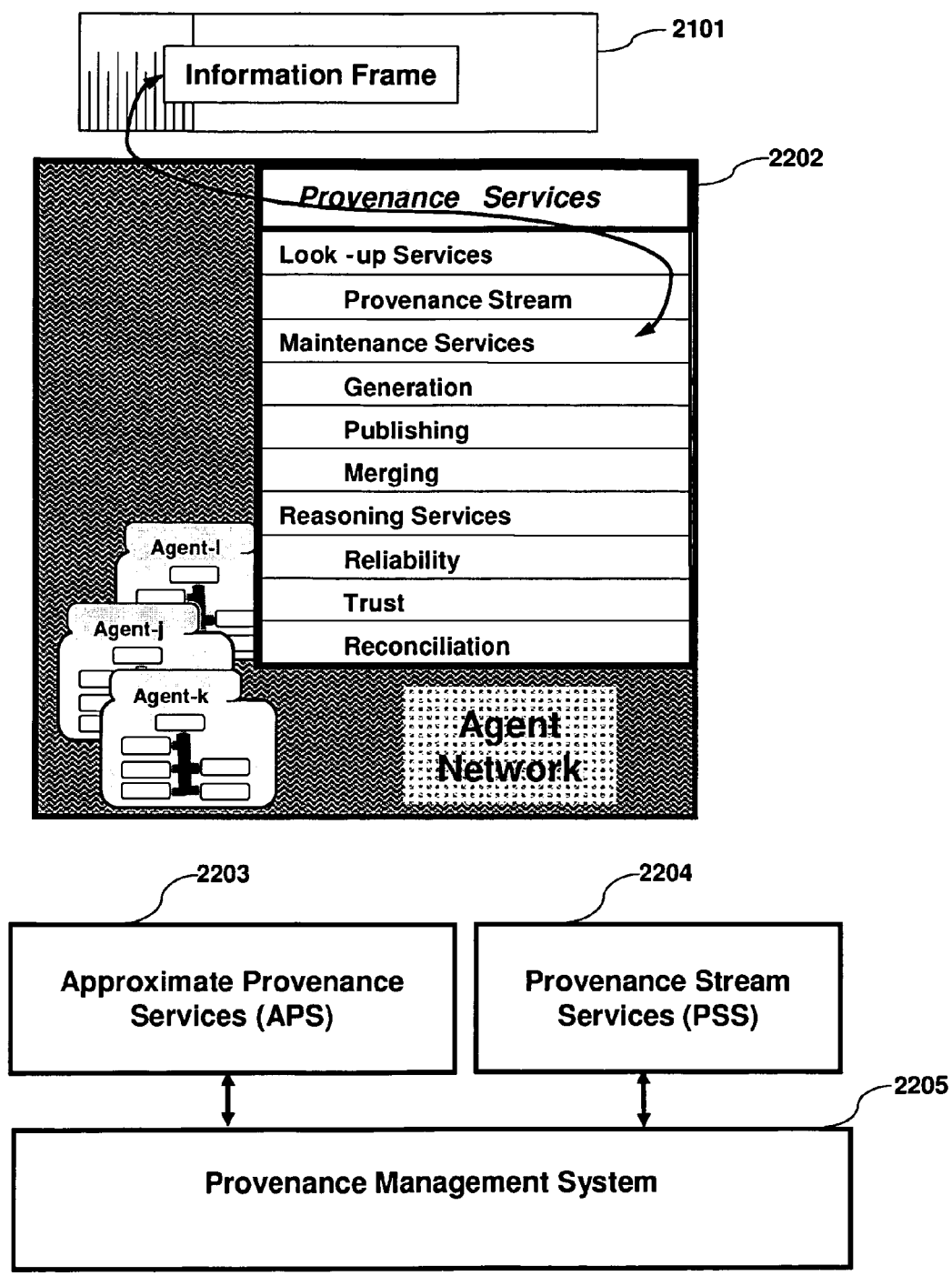

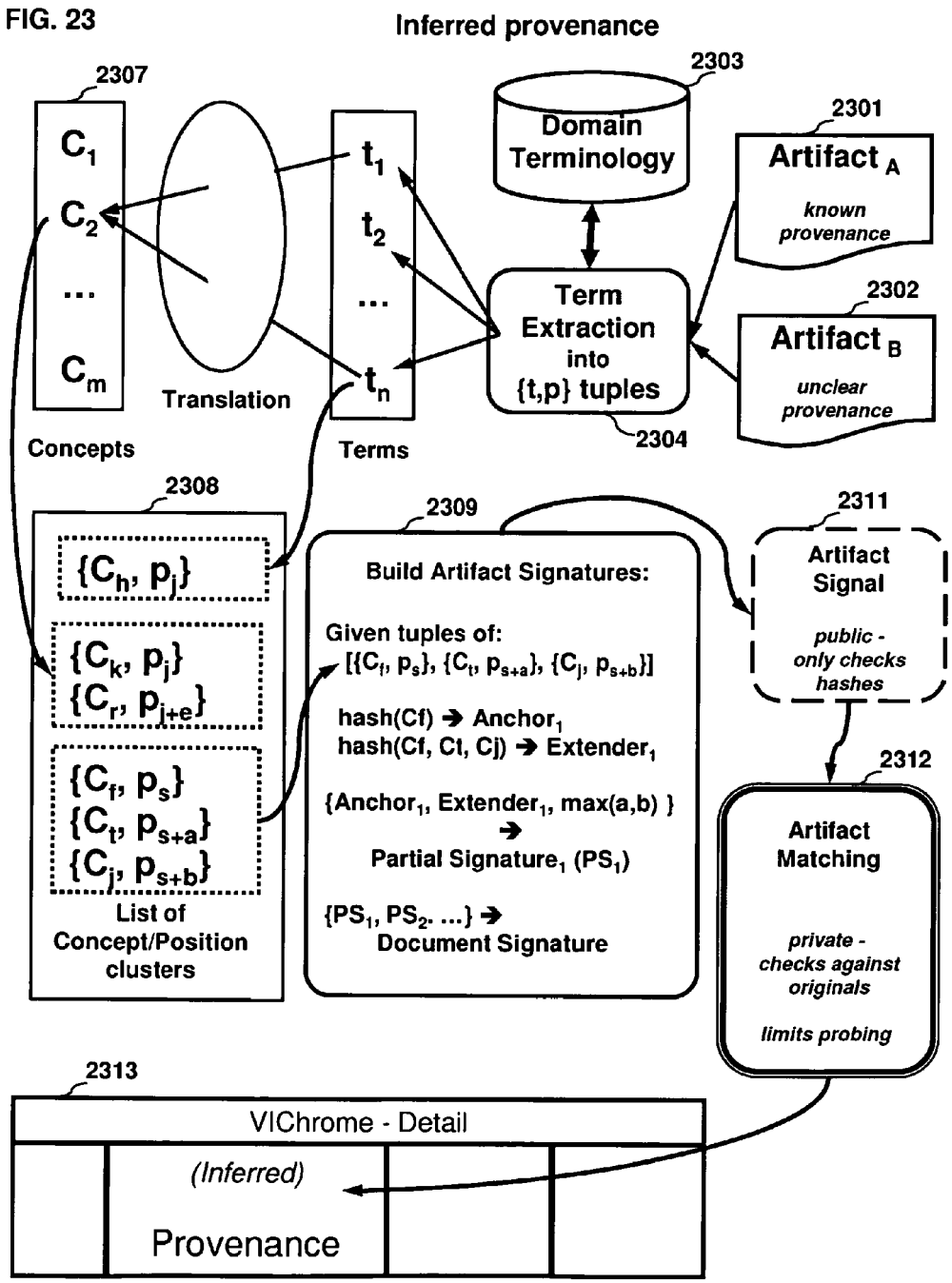

FIG. 24  Dempster Shafer Theory for information qualities

A Basic Probability Assignment (a BPA, denoted "$m$") maps each possible state of a frame of discernment to a value on the [0..1] interval. For a set of N possibilities, there are $2^N$ (the powerset of N) possible states, including the null set $\emptyset$.

Given a frame of discernment $\delta = \{T, \sim T\}$, and the powerset: $2^\delta = \{\emptyset, \{T\}, \{\sim T\}, \{T, \sim T\}\}$ For the function $m$:

$$m(2^\delta) \mapsto [0,1]$$
$$m(\emptyset) = 0$$
$$\sum_{X \subset \delta} m(X) = 1$$

— 2401

Belief is a function $Bel(X)$ that is the lower bound of the belief that X is true, while Plausibility $Pl(X)$ is the upper bound of how much it is believed to be true. Probability $Pr(X)$ lies somewhere between the two:

$$0 \leq Bel(X) \leq Pr(X) \leq Pl(X) \leq 1$$

2402 —

$$Bel(A) = \sum_{B|B \subset A} m(B)$$
$$Pl(A) = \sum_{B|B \cap A \neq \emptyset} m(B)$$
$$Pl(A) = 1 - Bel(\overline{A})$$

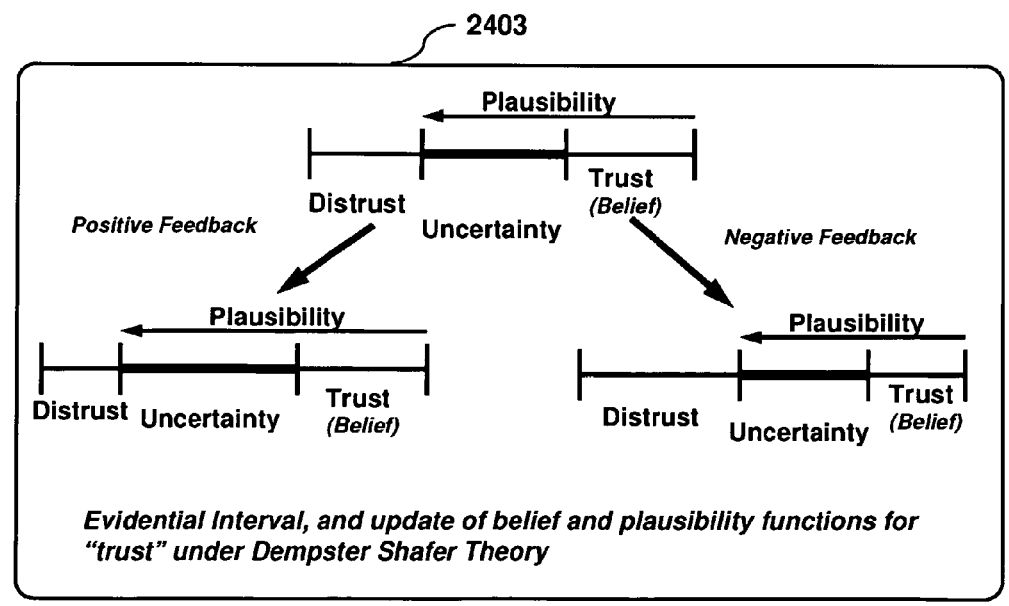

2403

Evidential Interval, and update of belief and plausibility functions for "trust" under Dempster Shafer Theory FIG. 25    Belief calculus for information qualities Unfortunately, there implausible anomalies sometimes occur in using Dempster Shafer combination rule to combine beliefs. Using a *"pignistic"* transformation (the function that aims to optimize wagering) rather than a *"credal"* (belief function), addresses these problems. This leads us to (Smets') Transferable Belief Model (TBM).

The pignistic transformation BetPm(X) converts the Dempster Shafer belief function $m(\zeta)$ to a function that has a consistent probabilistic interpretation:

$$BetPm\ (2^\delta) \mapsto [0,1]$$
$$\text{and}$$
$$BetPm\ (X) = \sum_{A \subseteq \delta, X \in A} \frac{m(A)}{|A|(1-m(\emptyset))}$$

2501

It is possible to also define the distance between two transformed BPAs as:

2502

$$dif\ BetP\ (m_1, m_2) = \max_{A \in \delta} |\ BetPm_1(A) - BetPm_2(A)\ |$$

A desired quality measure for reliability (r) slowly increases with positive feedback, but falls quickly with negative feedback. For an object $d$ in the TBM, for any parent $s_i$ in the pedigree graph for d, we can derive the reliability $r_i'$ of d with respect to $s_i$ based on the difference between $m_{est}$: the estimated trust, and $m_{feed}$: feedback as follows:

2503

$$given\ \rho = dif\ BetP\ (m_{est}, m_{feed})$$
$$r_i' = \begin{cases} pos\ feedback\ :\ & r_i + \rho(1-r_i) \\ neg\ feedback\ :\ & r_i(1-p_i) \end{cases}$$

This definition can be applied and maintained recursively to any derivation graph, with suitable tests for cycles, and may also be applied in a depth-limited version, that limits the number of generational "hops".

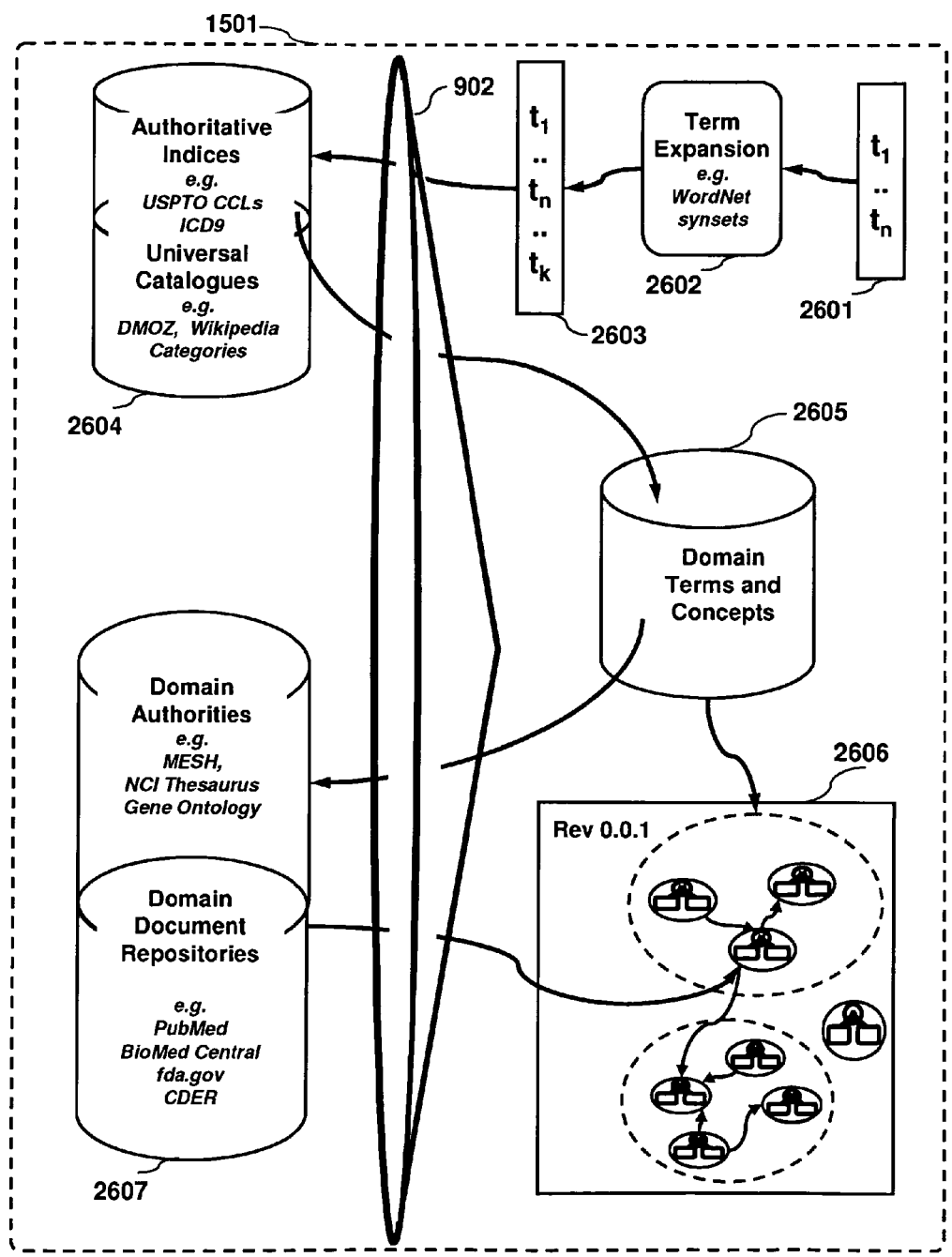
FIG. 26    Concept space initialization

FIG. 27  Concept space bootstrapping and evolution
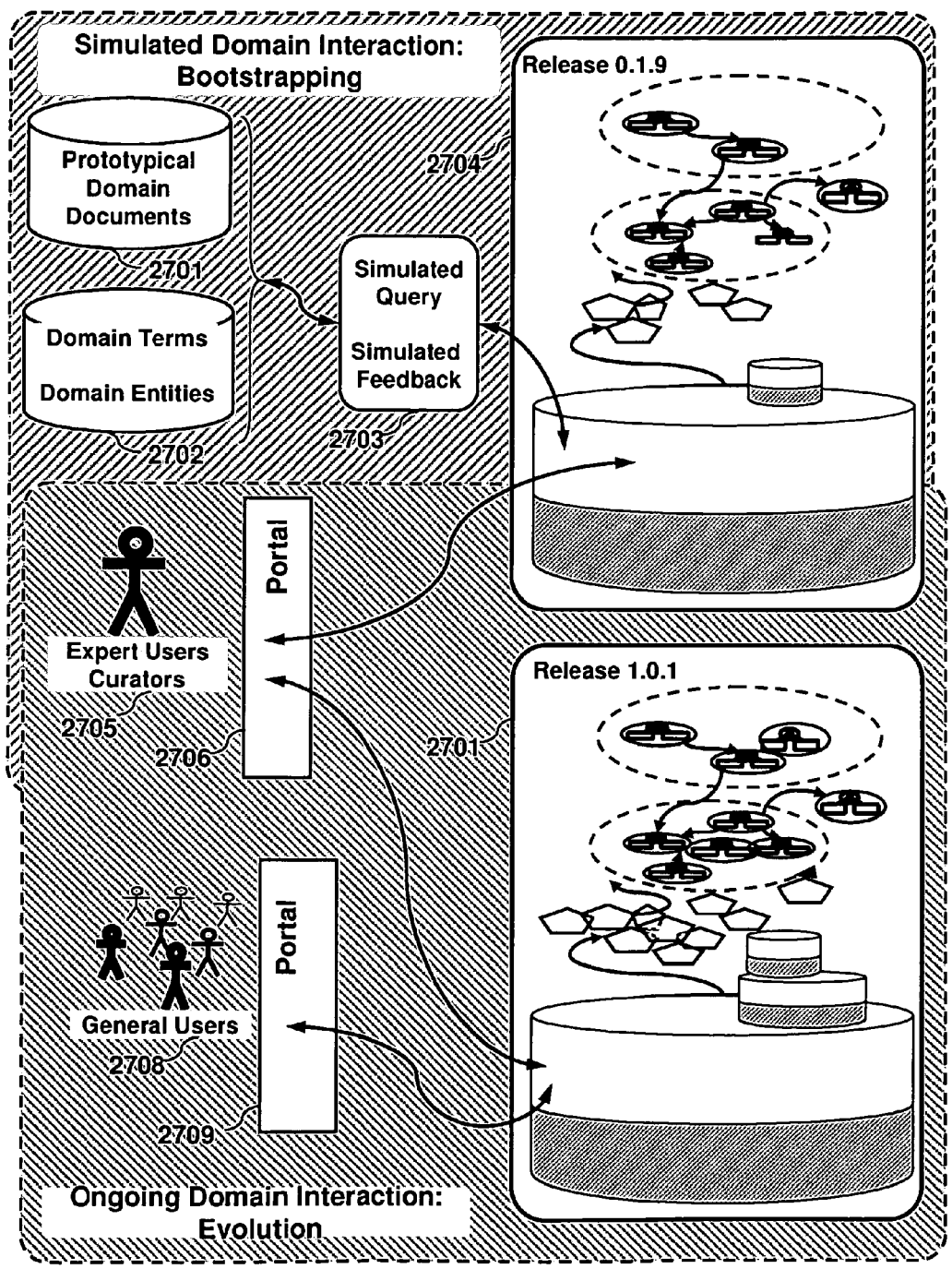

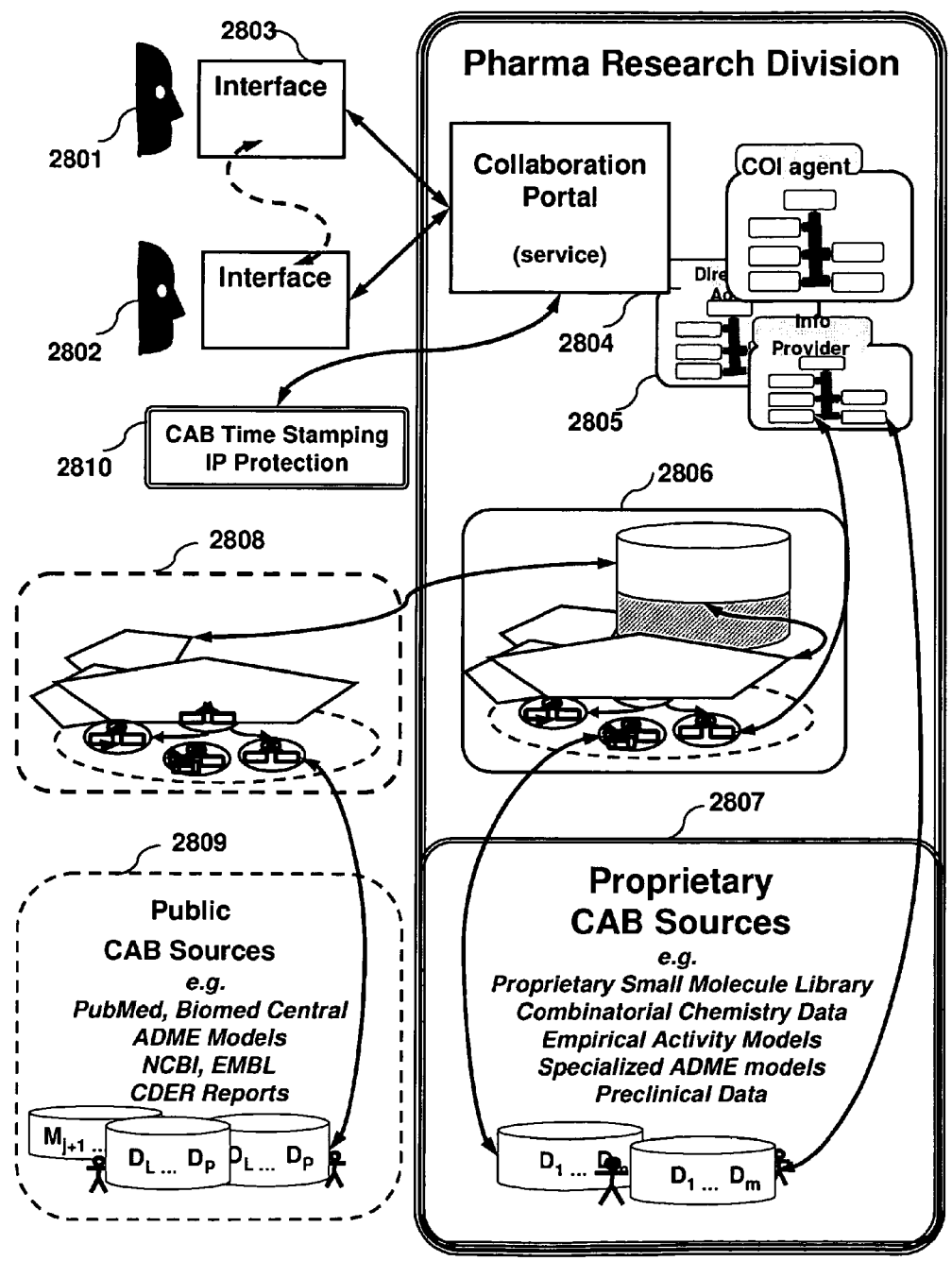
FIG. 28  Example – Pharma Research Domain

FIG. 29  Example use – software repository
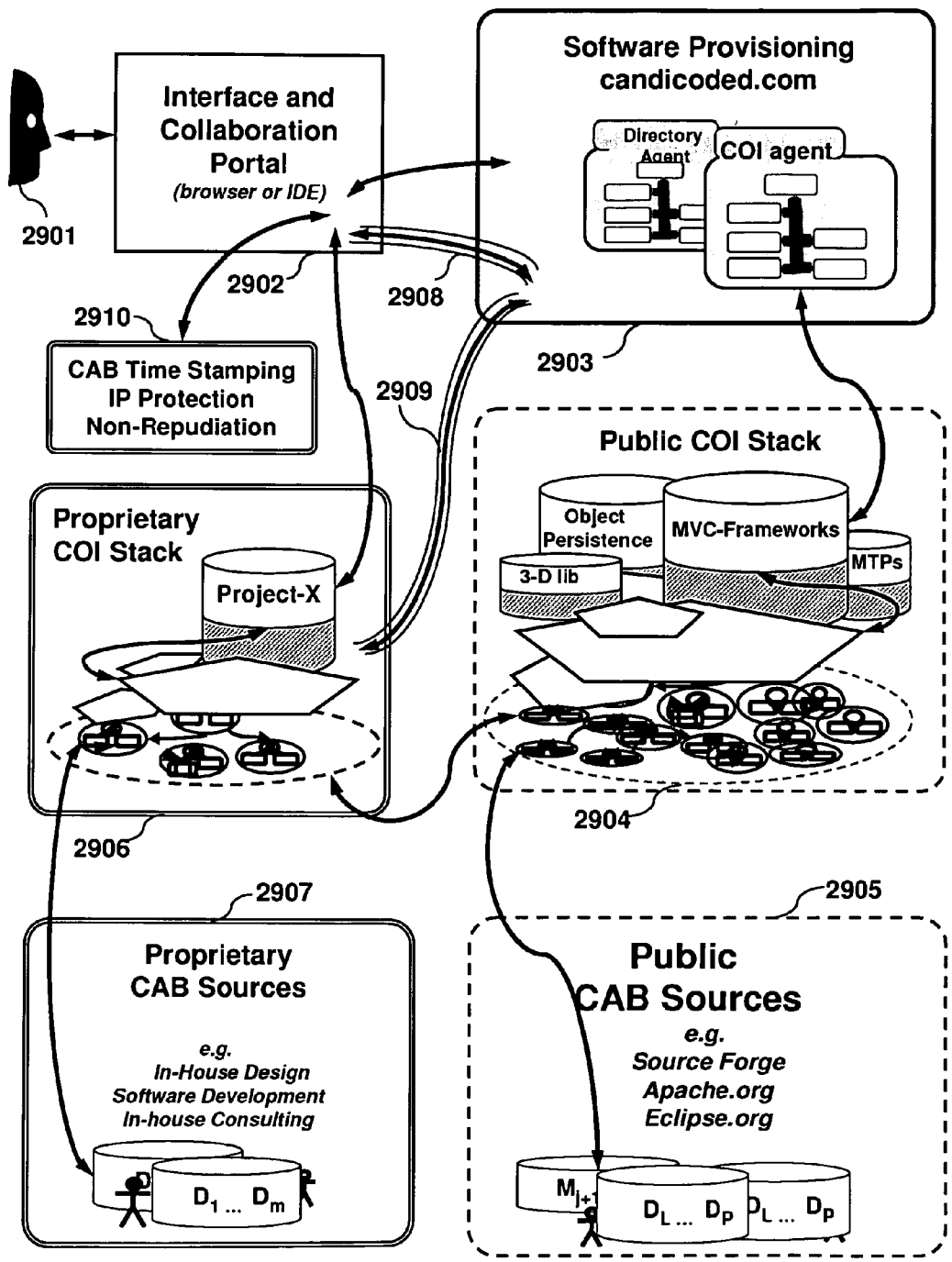

FIG. 30    Example user interface – Software Development
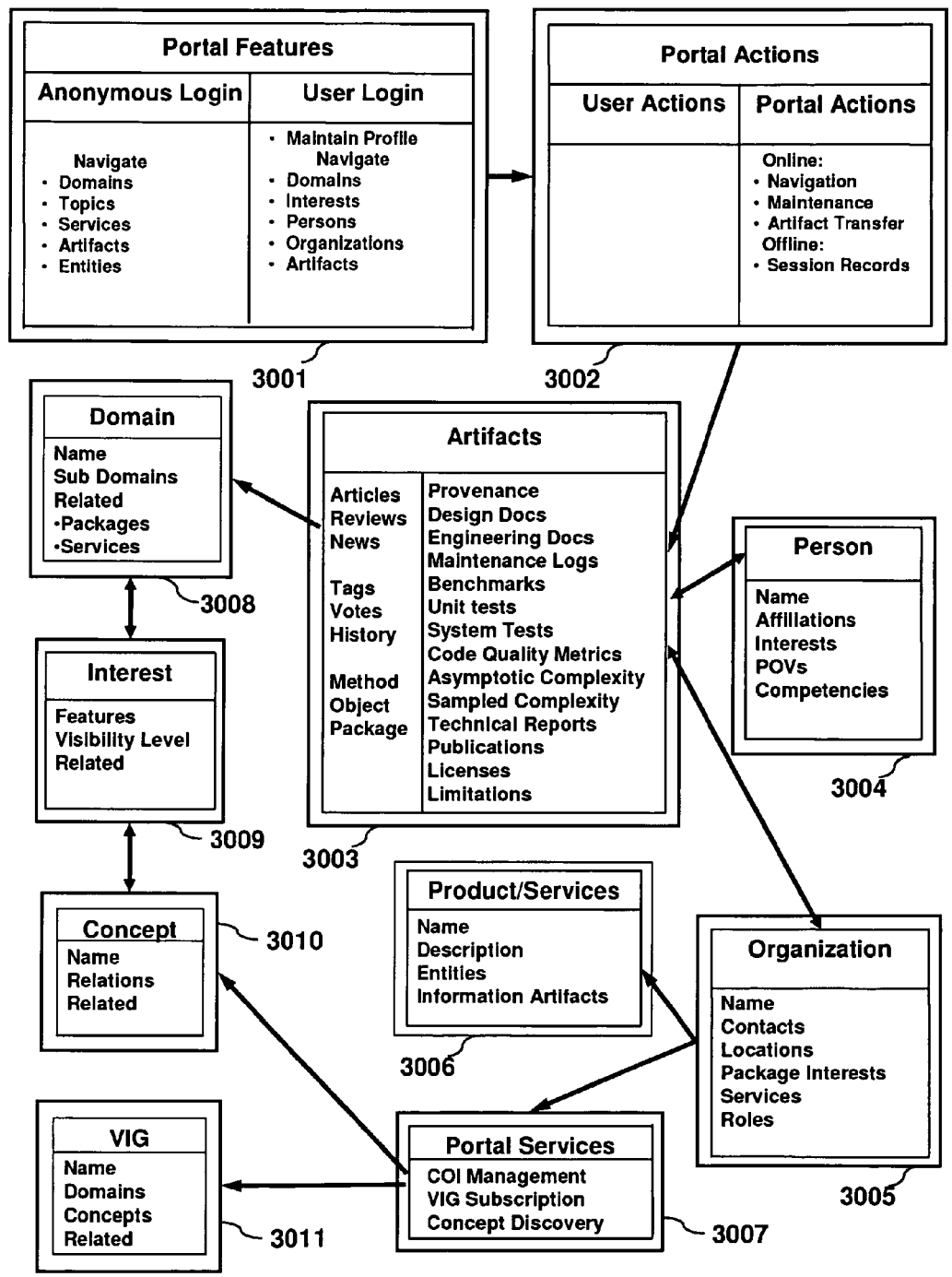

FIG. 31    Example use – RFP Portal - Energy Generation IT
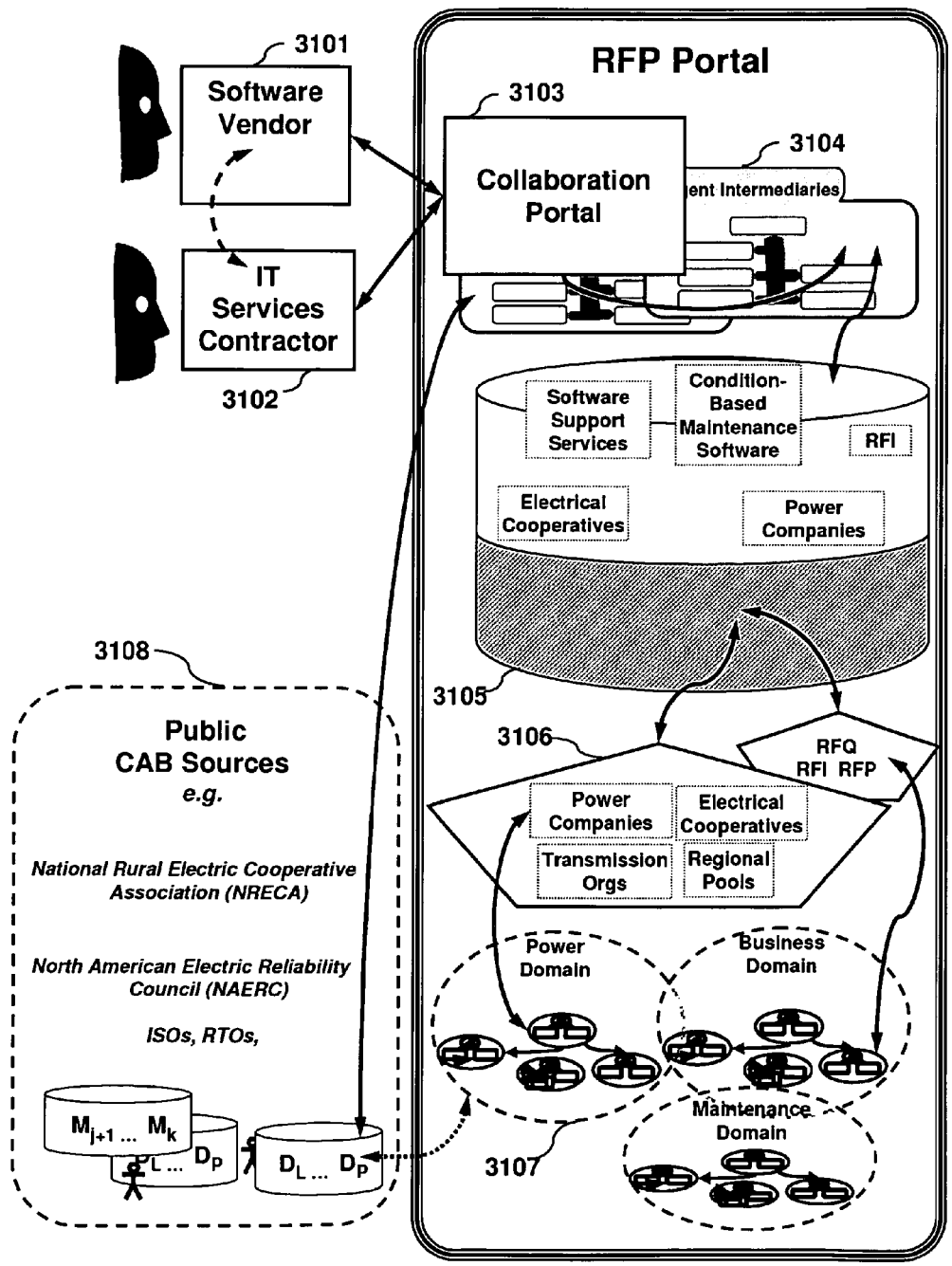

FIG. 32　　　　　　　　Terminology Spectrum
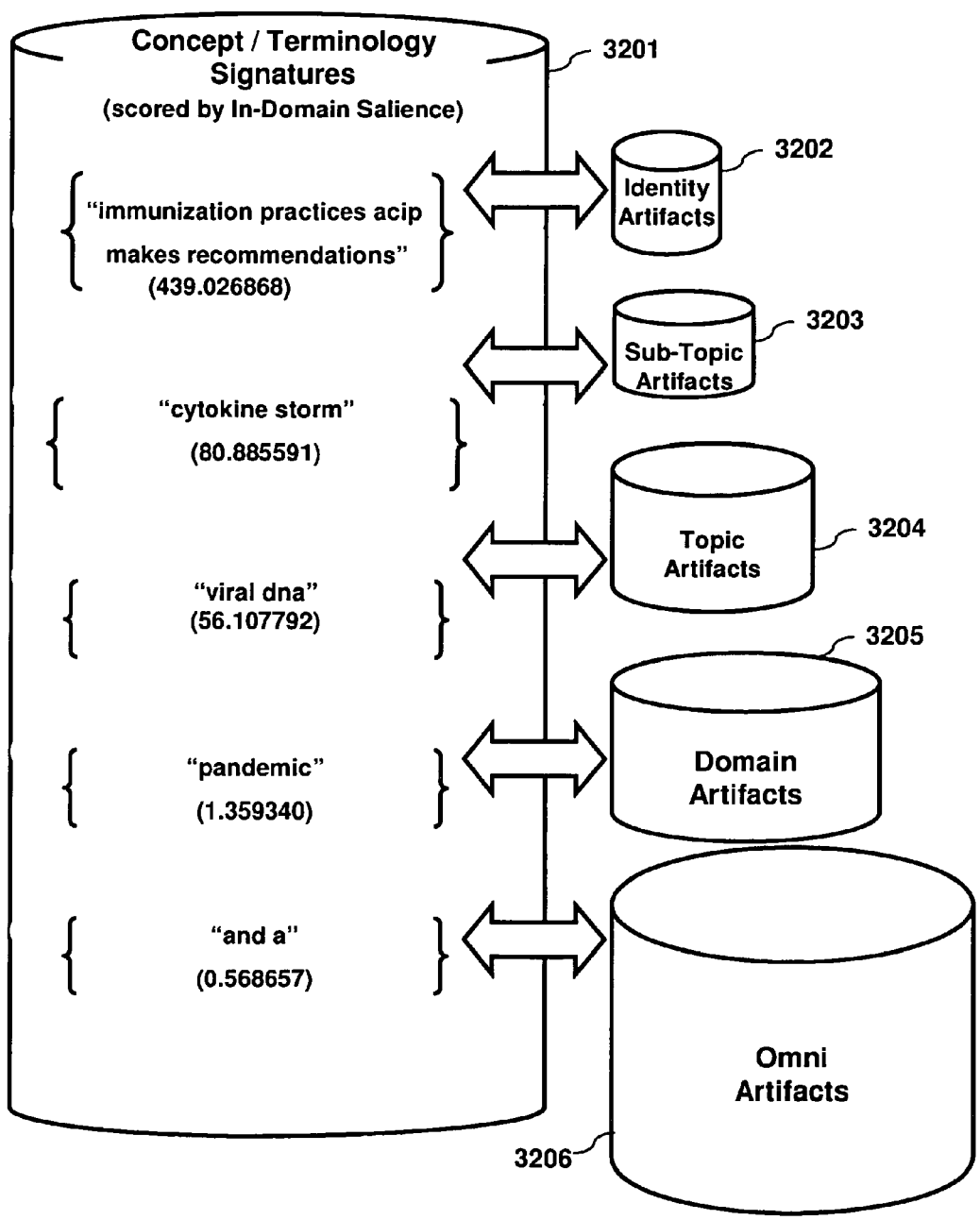

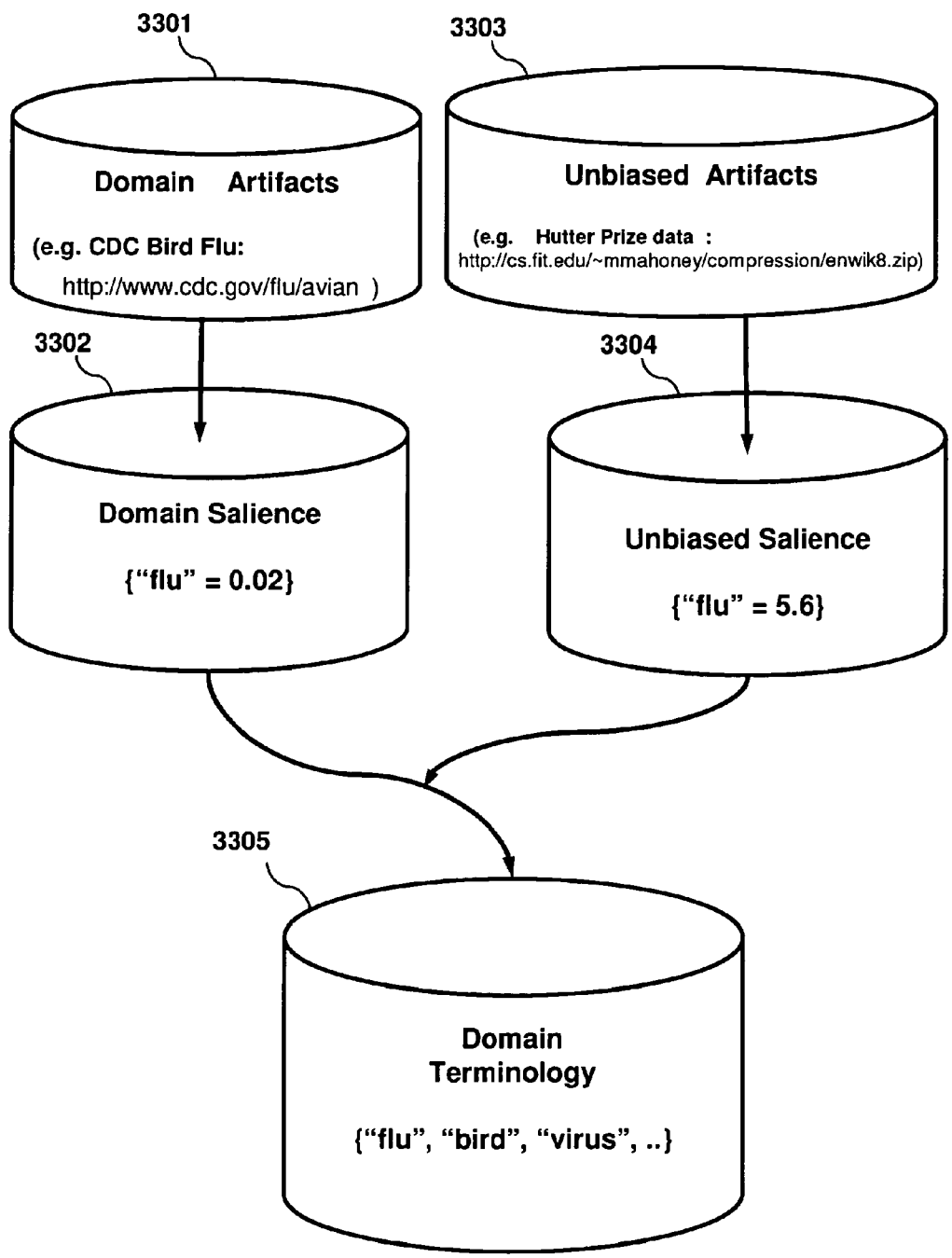

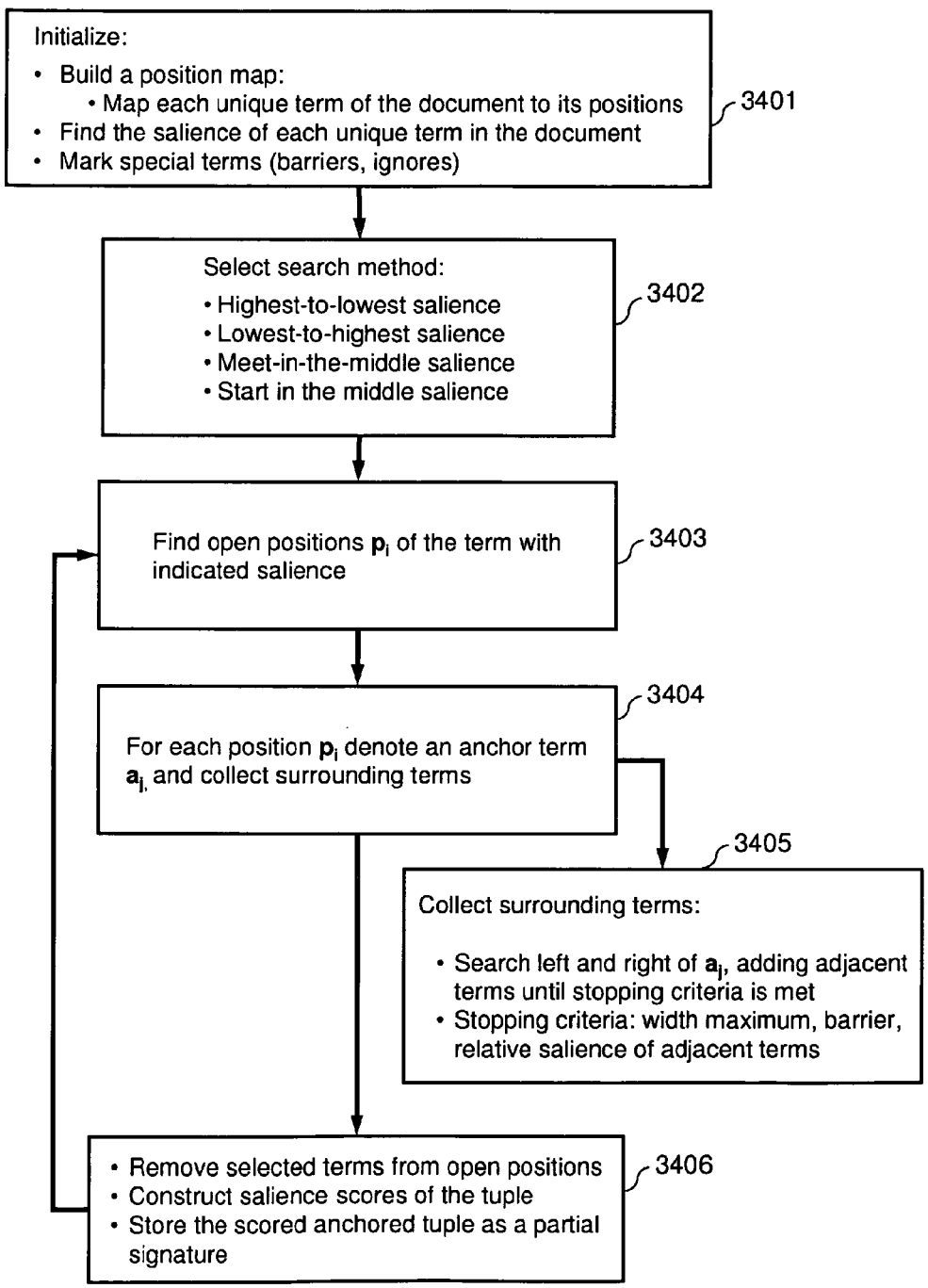
FIG. 34  Terminology Extraction – Building Tuples for Signatures

FIG. 35    Tuple Comparison using S,C,P Vectors
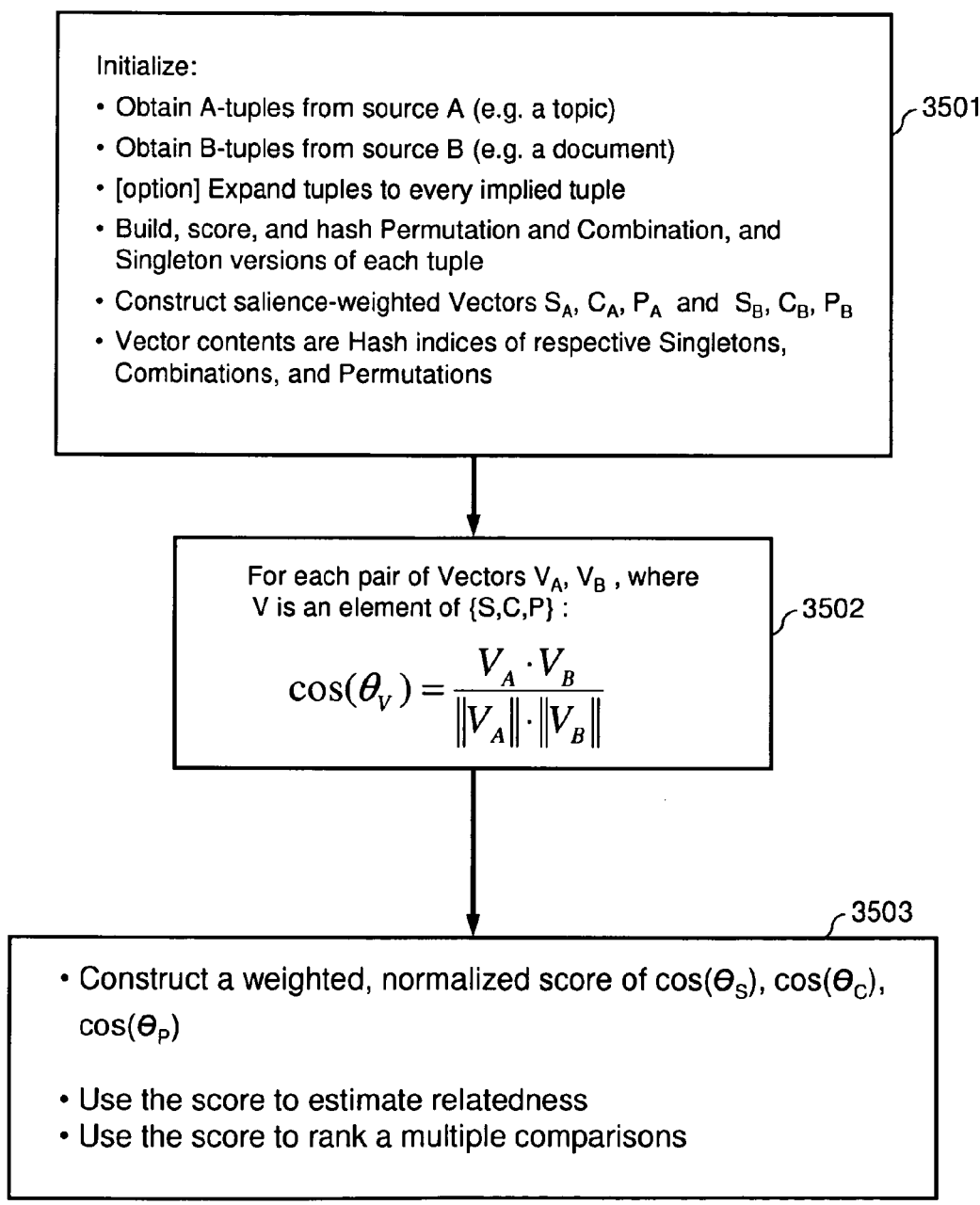

FIG. 36  Example: IR metrics on SCP comparisons – PI Domain

Extended Confusion Matrix

| | | TP | FP | TN | FN | MP | MN | Precision | Recall | FBeta(0.5) | |
|---|---|---|---|---|---|---|---|---|---|---|---|
| | S | 20 | 6 | 10 | 6 | 31 | 16 | 0.76923 | 0.64516 | 0.74074 | human cases of significant infectious diseases |
| | C | 19 | 9 | 7 | 9 | 31 | 16 | 0.67857 | 0.61290 | 0.66434 | |
| | P | 17 | 5 | 11 | 5 | 31 | 16 | 0.77273 | 0.54839 | 0.71429 | |
| | Co | 22 | 5 | 11 | 5 | 31 | 16 | 0.81481 | 0.70968 | 0.79137 | |
| | . | TP | FP | TN | FN | MP | MN | Precision | Recall | FBeta(0.5) | domestic animal cases of significant zoonotic diseases |
| | S | 17 | 5 | 18 | 5 | 24 | 23 | 0.77273 | 0.70833 | 0.75893 | |
| | C | 16 | 7 | 16 | 7 | 24 | 23 | 0.69565 | 0.66667 | 0.68966 | |
| | P | 8 | 4 | 19 | 4 | 24 | 23 | 0.66667 | 0.33333 | 0.55556 | |
| | Co | 15 | 6 | 17 | 6 | 24 | 23 | 0.71429 | 0.62500 | 0.69444 | |
| | . | TP | FP | TN | FN | MP | MN | Precision | Recall | FBeta(0.5) | animal vectors and reservoirs |
| | S | 22 | 6 | 14 | 6 | 27 | 20 | 0.78571 | 0.81481 | 0.79137 | |
| | C | 22 | 7 | 13 | 7 | 27 | 20 | 0.75862 | 0.81481 | 0.76923 | |
| | P | 19 | 5 | 15 | 5 | 27 | 20 | 0.79167 | 0.70370 | 0.77236 | |
| | Co | 21 | 6 | 14 | 6 | 27 | 20 | 0.77778 | 0.77778 | 0.77778 | |
| | . | TP | FP | TN | FN | MP | MN | Precision | Recall | FBeta(0.5) | emerging and re-emerging infectious diseases |
| | S | 30 | 0 | 2 | 0 | 45 | 2 | 1.00000 | 0.66667 | 0.90909 | |
| | C | 30 | 0 | 2 | 0 | 45 | 2 | 1.00000 | 0.66667 | 0.90909 | |
| | P | 27 | 0 | 2 | 0 | 45 | 2 | 1.00000 | 0.60000 | 0.88235 | |
| | Co | 29 | 0 | 2 | 0 | 45 | 2 | 1.00000 | 0.64444 | 0.90062 | |
| | . | TP | FP | TN | FN | MP | MN | Precision | Recall | FBeta(0.5) | planning and preparedness efforts |
| | S | 11 | 5 | 20 | 5 | 22 | 25 | 0.68750 | 0.50000 | 0.63953 | |
| | C | 13 | 3 | 22 | 3 | 22 | 25 | 0.81250 | 0.59091 | 0.75581 | |
| | P | 5 | 3 | 22 | 3 | 22 | 25 | 0.62500 | 0.22727 | 0.46296 | |
| | Co | 11 | 2 | 23 | 2 | 22 | 25 | 0.84615 | 0.50000 | 0.74324 | |
| | . | TP | FP | TN | FN | MP | MN | Precision | Recall | FBeta(0.5) | disease resistance and inoculation |
| | S | 11 | 6 | 20 | 6 | 21 | 26 | 0.64706 | 0.52381 | 0.61798 | |
| | C | 6 | 2 | 24 | 2 | 21 | 26 | 0.75000 | 0.28571 | 0.56604 | |
| | P | 5 | 2 | 24 | 2 | 21 | 26 | 0.71429 | 0.23810 | 0.51020 | |
| | Co | 5 | 2 | 24 | 2 | 21 | 26 | 0.71429 | 0.23810 | 0.51020 | |
| | . | TP | FP | TN | FN | MP | MN | Precision | Recall | FBeta(0.5) | % All Topics % |
| | S | 111 | 28 | 84 | 28 | 170 | 112 | 0.79856 | 0.65294 | 0.76446 | |
| | C | 106 | 28 | 84 | 28 | 170 | 112 | 0.79104 | 0.62353 | 0.75071 | |
| | P | 81 | 19 | 93 | 19 | 170 | 112 | 0.81000 | 0.47647 | 0.71053 | |
| | Co | 103 | 21 | 91 | 21 | 170 | 112 | 0.83065 | 0.60588 | 0.77327 | |

3601

FIG. 37        Learning Optimal Acceptance Thresholds
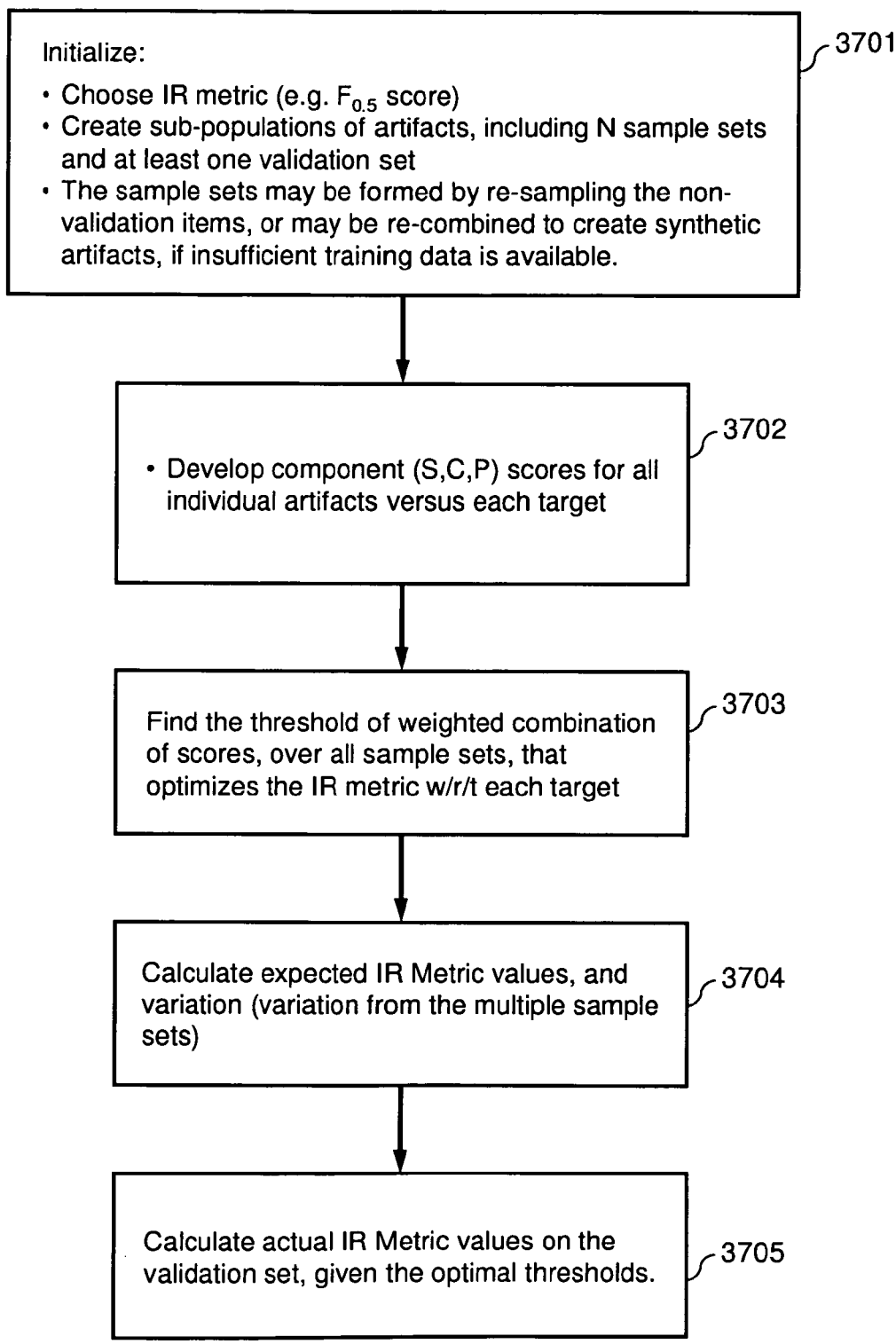

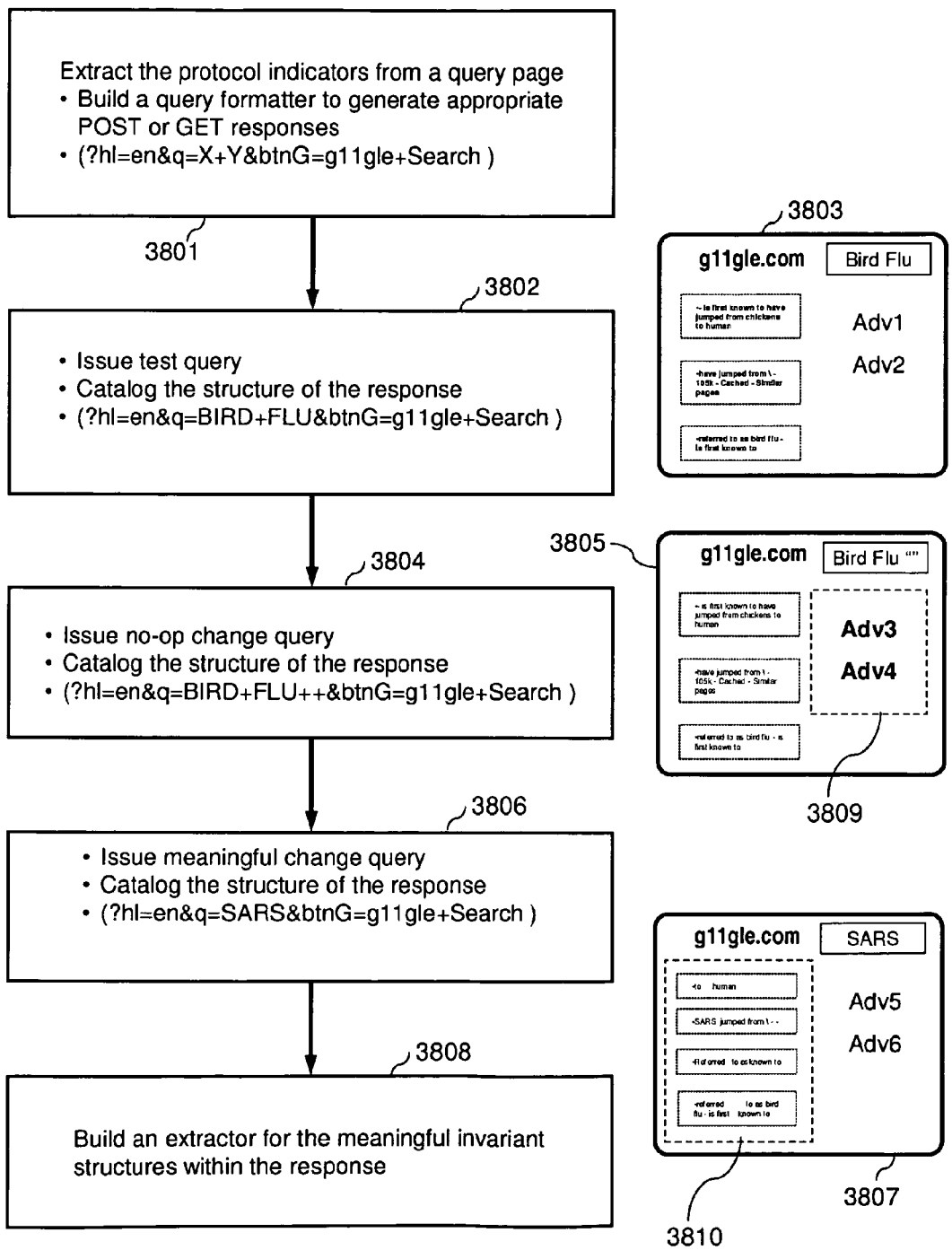
FIG. 38     Learning Significant Fields of Arbitrary Web Sources

FIG. 39  Building Query Formatter for Arbitrary Web Source
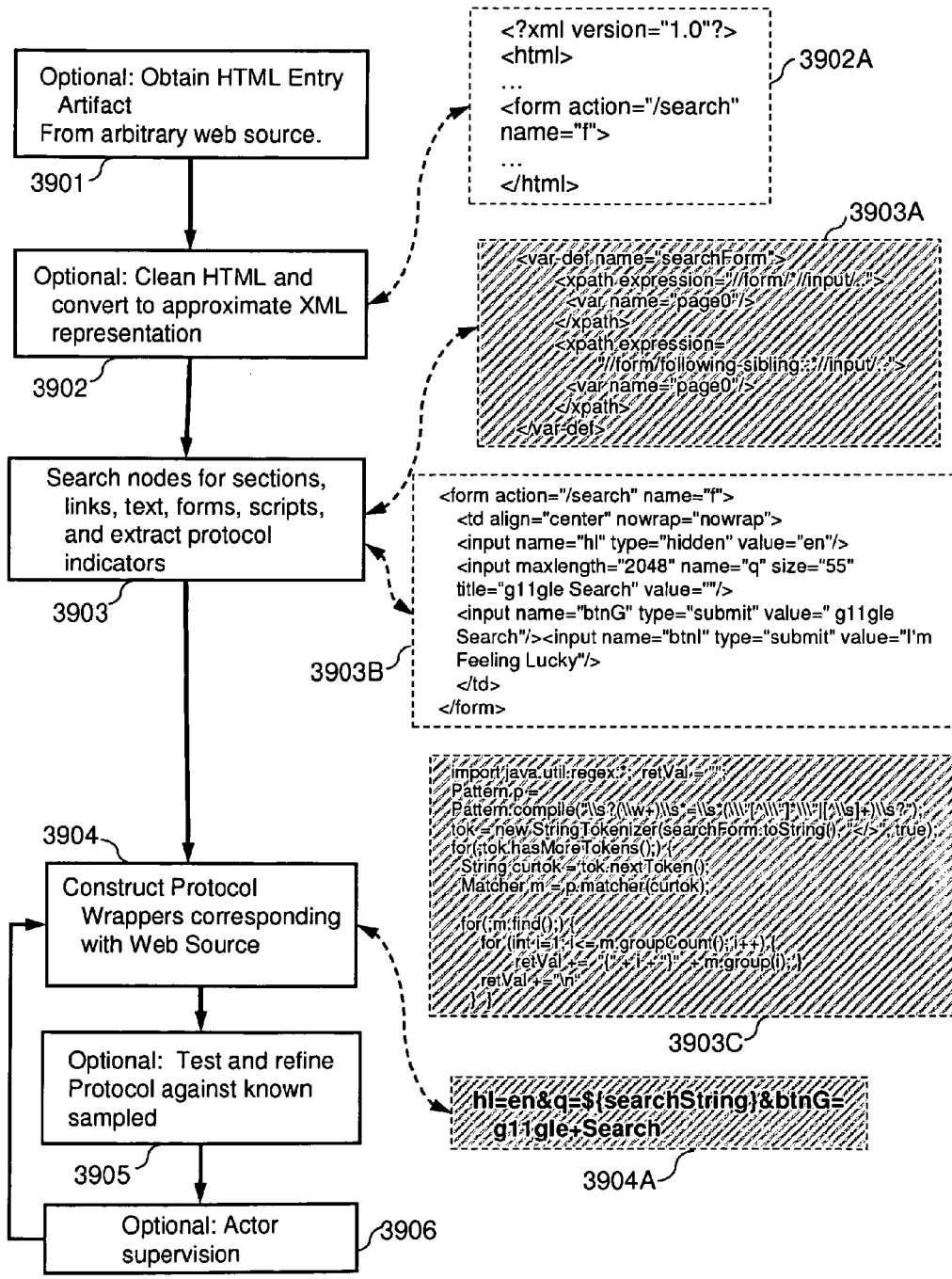

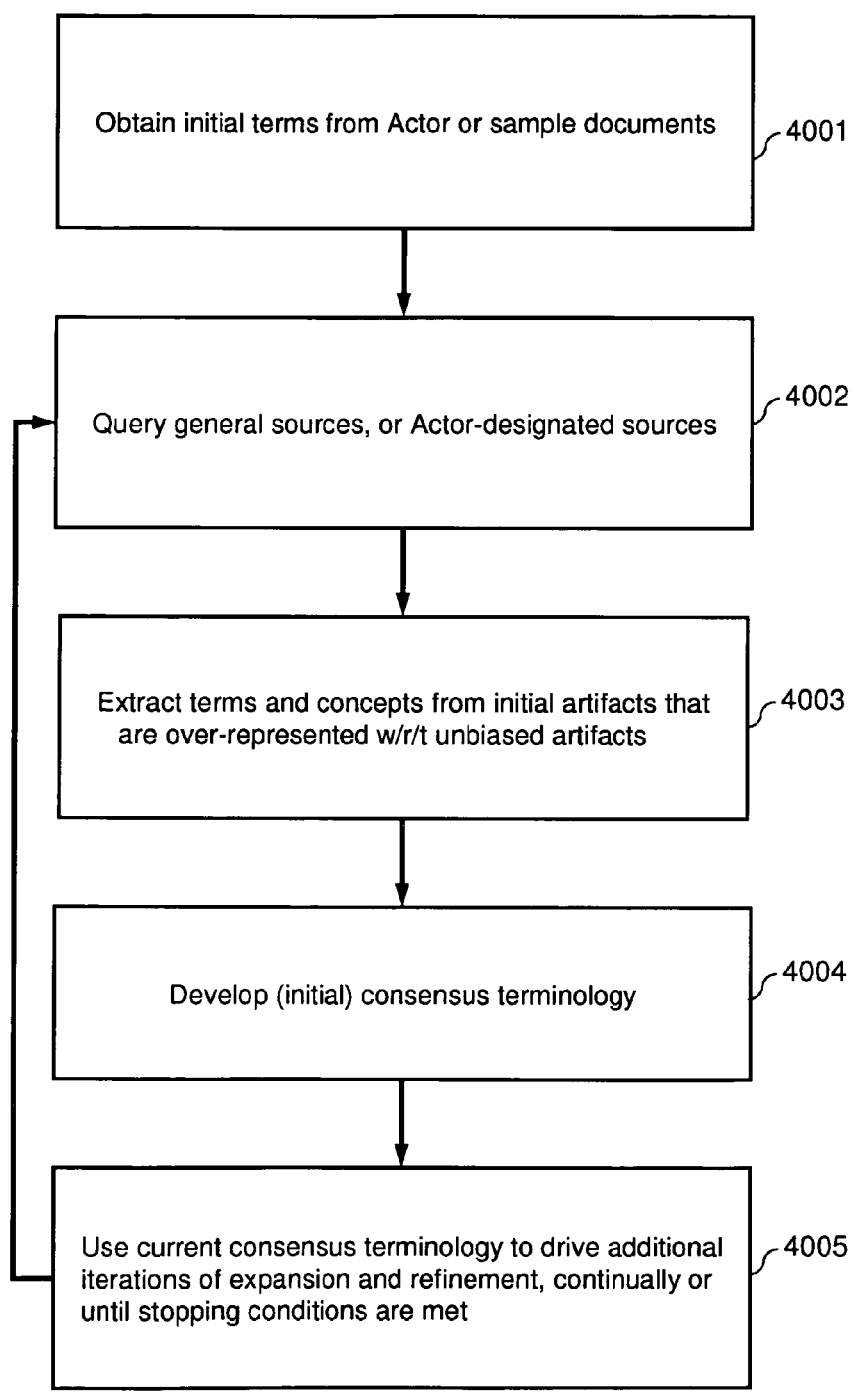
FIG. 40  Bootstrapping Domain Terminology and Concepts

FIG. 41          Example: Tuples from the PI Domain

Salience of tuples viewed as permutations          o = original
(representative items)                             i = implied

| Salience | | Tuple | Salience | | Tuple |
|---|---|---|---|---|---|
| 171.914780 | o | form easily spread among humans | 10.237210 | o | cyberfamilias |
| 156.410980 | o | fear avian influenza could mutate | 10.237210 | o | heartbreaking |
| 141.219403 | o | 0 officials said last month | 10.237210 | o | transcript |
| 136.109332 | o | asia world health organization experts | 10.237210 | o | government-run |
| 126.928614 | o | more than * 0 samples | 10.237210 | o | vic |
| 121.616134 | o | more than * countries including | 10.237210 | o | kapoor |
| 118.423815 | o | dead birds have been found | 10.237210 | o | www.health24.com |
| 117.621469 | o | united states so far | 10.237210 | o | counsel |
| 116.271677 | o | health organization has told new | 10.237210 | o | dosages |
| 115.325103 | o | infection than has been found | 2.753394 | o | diseases |
| 111.093764 | o | h5n1 avian virus may mutate | 2.745357 | o | areas |
| 107.474953 | i | form easily spread among | 2.745357 | o | 5 |
| 79.101260 | o | killed * people worldwide | 2.737364 | o | mutate |
| 77.843478 | o | experts avian flu vaccines | 2.737364 | o | years |
| 77.839091 | o | influenza virus has killed * | 2.737364 | o | response |
| 76.562613 | i | people have died worldwide | 2.729415 | o | province |
| 76.075875 | o | any influenza pandemic its | 2.729415 | o | fear |
| 75.873612 | o | 1 * chickens were | 2.713648 | o | further |
| 75.775199 | o | chickens may have died | 2.713648 | o | announced |
| 75.744555 | o | two people had died | 2.705829 | o | viruses |
| 75.678989 | i | avian virus may mutate | 1.303519 | o | since |
| 75.674856 | o | international experts have also | 1.291766 | o | other |
| 75.135919 | o | more than * years | 1.280108 | o | avian |
| 75.072344 | o | h5n1 virus has been found | 1.262795 | o | may |
| 46.983684 | i | spread among humans | 1.201036 | o | human |
| 46.965850 | o | farm would not | 1.190086 | o | had |
| 46.843622 | o | birds killed so | 1.171121 | o | birds |
| 46.720489 | o | local health officials | 1.115676 | o | also |
| 46.606674 | i | officials said however | 1.090005 | o | influenza |
| 46.468275 | o | vietnam * million | 1.059790 | o | were |
| 46.458265 | o | public health while | 1.054816 | o | poultry |
| 46.442750 | o | state health ministry | 1.054816 | o | more |
| 46.441419 | o | poultry several cases | 1.030196 | o | disease |
| 46.391696 | o | government authorities also | 0.917538 | o | people |
| 20.574780 | o | could well | 0.904055 | o | not |
| 20.568798 | i | three million | 0.788061 | o | h5n1 |
| 20.556020 | i | vaccines we | 0.721510 | o | been |
| 20.532430 | i | told new | 0.721510 | o | * |
| 20.495665 | i | chickens against | 0.607853 | o | health |
| 20.489771 | i | virus have since | 0.543723 | o | virus |
| 20.481044 | i | all those | 0.477322 | o | * |
| 20.448700 | o | agriculture organization | 0.475659 | o | said |
| 10.237210 | o | quell | 0.450940 | o | bird |
| 10.237210 | o | tubercle | 0.444420 | o | has |
| 10.237210 | o | checklists | 0.407487 | o | have |
| 10.237210 | o | forwarded | 0.280108 | o | flu |
| 10.237210 | o | instant | | | |

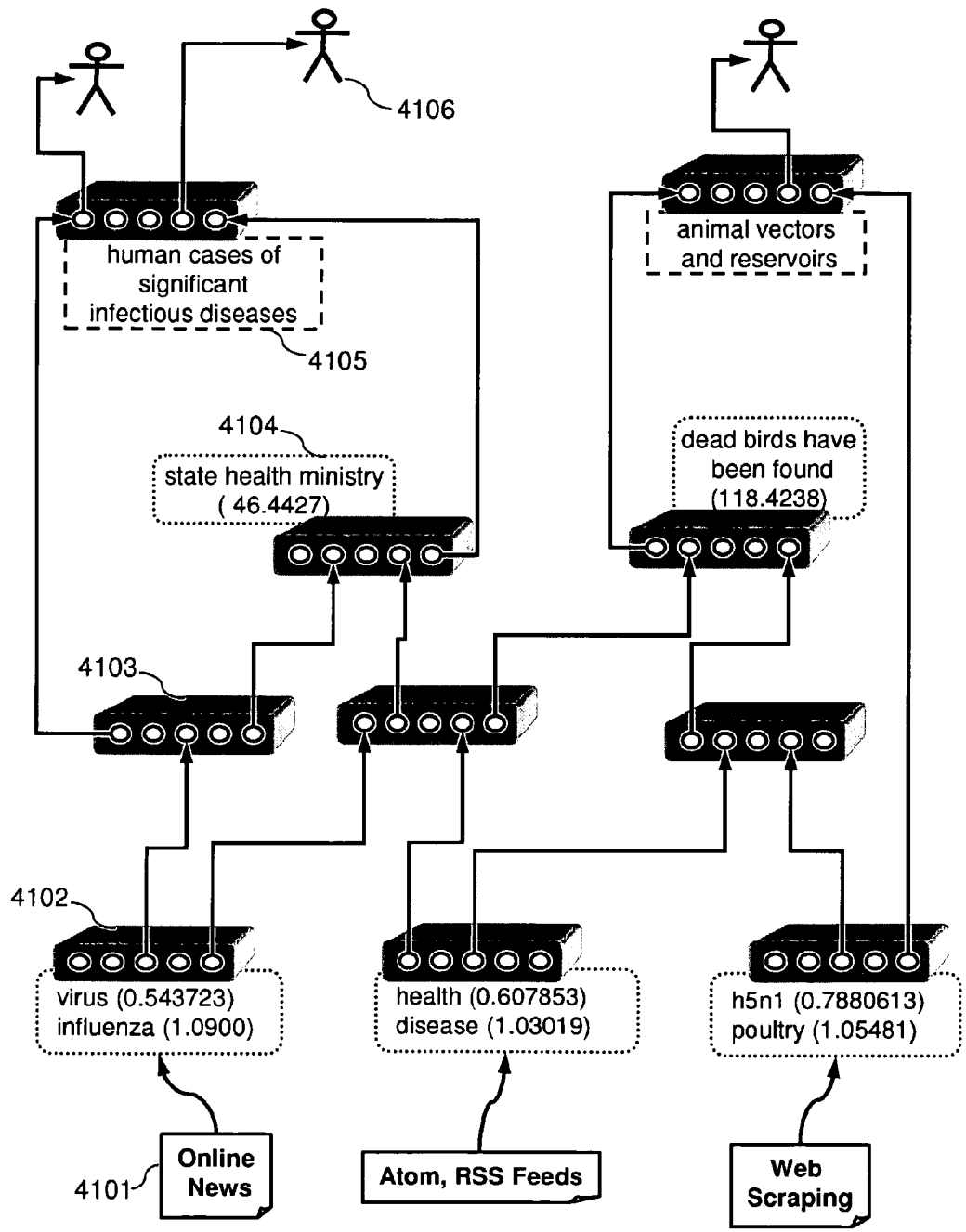
FIG. 42  Example: Terminology Spectrum for Scalable Filtering, Sensing, Routing

COLLABORATION PORTAL—COPO—A SCALEABLE METHOD, SYSTEM AND APPARATUS FOR PROVIDING COMPUTER-ACCESSIBLE BENEFITS TO COMMUNITIES OF USERS

STATEMENT REGARDING FEDERALLY SPONSORED RESEARCH OR DEVELOPMENT

Portions of the present invention were developed with funding from the Office of Naval Research under contract N00014-02-C-0320, and contract N00014-05-C-0541, and from Air Force Research Labs contract FA8750-05-C-0104 and contract FA8750-05-C-0104.

CROSS-REFERENCE TO RELATED APPLICATIONS

The present application claims the benefit of U.S. Provisional Application No. 60/914,758, filed Apr. 30, 2007, U.S. Provisional Application No. 60/942,459, filed Jun. 7, 2007, and U.S. Non-Provisional application Ser. No. 12/113,203 filed Apr. 30, 2008, now issued as U.S. Pat. No. 7,890,549.

TECHNICAL FIELD OF THE INVENTION

The present invention, known as The Collaboration Portal (COPO), relates generally to the field of automated entity, data processing, system control, and data communications, and more specifically to an integrated method, system, and apparatus for providing computer-accessible benefits for communities of users. COPO obtains terminology and concepts from users, systems, or artifacts, organizes the terminology and concepts, and uses resulting organization to provide appropriate information, services, and other benefits.

BACKGROUND OF THE INVENTION

The present invention relates generally to the field of automated entity, data processing, system control, and data communications, and provides a system for providing computer-accessible benefits for communities of users, and can efficiently and robustly distribute the processing in behalf of those users over a decentralized network of computers. The field of the invention generally encompasses enabling appropriate and desired communication among communities of users and organizations, and providing information, goods, services, a works, opportunities, and connections among users and organizations.

COPO is a system that provides information discovery and dissemination with both explicit and tacit collaboration. The portal provides automated information management and organization to assist a user, such as a pharmaceutical scientist, a financial analyst, or an news reporter, within an organization in their daily work. The portal is supported by a network of communities of practice, also called communities of interest (COI) for users to evolve and use new and existing knowledge, including expertise, current know-how and provenance. Additionally, COPO is useful outside of the typical activities of knowledge workers. The current invention has manifold uses in technical and scientific fields, and enables research, information dissemination, joint development, intellectual property management, and the identification of potential collaborators in fields including computer science, mathematics, logic, linguistics, biology, chemistry, physics, health, medicine, pharmaceuticals, education, materials science, earth science, ecology, geology, oceanography. The invention also provides support of government activities including intelligence gathering, military management, legislative, executive, and judicial decision support, and in performing search and analysis of intellectual property including patents, trademarks and copyrights. COPO can also be used in commerce, to inform buyers and sellers of joint opportunities, in investment, to bring investment partners together and to provide initial contacts and intermediation between equity holders and equity investors, between borrowers and lenders, and between options writers and options purchasers, to perform market intelligence to inform market parties about the choices, needs, and requirements of other market parties, and to provide collaborative ranking of alternative choices, offers, offerors, and customers in the marketplace. The instant invention also provides valuable capabilities supporting joint development of intellectual property science an technology, especially in areas requiring the integration of ideas from multiple individuals, including development of experimental procedures, engineering design and testing, system development, testing, documentation, maintenance, and support, including those activities for software, hardware, mechanical, hydraulic, nuclear, agricultural, oceanic, and geophysical systems. Additionally, the invention is useful in the arts and in human relations, and supports social networking for personal enjoyment, edification, or entertainment; identification of like-minded people, identification of people with complementary attributes or interests; identification of potential friends or adversaries; identification of suitable roles; and identification of people or system providing appropriate emotional support.

COPO is particularly valuable to specialist communities facing complex problems, in that it provides connections among the appropriate members of those communities, provides both passive and active information flow along those connections, and provides a persistent dynamic representation of the state of the art for a particular domain. The complexity of scientific and technological development drives practitioners to be ever-more specialized, which results in a smaller and smaller field that understands the challenges accomplishments within a particular are of expertise. Because of this, it becomes ever-more difficult to find colleagues for technical endeavors, either because the knowledge gulf is too wide for useful communication among the most appropriate known colleagues, or because the areas of knowledge and the areas of need do not match up. This problem extends beyond that of finding computer accessible colleagues, to finding any computer accessible benefits of interest to a practitioner. Additionally, the problem of finding appropriate computer accessible benefits grows steadily with new available networked resources, including people, systems, commercial entities, organizations, governments, social groups, and combinations thereof proliferate. For all respondents, including generalized actors, collaborative problem solving, and social innovation offers great potential benefit if it can be achieved practically. COPO offers such a capability, and additionally serves as an honest broker throughout the interactions by contributing classification, domain analysis, novelty analysis, time stamping, authentication, non-repudiation, connections to other trusted third parties, and confidential exchange of information.

For users of networked information systems, rapid acquisition and organization of relevant information and services is a crucial, time-consuming challenge. Health workers, scientists, news people, intelligence personnel and financial analysts, and engineers all have need of a system that helps them quickly acquire and organize a body of knowledge relevant to some new contagion, discovery, event, threat, or opportunity.

COPO combines new technologies from the area of statistical natural language processing with social computing and multi-agent systems to provide unprecedented capabilities for information workers. Typically, when an analysts obtain a new task, he uses a variety of online resources to gain an initial understanding of the relevant background information, and to learn of appropriate sources, literature, experts, and services related to their goals. Such researchers usually start with enough background information to launch initial queries of search engines and directories, acquire an first set of documents, and then digest that material to become sufficiently knowledgeable to conduct a series of ever-more targeted searches. This process may require 15 minutes for trivial fact-finding, up to days and weeks for in-depth investigations. Additionally, this may be a recurrent or continual task for users such as epidemiologists, intelligence analysts, and scientists who continually survey a particular information domain.

Science, technology, and networked communication make new areas of specialized knowledge available at an accelerating pace. This situation guarantees that even the most persistent and capable analysts cannot stay abreast of the latest developments, and lack even the latest terminology and concepts used in the most active corners of their field. To fully realize the potential of our networked knowledge, such users must be able to exploit the organization and knowledge that are intrinsic in multiple artifacts and services available to them. Terminology-, concept-, and source-discovery must proceed rapidly and automatically, given the smallest hints of user context. There is a need, not satisfied by indexes and directories, for rapid, in-depth retrieval and organization of knowledge.

Almost all large-scale information services available to the user employ a "bag-of-terms" approach to information analysis. That is, they represent a document by an non-ordered collection of the terms contained by that document. Typical of these approaches are word vector representations used in pair-wise comparisons, and indices such as Google and Yahoo, that map each term to the set of documents containing the term, and organize the results by (some estimate of) the popularity of the related documents. Neither word-vectors, nor comprehensive indices are effective at extracting domain terminology, and thus, they are ill-suited to inquiries concerning new fields of study. The important terminology, idioms, and related features can be extracted from documents, but existing approaches require exponentially explosive amounts of computation and storage. For instance, extracting 5-tuples with a vocabulary of 20,000 words (very meager for most domains) results in term vectors containing 3.2 E21 potential items. Even using sparse representations (to save space), constructing and comparing these vectors is computationally expensive. The current invention uses a new approach for extracting tuples likely to contain meaningful terminology, and is able to extract such tuples in linear time with respect to the input, and to store them in linear space with respect to the size of the input. This provides a new and practical scheme for providing the initial phase of terminology extraction, concept identification, and artifact identification. The method employs a flexible spanning criterion, which recognizes tuples of varying sizes, and employs a canonical method to build a concise, easily compared representation of unstructured text. Beyond extraction of important domain terminology, the current method is also valuable in construction of information retrieval systems, information routers, and in efficiently finding partial or total duplicates of unstructured text within large bodies of information.

Current Computing Technologies

Microprocessors are central processing units (CPUs) manufactured on a small number of integrated circuits (ICs), historically one cpu per IC. Overall, smaller CPU sizes translate into faster switching times, lower power consumption, and less generated heat. Additionally, as the ability to construct exceedingly small transistors on an IC has increased, the complexity and number of transistors in a single CPU has increased dramatically. This widely observed trend is described by Moore's law, which has proven to be a fairly accurate predictor of the growth of CPU (and other IC) complexity to date. Multicore microprocessors typically combine two or more independent microprocessors on a single IC or single chip, providing higher amounts of throughput at a given clock speed. This recent are of innovation helps drive down the computational energy losses due to generated heat, and uses power more efficiently than previous technologies. For instance, quad-core devices contain four independent microprocessors. Multicore microprocessors allow a computing device perform processor-level parallelism or thread-level parallelism within a single physical package. Massively Parallel Processing (MPP) is a type of parallel computing where many processing elements including both memory and processing elements are used to work together on a software application. Grid computing is an arrangement in which multiple independent networks of computing devices act as a virtual super computer. Cloud computing is a special case of grid computing in which computation is offered as a service and accomplished by allocation of systems from a provisioning pool.

Parallel computing is the simultaneous execution of the same task (split up and specially adapted) on multiple processors in order to obtain results faster. The idea is based on the fact that the process of solving a problem usually can be divided into smaller tasks, which may be carried out simultaneously with some coordination. Parallel computing approaches fall in a spectrum spanning "small-grain" to "large grain" parallelism. Typically, systems using "small-grain" approaches must run on specialized processors, or processors connected by very fast (and very expensive) switches. On the other hand, systems employing "large grain" parallel processing can run on much less specialized architectures, including clusters of commodity computers, and compute nodes connected over the internet. COPO/Galaxy uses a "large grain" parallel processing approach, and can be run efficiently on a wide variety of computing systems, including multicore processor systems, massively parallel systems, cloud computing systems, grid computing systems, desktops, laptops, notebooks, single-board computers, hand-held computers, and embedded computers.

Load balancing is a system design approach that attempts to keep all processors busy by moving tasks from heavily loaded processors to less loaded ones. The current invention can usefully distribute processing tasks over any conventional configuration general purpose computing devices. Note that inter-process communication, as used by the present invention, can be implemented on a wide variety of hardware and software layers, including buses, hubs, switches, cross-bar switches, Uniform Memory Access (UMA) Non-Uniform Memory Access or Non-Uniform Memory Architecture (NUMA), Cache only memory architecture (COMA), and combinations thereof.

PRIOR ART

Collaboration and social networking have been active fields of development in recent years. In the main, prior approaches are human powered—wherein users do all of the work of tagging, classifying, etc. or domain agnostic, such as the search, meta-search, and directory systems, or they are inflexible—such as systems constructed directly for a domain, which embed assumptions about that domain. Some representative work includes US Application 20070011155 to Sarkar, "a System for communication and collaboration" which is a good example of "human-powered" collaborative systems. Sarkar does perform some term analysis on inputs, but relies on human users to provide annotation to enable his system. Additionally, Sarkar fails to provide a bootstrapping method for automatically populating domain terminology and domain concepts. US Application 20040220905 to Chen describes a "concept network", which uses taxonomies or thesauri to perform retrieval at a conceptual level. Chen's system has no provision for specifically recognizing what terminology pertains to a particular domain, so his concepts, likewise, are domain agnostic. Additionally, Chen's system has no provision for bootstrapping an domain of specialization.

Many existing online services offer some support of collaboration, as exemplified by Wikis, such as Wikipedia, ScholarPedia, and Citizendium; by Blogs, such as those found on Blogspot and Blogger, by social tagging and discovery sites such as del.icio.us, stumbleUpon, and Digg; and by social media sites such as flikr, MySpace, and Facebook. None of these sites provide automatic analysis of the terminology and concepts of the domains of interest of their users, and none of them provide a way of automatically bootstrapping domain knowledge in a fully automatic or mixed initiative mode.

Many existing products, such as IBM Lotus Notes, Microsoft Sharepoint, Webex WebOffice, Softalk Collaboration Suite, and Google Docs also aim to enable collaboration among users, but fail to sites provide automatic analysis of terminology and concepts specific to the domains of interest of their users, and fail to provide a way of automatically bootstrapping domain knowledge in a fully automatic or mixed initiative mode.

BRIEF OVERVIEW OF THE INVENTION

The present invention integrates several components that are necessary to provide robust, automatic and/or mixed initiative access, discovery, exploration and use of computer accessible benefitS by generalized actors, and can be summarized as a computer implemented method, system, apparatus, and instructions to be stored on computer-readable media, to be used in a computer system, having one or more processors or virtual machines, one or more memory units, one or more input devices and one or more output devices, optionally a network, and optionally shared memory supporting communication among the processors, and having access to a searchable external network of information resources, where in the method is used for constructing terminology signatures or concept ID signatures related to a topic, domain, or universe of terminology or concept IDs from at least one first computer accessible artifact comprising the steps of:

optionally obtaining a mapping relationship or mapping procedure for mapping terms to concept IDs;
optionally using the mapping relationship or mapping procedure to map terms from computer accessible artifacts to concept IDs;
obtaining a ground set of term or concept ID weights related to a topic, domain or universe of terminology;
obtaining a first canonical method for selecting partial signature subsets of terms or concept IDs from the first computer accessible artifact;
using the first canonical method for partial signature selecting subsets of terms or concept IDs from the first computer accessible artifact;
obtaining a second canonical method for weighting partial signature subsets of terms or concept IDs based on the ground set of term or concept ID weights from the first computer accessible artifact;
using the second canonical method for weighting partial signature subsets of terms or concept IDs from the first computer accessible artifact; and
combining at least one weighted partial signature subset of terms or concept IDs as a terminology signature or a concept ID signature for the first computer accessible artifact;

and also a method for constructing scaleable topic and interest networks using terminology signatures or concept ID signatures related to a topic, domain or universe of terminology or concept IDs comprising the steps of:

obtaining a first set of terminology signatures or concept ID signatures related to a topic, domain, or universe of terminology or concept IDs;
obtaining a plurality of subsets of the first set of signatures;
distributing the plurality of subsets to a plurality of processors or virtual machines;
using the distributed subsets of signatures to a plurality of processors or virtual machines to recognize terminology or concepts related to the first set of terminology signatures or concept ID signatures; and
optionally using the distributed subsets of signatures to a plurality of processors or virtual machines to recognize terminology or concepts not related to the first set of terminology signatures or concept ID signatures;

and also a method for obtaining terminology signatures or concept ID signatures related to an interest, sub-topic, topic or domain comprising the steps of:

optionally obtaining a mapping relationship or mapping procedure for mapping terms to concept IDs;
optionally using the mapping relationship or mapping procedure to map terms from computer accessible artifacts to concept IDs;
obtaining a first result by querying at least one first information resource of the external network of information resources for terminology or concept IDs related to the first interest, sub-topic, topic or domain;
obtaining a second result by querying at least one second information resource of the external network of information resources for terminology or concept IDs related to the first interest, sub-topic, topic or domain;
selecting at least one subset of terminology or concept IDs the first result and the second result that is common to first result and the second result; and
constructing terminology signatures or concept ID signatures from the from the at least one subset of terminology or concept IDs;

and also a method for obtaining computer accessible artifacts or information about computer accessible artifacts related to an interest, sub-topic, topic or domain comprising the steps of:

optionally obtaining a mapping relationship or mapping procedure for mapping terms to concept IDs;
optionally using the mapping relationship or mapping procedure to map terms from computer accessible artifacts to concept IDs;
obtaining a first result by using a first variation of query for at least one first information resource of the external network of information resources;

obtaining a second result by using a second variation of query for the information resource of the external network of information resources;

constructing a description of the difference between the first result and second result;

examining the results for structures that indicate the required format of additional queries; and using the description of the difference between the result of the a first variation of query and the result of the second variation of query to configure a procedure for extracting information from s third result that is generated by a third query to the first information resource via the indicated structures;

and also a method for creating and maintaining communities of interest to inform generalized actors and to obtain computer accessible benefits for generalized actors, with respect to a sub-topic, topic or domain comprising the steps of:

optionally obtaining a mapping relationship or mapping procedure for mapping terms to concept IDs;

optionally using the mapping relationship or mapping procedure to map terms from computer accessible benefits to concept IDs;

obtaining a first interest profile containing references to a first set of sub-topics, topics or domains from a first generalized actor;

using the first interest profile to infer a first set of interests the interests of the first generalized actor as represented by terms or concept IDs;

obtaining a second interest profile containing references to a second set of sub-topics, topics or domains from a second generalized actor;

using the second interest profile to infer a second set of interests of the second generalized actor as represented by terms or concept IDs;

performing matching or association between the a first set of interests and the second set of interests;

using the degree of matching or association between the a first set of interests and the second set of interests to explicitly inform the first generalized actor or the second generalized actor; and optionally using the degree of matching or association between the a first set of interests and the second set of interests to implicitly inform the first generalized actor or the second generalized actor.

Important aspects of the instant invention can be described in the following ways: Distributed decentralized, scalable, social development of COIs, VIGs for query understanding and information routing, concept space organization for domain knowledge, maintenance of confidentiality, security, and IP ownership even in social innovation contexts.

Note that in the following discussion, the word "processor" is used in a generic sense, which indicates merely the ability to execute computer language instructions. The processor can actually be implemented as a virtual machine, and the computer implemented steps can be executed within either a "heavyweight" process or a thread running on such a machine or processor. Computer architectures are moving increasingly to multiple processor approaches, exploiting MPP, and SMP, cluster, grid approaches, and multi-cpu cores, thus allowing software systems that can exploit these architectures to become increasingly practical for business, scientific, and consumer applications.

Distributed Processing

COPO can be applied as a processes distributed over multiple processors, either locally or remotely or both. COPO allows the number of controller processes to be expanded to provide control over any number of processes, and also serves to fan control from management processes and agents and to funnel results to the appropriate communities of interest. In a preferred embodiment, a multi-agent system provides mechanisms for decentralized distributed processing of COPO processes, along with appropriate authorization ownership and control of artifacts and services. All of the processor-intensive operations of COPO can be distributed over an arbitrary number of processors. For example, if each agent communicates with five other agents, and there are three cascaded layers of such agents involved in the processing, then thirty one total agents can be invoked, each running on a separate CPU, VM, or thread machine.

Distributed Processing Through Grid Computing and Special Purpose Parallel Computing.

Grid computing architectures employ multiple separate computers' resources connected by a network, such as an intranet and/or the Internet, to execute large-scale computational tasks by modeling a virtual computer architecture. Grids provide a framework for performing computations on large data sets, and can perform many operations by division of labor between the member processors. Grid technology supports flexible computational provisioning beyond the local (home) administrative domain. The invention can also exploit additional special purpose computing resources such as single instruction, single data stream (SISD) computers, multiple instruction, single data stream (MISD) computers, single instruction, multiple data streams (SIMD) computers, multiple instruction, multiple data streams (MIMD) computers, and single program, multiple data streams (SPMD) computer architectures, and can exploit arbitrary heterogeneous combinations of specialized parallel computing systems and general-purpose computers.

Communication links afforded by the Internet led to resource and information sharing between large computer centers and access by disparate users.

GLOSSARY OF TERMS

Data warehousing: The practice of collecting identified data from divergent, remote, data sources into a central location, wherein the date is described by a single body of metadata.

Clustering: The practice of placing like entities within identified classes.

Cognitive investment: The amount of time activity, or money a user has made in a particular are of interest.

Computer-accessible artifact (CAA): An item of information, media, work, etc. that can be stored, accessed, and communicated by a computer.

Computer-accessible benefit (CAB): An item of information, a good, a service, a work, an opportunity, or a connection to a generalized actor or to another computer-accessible benefit.

Concept ID—an identifier of concept IDs that is independent of terminology.

Controlled vocabulary: A vocabulary that is limited to a (usually small) set of pre-defined terms, often chosen to provide simple indexing and to avoid ambiguity.

Convergent crawling—alternating search and crawling directed to satisfying a particular information goal.

Data Mining, Knowledge Discovery: The practice of searching stores of data for information, knowledge, data or patterns, specifically for the non-trivial extraction of useful information incorporating computational techniques from statistics, machine learning, pattern recognition and artificial intelligence.

Data source: An accessible repository or generator of data, such as a database, simulation, or sensor stream, typically in a structured format such as a CSV, flat-file, relational database, network database, delimited structure, index file, data file, document collection, web-site or database.

Emergent knowledge: New knowledge items that is generated, uncovered, or perceived as a consequence of processes or system operations that did not have discovery of those particular items as explicit design goals or requests.

Folksonomy: a user-generated taxonomy typically used to categorize and retrieve content such as web pages, photographs and web links. Often these taxonomies are extremely shallow, and are constructed by social tagging of items.

Generalized actor—generalized actor—one user or a group of users, or a group of users and software agents, or a computational entity acting in the role of a user, which behaves in a consistent way to achieve some goal.

Heterogeneous data sources: Data sources exhibiting distinct data structures

Knowledge: Data which is deemed useful by a user, either by content or by structure.

Mathematical Model: A representation of variables and dependencies among the variables as mathematical functions or relations.

Order(N) Canonical method—a rule or set of rules that deterministically produce a unique output for all equivalent inputs, that can be computed in Order(N) time and stored in Order(N) space.

Outsemble—ensemble that seeks appropriate outside resources for ensemble formation Pharmaceutical Research, Pharmaceutical Researchers (PHARMR): Research, and researchers with a goal of creating or improving therapeutic drugs.

Scalability: The ability of a computer system, architecture, network or process which allows it to pragmatically meet demands for larger amounts of processing by use of additional processors, memory, and connectivity.

Virtual interest groups (VIG): A group of software systems or processes that plays the role of an interest group in filtering, collecting, sensing, maintaining, and forwarding information or computer accessible artifacts regarding a particular domain of interest.

BRIEF DESCRIPTION OF THE DRAWINGS

FIG. 1 shows the COPO system behavior, at a high level of abstraction. T

FIG. 2 depicts two COPO example use cases.

FIG. 3 illustrates maintenance of concept space.

FIG. 4 outlines the handling of actor requests.

FIG. 5 portray the management of actor contributions.

FIG. 6 illustrates the provisioning of computer accessible benefit s.

FIG. 7 shows the maintenance of generalized actor profiles.

FIG. 8 portrays two examples of typical COPO configurations.

FIG. 9 outlines the induction of concept organization from existing bodies of concepts.

FIG. 10 depicts concept nodes induced from various representations.

FIG. 11 illustrates the organization of concept spaces.

FIG. 12 portrays a concept-centric view of relations in a concept-space.

FIG. 13 provides an example of an evolved concept-space organization.

FIG. 14 illustrates concept space releases and concept space differencing.

FIG. 15 shows concept space initialization, bootstrapping, and evolution.

FIG. 16 outlines decentralized provisioning of terms, concepts, virtual interest groups (VIGs), and computer accessible benefit s (computer accessible benefits).

FIG. 17 portrays virtual interest groups (VIGs) supporting communities of interest (COIs).

FIG. 18 provides examples of hardware deployment of concept spaces, VIGs, and COIs.

FIG. 19 depicts the rational agents, with a stack of capabilities supporting composition, scalability and robustness.

FIG. 20 illustrates agent-based representation, intermediation supporting the collaboration portal.

FIG. 21 shows the structure and aggregation of virtual information chromosomes (VIChromes).

FIG. 22 outlines agent support for maintenance of a network of VIChromes.

FIG. 23 outlines an example of inferred provenance for artifacts.

FIG. 24 provides an explanation of Dempster Shafer theory and evidential intervals for information qualities.

FIG. 25 illustrates belief calculus applied to information qualities.

FIG. 26 outlines stages of concept space initialization.

FIG. 27 portrays concept space bootstrapping and evolution.

FIG. 28 shows an example of COPO applied to the pharmaceutical research domain.

FIG. 29 depicts an example of COPO applied to a software engineer's interface to a software repository.

FIG. 30 outlines some of the main objects, services and interface items of the software engineer's COPO.

FIG. 31 illustrates an example of COPO dedicated to requests for proposal in the domain of information technology for energy generation.

FIG. 32 portrays an example of the Terminology Spectrum, with terminological elements ranked by their in-domain salience.

FIG. 33 shows an example of domain differencing—using an salience derived from unbiased artifacts to determine the terminology that is unique to a domain. COPO dedicated to requests for proposal in the domain of information technology for energy generation.

FIG. 34 illustrates an example of terminology extraction, and the building of tuples for signatures.

FIG. 35 presents an example of tuple comparison using singleton, combination, permutation (SCP) vectors.

FIG. 36 shows an example of using Information Retrieval (IR) metrics on singleton, combination, permutation (SCP) comparisons, in the Pandemic Influenza (PI) domain.

FIG. 37 illustrates an example of learning of optimal acceptance thresholds.

FIG. 38 shows an example of learning significant fields of arbitrary web sources.

FIG. 39 illustrates an example of building query a formatter for arbitrary web source.

FIG. 40 illustrates an example of bootstrapping domain terminology and concepts.

FIG. 41 provides an example of tuples from the pandemic influenza (PI) domain.

FIG. 42 shows an example of using the terminology spectrum for scalable routing.

DETAILED DESCRIPTION OF THE INVENTION

Outline of the Description

The detailed description is organized as follows. First, role of COPO in the overall collaborative activities is discussed. Next, the major functioning of a preferred embodiment of the system is described. Afterward, functions and methodology used in the major components COPO are presented. Examples of some particularly central component and technologies and of some particularly important embodiments are described in detail. Then, several example applications will be described, including a demonstration of how the major components participate in the achieving a computer accessible benefit for a generalized actor. Throughout the description, scaleable processing, accomplished in parallel on separate processors will be highlighted. Lastly, a summary of the major technical aspects of the invention will be provided.

Note that the figures depict information flow and major tasks of a preferred embodiment of the invention. However, in most cases, alternate ordering of steps would also be effective for the tasks, thus the diagrams, and especially the ordering of activities within the diagrams, should be considered as exemplary, and not limiting regarding the scope of the invention.

The invention is intended to be used in both partially automated and fully automated circumstances, and offers many opportunities for interaction with users or other processing systems. In every case, the interactive steps can be skipped completely, (by suitable pre-selection via parameters or scripts) can be satisfied via interaction with one or more users, or can be satisfied via interaction with one or more external processing systems. For instance, a scientist's (human or software) assistant (acting as generalized actor) can invoke COPO to find papers relevant to that scientist's recent data or annotations, or the scientist may interact with a COPO portal directly. Because there are such a wide variety of actors (both human entities and software entities, both single and multiple) we will refer to all members of that group as "the Generalized Actor" (abbreviated generalized actor)—who can be one or more human users (perhaps a group of experts sharing an interest, or joining to work on a task) as well as one or more computer systems which have reason to interact with COPO. In practice, the generalized actor can make queries and requests, supply parameters, make choices, review partial, or intermediate, or final results, and apply the results to applications of their choosing.

COPO Role and Design Rationale

FIG. 1 shows the COPO system behavior, at a high level of abstraction. The first activity, Ref. 101 is to maintain the extended concept space, which will be detailed later in this specification. The second activity, reg 102, is to accept generalized actor requests, which, as has been mentioned represent requests of one or more entities, or software systems that behave in the role of such entities. Ref. 104 Provides computer accessible benefit s for generalized actors, including answers to queries, directed information, contacts with other generalized actors, opportunities, etc. Ref. 105 represents the maintenance of interest profiles for generalized actors. Such interest profiles provide the mechanism whereby the interests of the generalized actor can exploit the concept space to obtain appropriate computer accessible benefits.

FIG. 2 depicts two example use cases of the collaboration portal. In the first case, $User_1$ Ref. 201 interacts with $COPO_A$ Ref. 202 in the following ways. He joins a community of interest, contributes (computer accessible benefits) through that COI, and acts to maintain the COI. All three of the activities also use the current extended concept space, and maintenance of the community of interest also involves maintenance of the extended concept space. $User_2$ Ref. 203 interacts with the same community of interest, performing the same types of actions as 201. This is an example of a collaborative portal maintained by users acting as peers. Note that other examples of the preferred embodiment would include different authorities and capabilities for different users, but typically there is at least some sharing of control and of contribution in COPO systems. The second example shows a particular case in which not all users of the system act as peers. User2 Ref. 204 acts similarly to the users in the first example: joining, contributing to, and maintaining a COI. At the same time, a COI Administrator Ref. 206 manages the COI itself. This is a typical use when commercial interests or formal organizations are responsible for the COI. At the same time, the 206 or 204 or an external concept $maintainer_4$ Ref. 207 may maintain some or all of the extended concept space. Note that all three parties may jointly maintain some or all of the extended concept space, and that 207 may, indeed be a user of a different COI that uses an overlapping extended concept space.

FIG. 3 illustrates the main activities involved in maintenance of the extended concept space. Ref. 301 obtains new relevant concepts and concept linkages. These concepts and linkages can be drawn from many sources, including generalized actors, new artifacts, other concept systems, folksonomies, and authoritative sources of concepts and relations such as taxonomies and ontologies. Ref. 302 Updates associations of concepts in the concept space. As new concepts are added, or links among concepts are strengthened or weakened, the representation of associations among the concepts must be adapted. Ref. 303 updates the mapping of concepts to actor contexts. This change can be driven by either changes in the concepts, changes in the actor contexts, or both. Ref. 304 Re-evaluates pending requests. In some cases, requests that could not be previously satisfied can now be fulfilled because new concepts, associations, or mappings have provided newly sufficient information. Similarly, Ref. 305 re-evaluates "standing" or persistent requests. An example of a persistent request is a request by a generalized actor to be notified of any new publication in a domain, such as chemotherapeutic drugs based on VEGF-inhibition of adenocarcinoma.

FIG. 4 outlines the handling of actor requests. Ref. 401 obtains a request from a generalized actor. Note that requests can involve searches for information, messages to other generalized actors (known or unknown) offers to buy or sell goods or services, etc. Ref. 402 obtains the request context from the generalized actor profile. The generalized actor's profile includes their historical interests, recent requests, and any communities, terms, concepts, or interests that they have deliberately included in the general profile. Ref. 403 obtains the generalized actor explicit context for this particular request. Though the per-request context may be empty, users can specify specific profile features for a given request, and those features are taken to override the historical profile features. An example of such an explicit context would be for a Pharmacological researcher who's typical domain of interest is ligand binding systems to issue a request using the profile he would have, if his domain of interest were Evolutionary Genomics. Ref. 403 builds an interpretation of the request. The actual mechanism of a request may have many forms, including: entry of natural language; use of keywords; selection of menu items; aggregation of icons; or the designation of representative or computer accessible benefits artifacts, or components of such representatives. The sub-system of Ref. 505 obtains the required authorities and permissions to attempt to satisfy the generalized actors request. Note that generalized actors may choose that all requests are made with some default set of authorities and permissions, or they may mandate specific ones for a particular request. For instance, some online document services such as "Science Direct" require identification and payment for articles. A researcher may prefer to access only free artifacts in most cases, but may spurge for a particularly important or time-critical request. Note that not all computer accessible benefits are artifacts. For instance, one computer accessible benefit can be the assistance of another generalized actor who provides information or explanation services for free or for a fee. Still another arrangement would make the pooled talents of generalized actors available to service a request, but maintain a request account balance, that compensates generalized actors who provide a disproportionate amount of assistance with funds from the generalized actors who provide a disproportionate share of requests.

FIG. 5 portrays the management of actor contributions. The subsystem of Ref. 501 accepts generalized actor contributions. These contributions provide much of the utility of computer accessible benefits enjoyed by users of the system. Typical contributions include: artifacts such as documents, images, data, audio and video; static and interactive tutorials; models and other abstractions useful for imparting knowledge and prediction; services offered to particular or general participants; and reorganization of the existing extended concept space. Ref. 502 obtains the generalized actors contribution context. It is important to annotate any contribution with appropriate references to the extended context space, so that it can be found by interested parties. For instance, a document contributed by a pharmaceutical research scientist working in the area of small molecule inhibitors of angiogenesis would typically be of interest to other users with similar roles (scientific research) and domain interests. Ref. 503 encapsulates required authorities and permissions needed to access the contribution. For instance, a contributor can require payment for the contributed computer accessible benefit, or may limit the access of the computer accessible benefit to a subset of the interested generalized actors. Additionally, organization-wide requirements can be added at this stage to maintain policies such as control of intellectual property. Subsystem Ref. 504 publishes the representation or reference of the contribution so that it becomes available to the appropriate communities of interest.

FIG. 6 illustrates the provisioning of computer accessible benefit s. Subsystem Ref. 601 obtains contribution representations and references. Note that typically computer accessible benefits are a mixture of immediate representations (such as documents, web pages, reports, graphs, etc. and indirect references to other benefits, such as the locations of artifacts (e.g. URIs of such artifacts) email addresses, phone numbers, or chat names of generalized actors, and contact information for organizations. Ref. 602 matches contributions to the actors' requests, context, and interest. This matching uses information provided with the generalized actor's profile, the particular request, and mapping of the generalized actor's community of interest to the extended concept space to find computer accessible benefits that will satisfy the request. Subsystem Ref. 603 checks the authorities and permissions required for the various computer accessible benefits that match the generalized actor's request. For instance, a document that satisfies a particular users request may require him to provide a user identification and payment for access. Such a document would typically be provided as an indirect reference (such as a URI of the publisher's page for the document) rather than as an immediate representation. However, in the preferred embodiment it is possible for the generalized actor to grant his interface to the portal the authority to use his identification and account information to obtain such artifacts directly. This ability also extends to services, including the ability to contract with a second generalized actor to provide services on the behalf of a first one. Ref. 604 notifies the generalized actor of the computer accessible benefits that have been obtained on their behalf. In some cases (such as requests for information) the set of computer accessible benefits is extensive. In a preferred embodiment, for default conditions, the computer accessible benefits are organized in order of relevance (as determined by the match in Ref. 602) to the generalized actors request. The generalized actor may also directly select one or more additional criteria for ordering of results, such as listing the computer accessible benefits in an order inverse to their (known or estimated) costs, listing them in order of the reputation or quality of their sources, listing them in order of the time or estimated time required to obtain the indirect portion of the computer accessible benefit, and listing them in order with the generalized actor's historical satisfaction with computer accessible benefits from the same source. Obviously, many other criteria could be applied to such rankings, some of them specialized for a particular field. For instance, in the case of PHARMR, documents matching an information request can be ranked by the ratings of the publication that published them, or by the reputation of the editorial staff of such a publication. Some PHARMRs can require that clinical studies are preferred over other in-vitro or in-silico studies.

FIG. 7 shows the maintenance of generalized actor profiles. Subsystem Ref. 701 obtains explicit profile information from the generalized actor. In a preferred embodiment, this information may be obtained by the act of filling out a questionnaire, or by the generalized actor using an editor to the profile, or, in the simplest cases, by virtue of a generalized actor joining a particular community of interest. Ref. 702 augments the actor profile with items from concept space. Concept space annotations of the profile convert local, possibly non-standard terminology to standardized representation of interest. In Ref. 703, the system informs the generalized actor of any changes that have been made to the profile, and of the interpretations being made to convert the profile terminology to concept space identifiers. Ref. 704 obtains actor modifications to the profile information. This subsystem allows the generalized actor to correct any erroneous mappings made on his behalf. Additionally, where several interpretations of profile elements are possible, the system provides a list of the alternatives, as well as the automatically-chosen interpretation, so that the generalized actor can choose within an appropriate set. In the preferred embodiment, the generalized actor has an options to always make interpretations automatically, to always ask for the user's interpretation, or make interpretations automatically when the likelihood that they are unambiguous exceeds a threshold on the [0 . . . 1] interval.

FIG. 8 portrays two examples of typical COPO configurations. In the first example configuration, generalized actor 801 uses an interface (typically a local interface, such as a web-browser) Ref. 802 to interact with their profile Ref. 803, and with the collaboration portal Ref. 804. The Profile provides information to the collaboration portal indirectly, through interactions with the interface Ref. 802. For any given interaction, the interface annotates the interaction with the current point of view Ref. 805 $POV_1$, which consists of the default POV for the current community of interest, the generalized actor's current set of interests, the generalized actor's current role in performing the interaction, their historical interests, their session interests, the interests expressed in their last interaction, and any explicit POV choices such as a reference to a standard POV such as "ligand-binding-expert"

or "apoptosis expert". The collaboration portal Ref. 804 then uses the POV to construct matches of items in the extended concept space Ref. 806, and uses those matches to identify appropriate computer accessible benefit Sources Ref. 807. Ref. 804 then provides computer accessible benefit artifacts and indirect references to the generalized actor 801 though the interface Ref. 802. In the second example configuration, generalized actor 808 uses a combined interface and collaboration portal Ref. 809 (such as a web browser with COPO services added as a plug-in) to interact with their profile Ref. 810, with the extended concept space Ref. 806, and with the computer accessible benefit services Ref. 807. The COPO components match elements of $POV_2$ Ref. 811 to items in the extended concept space Ref. 806, and then use those matches to identify appropriate computer accessible benefit Sources Ref. 807. Ref. 809 then provides computer accessible benefit artifacts and indirect references to the generalized actor 808. In preferred embodiments, there are many alternative implementations of both the first and second example configuration. Either might be implemented with conventional client-server software approaches, with SOA service protocols, with dedicated proprietary interfaces, and may use local or remote databases, distributed databases, or data warehouses. A particularly useful preferred embodiment of COPO is a version of the client-based system Ref. 809 where the client performs continuous transparent tracking of interests tracing via sub-component Ref. 112 Implicit Interest Capture. This component tracks activities and requests as the generalized actor interacts with the portal, and uses the resulting information to infer the identity and degree of user-interest in particular domains and concepts, and to infer the current role of the generalized actor. In a preferred embodiment, system model generalized actor interest by mapping current choices into a 4-element interest tuple $t_i=(W_i, C_i, D_i, R_i)$, where: $W_i$ is the Weight of the tuple—which indicates the strength of the current interest; $C_i$, is the Concept of the current interest; $D_i$, is the Domain interest; and $R_i$ is role of the generalized actor with respect to the current interest. A series of such tuples are used to project the generalized actors aggregate interests. COPO constructs limited-length queues of aggregate tuples, wherein a particular tuple's weight is updated every time a matching is asserted as the current interest. The weight of the current tuple is determined by how much cognitive investment the generalized actor has made in the current tuple. In a preferred embodiment the cognitive investment is computed as $(\Delta t)\, R_1+(\text{Keystrokes})\, R_2+(\text{Interface-Choices})\, R_3+(\text{actual known interaction costs})$, where $\Delta t$ is the amount of time spent on an identifiable interest—that is, a $(C_i, D_i, R_i)$ combination, and $R_1$ is an hourly rate in $ per hour, $R_2$ is a rate of $ per keystroke, and $R_3$ is a rate of $ per choice. The cognitive investment formula recognizes that both time and effort are worth money. In a preferred embodiment, $R_1$ is typically chosen to be the cost of the generalized actor, including overhead, and $R_2$ is typically initialized at $R_1/1200$, and $R_3$ is initialized at $R_1/60$. The R2 and R3 rates are then adapted over time, taking R1 as a normalizer, and dynamically maintaining $R_1$ as the average Keystrokes per hour, and R2 as the average Interface-Choices per hour. In a preferred embodiment, the rates are updated every 10 minutes, but use a very slowly changing exponentially weighted moving average formula: $Rx_{x,t}=\alpha_R R_{x,n}+(1-\alpha_R) R_{x,(t-1)}$; where $R_{x,t}$ is the moving average of rate $R_x$ at time t, $R_{x,n}$ is the measured rate of $R_x$ over the last time increment, and $R_{x,(t-1)}$ is the exponentially weighted moving average for $R_x$. In a preferred embodiment, $\alpha_R$ is set to be 0.03, so the rates change very slowly over time. Also, in a preferred embodiment, the generalized actor may manually set the $R_1$, $R_2$, and $R_3$ rates temporarily or permanently. Many other ranges of values for $\alpha_R$ may be used, successfully for various users, domains, and activities, including $1>\alpha_R\geq 0.7$; $0.7>\alpha_R\geq 0.3$; $0.3>\alpha_R\geq 0.1$; $0.1>\alpha_R\geq 0.06$; $0.06>\alpha_R\geq 0.01$; and $0.01>\alpha_R\geq 0.001$. In another preferred embodiment, the rates are taken using typical industry averages for the type of work being performed by the generalized actor. In another preferred embodiment the predicted rates are averaged over the set of COPO users who share similar interests. Note that in a preferred embodiment the "times" used to update tuples can refer to discrete interactions with the system, rather than chronological time, but an alternate preferred embodiment uses the actual "wall clock" time to update the aggregate tuples.

In a preferred embodiment, the weights of each aggregate tuple in the queue are maintained by as an exponentially weighted moving average, where $W_t=\alpha W_n+(1-\alpha)\, W_{(t-1)}$. That is, the aggregate tuple weight at time t is computed as a times the new weight, plus (1−alpha) times the aggregate tuple weight at time (t−1). In a preferred embodiment, the system maintains three versions of the queues, with three values for alpha $q_1$ uses $\alpha=0.7$, and tracks quickly changing interests. The second queue, with $\alpha=0.4$, tracks interests that change at a medium rate, while the third queue, with $\alpha=0.1$, tracks very slowly changing interests. In an alternative embodiment, and adaptive weighting scheme can be used, where the weights are varied to provide the best sort, medium, and long-term predictors of generalized actor interest. In another alternative embodiment the best predictors from a number of generalized actors with similar interests are used. Some motivations for using multiple generalized actors' data is that the data may be less noisy (when aggregated) than the data from a single user, and that some groups of generalized actors may even be identified as leading indicators who are more predictive of current and future choices. In another alternative, users may choose to have their interest models to be explicitly composed of the models of other users or groups of users. For interest, a financial analyst who tracks the cancer drugs in the Pharmaceutical Industry can elect to use an interest model composed of his own interests and the interests of (a) University researchers who explore the mechanisms responsible for neoplastic cell populations, and (b) clinicians, who are concerned with effective drug combinations that do not cause unacceptable side-effects. In a preferred embodiment, many different strata or clusters of user interest can be modeled, including the interests of expert-users, the interests of typical users, the interests of similar users, the historical interests of same user, the interests of the same user over a session of interaction, and the interests of the user within a particular focus or transaction.

Many existing systems require users to explicitly aggregate or add metadata to websites, images, documents, etc. with regard to some domain of interest. Two examples of such systems are del.icio.us—which requires users to tag particular URLs, and digg.com—which relies on users to submit news items. This social markup would be far more effective if a greater number of users actually participated, if they marked more of the content available, and if they could be qualified with respect to the domains where they supply meta-data. A preferred embodiment approach addresses this limitation by continuously and implicitly capturing user interest without requiring explicit choices. Because users can be qualified by explicit credentials (certifications, professional qualifications etc.) and by implicit credentials (friend-of-a-friend ratings, rater-the-rater scores) the choices that they make can be qualified with respect to relevant domains of interest. Additionally, in a preferred embodiment, the degree of interest is captured by observation of the generalized actor's cognitive investment, in terms of time, actions, and choices. Alternate embodiments can make use of additional indicators of generalized actor investment, including unintentional signaling such as eye movement and fixation, heartbeat, and changes in brain activity, as measured by oxygenation or by magnetic resonance imaging. Many other approaches to implicitly gauging the user's cognitive investment are possible, given a wide array of sensor technologies, and would be appropriate for at least some embodiments of the invention.

FIG. 9 outlines the induction of concept organization from existing bodies of concepts. Many different representations and of concepts are typically available, both on the web, within organizations and even within file systems and user directories. COPO's concept induction approach is designed to exploit virtually any available concept representations, to preserve well-defined formal concepts and relationships found in expert's repositories while at the same time absorbing informal or probabilistic concept linkages found in the vast majority of concept bodies. Ref. 901 depicts the main varieties of existing representations that are induced into the concept space. In each case of the example, two concepts, $c_1$ and $c_2$ are mentioned, but that is not limiting on the representations encountered in the existing body of concepts. All general relations of among any number of concepts may be induced by the system, and some relations, such as predicates (which are functions that return a Boolean value) may have any natural number of arguments, including zero arguments. The most generic representation is $Rel(c_1, c_2)$, and represents an arbitrary relation that relates two concepts. Typical relations found in bodies of concepts include "is-a" relationships, "a-kind-of", and subclass relationships which are found in semantic networks, frame systems and faceted taxonomies. Other relations are non-hierarchical (e.g. sibling-of) and still others (description of) may have no particular conceptual "location" versus their arguments. All functions can be represented by the general relational representation, but a particularly common function is the predicate, represented as $Pred (c_1, c_2)$, which returns a true or false value. Another special type of function, represented as $Pr(c_1|c_2)$, is the probability of one item, based on the value of another. A less formal, but very ubiquitous relationship, is the link (such as a URL, a URI, a namespace mention, a source-code "include" statement, a windows short-cut, or a Unix/Linux symbolic link) that comprises a reference from one concept (or set of concepts) to another. A last example of ubiquitous concept relationships is the co-resident relationship $\overline{c_1\ c_2}$ which indicates that $c_1$ and $c_2$ share the same container. In many information retrieval approaches, the co-resident relationship is used to infer a probabilistic function. For instance, if two unusual words are frequently co-resident, then the system can construct a probabilistic model of the likelihood of finding the second concept, given the presence of the first. It should be mentioned that the existing body of concepts is not always directly available for all domains. In some cases, domain artifacts, such as documents, or even audio, images and video must be processed to extract the relevant body of concepts. Many schemes for such extraction exist, including text extractors, speech-understanding systems, edge-detection, object-recognition, and face recognition systems, scene recognition and video-markup systems, which can be used to create bodies of concepts from domain artifacts. Related concepts are converted to a standard representation by the concept induction system Ref. 902, resulting in a concept representation linked to a particular domain $D_m$ Ref. 903. The sets of related concepts are organized into an extended concept space for $D_m$ Ref. 904. This extended concept space can then be used to construct matches for particular concepts for that domain, given a particular POV $P_k$. This matching provides an intermediate organization Ref. 905 that gives the collaboration portal Ref. 906 the ability to find appropriate artifacts and other computer accessible benefits that are available to the generalized actor. Note that the concepts induced by Ref. 903 can provide referential power far beyond finding the artifacts that were used to generate the initial body of concepts, as those relationships often indicate a much larger universe of appropriate computer accessible benefits.

FIG. 10 depicts concept nodes induced from various example representations. In a in each case, a central relationship depicted by an oval, points to a set of concepts, each concept depicted by a rectangle. In the case of Ref. 1101, a general relation points to concepts $C_1$ through $C_n$. In the case of the predicate Ref. 1103, a Boolean function points to concepts $C_1$ through $C_n$, and also to a true/false output. Note that a different formulation would include the truth values in the set of concepts $C_1 \ldots C_n$. The truth values are distinguished in the COPO representation because they are added to the predicate representation even if they do not explicitly exist in the original body of concepts from which the predicate is drawn. Similarly the probability relationship Ref. 1003 is translated to a Pr relation linking the concept arguments to a probability function output of Low Medium, and High. This output is only one representative example of many translations that are appropriate for various domains considered by the present invention. For instance, an alternate set of statistical outputs consists of: "Statistically significant at the 95% Confidence Interval"; and: "Not Statistically significant at the 95% Confidence Interval". There are many other useful mappings of probability to discrete statements, and similarly, many other mappings of general quantitative values to discrete qualitative outputs. For instance, Fuzzy Logic representations of relations can map a quantitative representation of the membership of an item to a fuzzy set (say, the membership of "aspirin" into the set of "safe pharmaceuticals" into qualitative values such as "slightly safe" or "very safe". These other mappings are consistent with the preferred embodiment's representation of concepts and relations. Note that an alternative preferred embodiment also represents continuous values as concepts in relations and/or outputs of functions within the COPO representation. These are especially useful in particular quantitative domains, such as number theory, where even quantitatively small numeric differences are sometimes significant. In such a domain, integer and rational numbers can be represented directly and exactly, while irrationals and transcendental numbers are represented by a combination of real approximation, and symbolic reference. There are existing methods for mapping arbitrary values to symbolic representations, such as that used by the inverse symbolic calculator: http://oldweb.cecm.sfu.ca/projects/ISC/ISCmain.html—which maps the approximation 3.14159265358979323846264338327988 to the symbolic representation: "1/pi". Using such an approach, even real-valued continuous outputs can be recognized as concepts, and those concepts can be organized with regard to the relations and functions in which they participate.

FIG. 11 illustrates the organization of concept spaces. Ref. 1101 shows relation $Rel_m$ which relates concepts $C_1$ and $C_2$. A related relation $Rel_j$ Ref. 1102 relates concepts $C_{1j}$ and $C_{2j}$. The relation that links relation $Rel_m$ to $Rel_j$ is a specialization/generalization relation, which indicates that $Rel_j$ is a specialization of $Rel_m$. Relk Ref. 1103 is also linked to $Rel_m$, by an abstract/concrete link, which indicates that $Rel_k$ is a concrete instance of $Rel_m$. Note that in this system, the original relations, $Rel_m$, $Rel_j$ and $Rel_k$, are reified by the representation system—that is, the relations are treated as concepts, and are related to each other via still other relations. This approach, in which links represent higher level relations, can be repeated recursively to any appropriate level, and provides a powerful and concise way to encode the meanings of concepts and relations. In addition to the explicit relations between Ref. 1101 and Ref. 1102 or between 1101 and Ref. 1103, there is an implicit relation between Ref. 1103 and 1103, in that they are both related to Ref. 1101. Thus, they satisfy the property "relations that are linked to Ref. 1101". Such a linkage can have great significance in some domains and instances, such as the case where Ref. 1102 is an analog for Ref. 1103. Note that the concept-relation linkage representation described is rich enough to encode all of the semantic information represented in formal ontologies, such as SUMO, CYC, and the Gene Ontology, and all of the semantic information represented in thesauri such as Wordnet and Medical Subject Headings (MeSH). At the same time, the COPO representation also supports less formal concept linkages, such as probabilistic and mutual containment relations. The advantage of representing these relations is that they can be inferred from evolving ad hoc collections and linkages such as the linkage among URLs and web pages, or the tags and groupings developed by "folksonomies".

FIG. 12 portrays an example of a concept-centric view of relations in a concept-space. In this case, concept $C_1$ Ref. 1201 is a participant in four relations—$Rel_1$ Ref. 1204, $Rel_2$ Ref. 1205, $Rel_3$ Ref. 1202, and $Rel_4$ Ref. 1203. The point of this depiction is to show that a concept may play the central role, and intrinsically connect any number of relations. This is also an example of an intrinsic linkage among relations, that is, the intrinsic relation of "all relations for which Concept $C_1$ is a participant".

FIG. 13 provides an example of an evolved concept-space organization. In this case, Ref. 1301 depicts a concept grouping, while Ref. 1303 depicts another concept grouping, while Ref. 1302 is a relation that is linked to both grouping 1301 and grouping 1303. There is also a direct linkage Ref. 1305 between a relation in Ref. 1301 and a concept in re 1303. Note that Ref. 1304 depicts a relation that is not linked to any concept grouping, and that Ref. 1306 represents a concept that participates in no relations and is unrelated to any concept grouping. In a preferred embodiment, concept groups are evolved in parallel on any number of computing devices using a discrete network-generation system that clusters highly related concepts together, while controlling the growth of concept groups and re-organizing groups as required by newly acquired concept linkage information. In a preferred embodiment, the evolution of concept groups is accomplished by communication among agents in a multi-agent system (MAS), where each agent consults at least one directory facilitator agent to find the identities of other agents who manage particular concepts or concept groups. In an alternative embodiment, a peer-to-peer communication system is used to scaleably support the evolution of concept groups and communication among such groups. Other, specialized communication approaches, such as the Message Passing Interface (MPI), communication through Uniform Memory Architecture (UMA) memory, or through Non-Uniform Memory Architecture (NUMA) memory can be utilized on specialized commuting platforms.

Concept Space Evolution (CSE)

The concept space is a network composed of concept nodes, edges among the nodes, and groups of nodes. The network has an evolved topology, driven by the particular relatedness among nodes, but the over-all network structure is similar to that of a hypercube. Nodes in the concept space network contain concepts or reified relations, records that describe the source of the concept that the node represents intra-group links to other concepts and optionally extra-group links to other concepts. The concept space network is dynamically organized into groups of related concepts. A concept is a member of a particular group if it is highly related (i.e., has many links) to several members of that group. Therefore, the topology favors mappings between concepts within a group that facilitate short routes to reach every node in that group. Recalling that relations in the COPO representation are reified as additional concepts, in a preferred embodiment, the concept groups are evolved via a scalable discrete spreading-activation method, that proceeds on multiple processors or virtual machines by:

loop until no more concepts can be connected within the given criterion:
  obtain at least a first concept relating a first set of terms;
  obtain at least a second concept relating a second set of terms;
  create at least one first cluster of concepts indicating a set of matching terms between the first concept and the second concept, for a intra-cluster criterion of matching, threshold-ic;
  create a link between the first concept and the second concept, the link being labeled by the matching terms from the first concept and the second concept; creating at least one second cluster of concepts, comprising a third set of terms satisfying the intra-cluster criterion of matching for the second cluster, while not satisfying the intra-cluster criterion of matching for terms in the first cluster; and
  create a link between the first concept cluster and the second concept cluster by terms from the first concept cluster and terms from the second concept cluster that satisfy an extra-cluster linkage criterion, threshold-ec; the link being labeled by the matching terms from the first concept cluster and from the second concept cluster.

In an alternative embodiment, the loop only proceeds until the number of new links falls below a threshold: threshold-ln. In another embodiment a specific number of iterations are performed, where that number accounts for the amount of re-organization that must be accomplished to account for recent changes in concepts concept linkages. Recall that the concept evolution is dynamic and capable of continually adapting to new concept information. In practice, it turns out that an important additional criterion for concept group formation is the velocity of change for particular groups. For instance, terminology for some well-established fields of endeavor, such as anatomy may change very slowly, while terminology in other fields, such as nanotechnology, changes rapidly. In a preferred embodiment, the nodes within groups contain an extra field that maintains their designated (by domain experts) or learned (from previous use of the system) velocity of change. Using this mechanism, quickly changing concepts are reexamined more frequently than slowly changing concepts, and a large portion of the concept spaces is essentially static. In a preferred embodiment, rapidly changing, frequently used groups are migrated to the fastest processors with the fastest communication links (sometimes multiple cores on a single chip, using memory for communication).

Also in a preferred embodiment, evolution of the concept spaces is accomplished in epochs:
  at the beginning of an epoch a signal is relayed to all groups (and subsequently all concepts) to initialize re-organization, in parallel, all intended intra-group changes (addition and deletion of nodes and links) are noted, in parallel, when every participating group has finished assessing its local updates, each node sends messages of the impending change to any non-local nodes that will be affected. (connected by intra-group links), in parallel, as new messages arrive, groups update their local pending changes accordingly, (for instance, a node that is about to become a singleton group because of the deletion of links may actually join a non-local group that has added add ional links to the node), next, all participating nodes synchronize, (that is they ensure that every message regarding updates has been received), next, all groups perform the appropriate updates, having considered their local decisions, and the decisions of all groups within one link distance.

Each epoch allows changes to radiate to an additional group of nodes, until all nodes have been reached. Note that the epoch method provides a deterministic result, as there are no race conditions among the processes that maintain the nodes. On the other hand, if deterministic evolution of the concept space is not an important criterion for some domain, the system can remove the synchronization step, allowing each group to adapt as rapidly as the local processors permit.

Note that there are many useful alternative criteria for thresholding intra-group and inter-group linkages. Each of the alternatives is appropriate for at least some of the various domains, update frequencies, and concept-space uses. These criteria include: number of matches, fraction of matches normalized to the terms in the first concept, fraction of matches normalized to the terms in the second concept, fraction of matches normalized to the terms in two groups; fraction of matches normalized to the terms of all concepts in a cluster of groups, fraction of matches normalized to the terms in two clusters of groups, number of matches weighted by importance of terms, fraction of matches weighted by importance of terms, matches weighted by the inverse of term frequency in an concept group or cluster of concept groups, degree of matches for inexact matching, inverse edit distance, number of matching thesaurus senses, degree of matching thesaurus senses, fraction of lexicon matches, statistical of co-occurrence in corpora, statistical proximity in corpora, schema graph commonality, schema graph compatibility, proportion of satisfied constraints, fraction of weighted satisfied constraints, string similarity, similarity after stemming, description similarity, fraction of shared namespaces, fraction of aligned fragments, and number of standard deviations from the average co-occurrence in corpora; determining the thresholds for intra-group and extra-group criteria cluster dynamically in order to maintaining a given distribution of group sizes; and selecting at least one distribution of group sizes in terms of number of member concepts or number of member terms from the group consisting of, where the distribution is at least one selected from the normal distribution, Poisson distribution, Dirichlet distribution, and power-law distribution.

FIG. 14 illustrates concept space releases and concept space differencing. In a preferred embodiment, external processes (including services offered to generalized actors) are never access a version of the concept space that is in between revisions. For instance, all queries to the concept space are made to Ref. 1401 Release. 1.2.3 until Ref. 1402 Release 1.2.4 is completely available. All of the changes that are required to transform one release to another are made on an "invisible" version of the concept space, and that new release is not made visible until all modifications are completed. Ref. 1403 shows a series of modifications that are accomplished in the transformation. In an alternative embodiment, this restriction that all changes are completed is dropped, to provide a more robust system in cases of unreliable processors or communication. Relatively specialized concept spaces, running on local clusters can easily accommodate "crisp" revisions, while users of very large concept spaces running in a widely distributed environment can specify a preference for robustness, at the cost of deterministic processes.

FIG. 15 shows concept space initialization, bootstrapping, and evolution. In the initialization phase, Ref. 1501, authoritative bodies of knowledge are inducted to create a preliminary set of concepts and concept-groups. Prototypical queries are also constructed, that contain concepts from the authoritative sources. In Ref. 1502, bootstrapping is performed to prepare the concept space for use by generalized actors. In this phase, interests in concept combinations are simulated and newly available concepts and linkages are added, to anticipate the groups that would be most useful in the steady-state phase. Note that a curator may review the concept groups and make manual changes and assignments at any of the three stages, but curators are typically the most active in the bootstrapping phase. Finally, in the evolution phase, Ref. 1503, changes in the concept space are driven by actual user interaction and by the continual arrival of additional information.

FIG. 16 outlines decentralized provisioning of terms, concepts, virtual interest groups (VIGs), and computer accessible benefit s (computer accessible benefits). Terms Ref. 1601 used by a generalized actor, typically within a COI, are translated to concepts by a term-concept mapper Ref. 1602, resulting in a vector of concepts, Ref. 1603. A general thesaurus, such as wordnet, or a domain-specific one, such as MeSH, can provide the term-to-concept mapping. Note that there can be a many-to-many map between terms and concepts, more than one term can map to the same concept, and a single term can map to multiple concepts. Concepts from the vector Ref. 1603 are linked to virtual interest groups (VIGs) Ref. 1607. Virtual interest groups represent organization of concepts that are driven by user choices, rather than any necessary intrinsic relationship among the concepts, and they are organized over time to reflect the related groups of interests of generalized actors. A VIG Ref. such as $G_1$ Ref. 1604 can refer to another VIG $G_j$ Ref. 1606. Or as shown with $G_k$ ref1605, the VIG can refer directly to some concept in concept space, Ref. 1608. VIGs can be used for bi-directional information flow—they can be used to direct queries to the appropriate resources, and they can also be used in an "intelligent push" direction, to route appropriate information to the correct COIs and/or generalized actors. Note that the VIGs can be running on any collection of processors or virtual machines, communicating with concept groups Ref. 1609, running on any collection of processors or virtual machines, which can be accessing computer accessible benefits Ref. 1610 which are running on any collection of processors or virtual machines. The entire value chain from the computer accessible benefit to a generalized actor can be accomplished in a distributed decentralized environment, to provide scalability, robustness, and appropriate domain control over information. In a preferred embodiment, the terms used in 1601 are given by generalized actors, the concepts of 1603 are drawn from standard thesauri, and the particular concepts of 1608 and 1609 are drawn from actual domain terminology—so all of these representations have a clear a-priori nomenclature. On the other hand, the VIGs and Concept Groups are both evolved representations, and may have no particular identifiable names. Thus, a preferred embodiment uses the most informative groups of concepts within the VIGs and within the concept groups to label those representations for review by generalized actors. Typically, a curator may amend these automatically generated labels where appropriate. Terms in the labels for concept groups and VIGs are chosen for their relative uniqueness, both with respect to all of the terms in the domain, and to the particular terms used as labels in other VIGs or concept groups.

In a preferred embodiment, continual decentralized evolution of VIGs proceeds as follows:

initialize:
  Designate a set of "sink" concepts that will form targets for routing, and act as sensors to determine when acceptable concept organizations have been constructed.
  Designate a set of "source" concepts that will initially route information thought the concept network.
  A minimal number of links and concept groups are constructed according to any heuristic (random grouping and linkage may be used if there is no a prioi organization).
loop:
  Use the existing network to route a sample set of computer accessible benefit items (typically documents), recording each node and arc that each document visited.
  If the information retrieval metric is satisfied (typically, F1 Score<threshold-A) then the network is satisfactory, stop.
  For each misrouted item, feed the "−Error" back to every arc and node involved in the route (where "Error" quantifies the degree of mismatch).
  For each correctly labeled document, feed "+Correct" back to every and node involved in the route (where "+Correct" quantifies the degree of the match).
  For each missing document (each document that reached no sinks) feed a "request (terms of document)" to all nodes that have touched that document
  For any node N with R>thresh-g requests, introduce R/thresh-g a new internal nodes, each with a [R/thresh-g]-sized random subsets of N's concepts.
  Remove any nodes that for which the accumulated (Correct−Error)<threshold-n.
  Remove any remaining arcs for which (Correct−Error) <threshold-a.
  Remove any internal nodes that cannot be reached from a source, or cannot (even indirectly) reach a sink.

Note that many other stopping conditions are possible for various uses, including halting the system after a certain number of iterations, or halting the system when incremental improvements fall below some acceptable level.

FIG. 17 portrays virtual interest groups (VIGs) supporting communities of interest (COIs). A generalized actor Ref. 1701 interacts directly with the terms in a community of interest Ref. 1702. The terms used by generalized actors interacting with the COI are typically achieved by a consensus among the generalized actors who participate in the COI, unless there is a privileged administrator who's role includes maintenance of the terminology. "Behind the scenes" the COI maps the generalized actor's terminology to concepts comprising the VIGs. In turn, the VIGs map their ad-hoc cluster of concepts to the domain-driven concept space. Note that the generalized actor Ref. 1701 may also be a member of another COI Ref. 1703, which may be involved the same VIGs and concepts, or different ones. In a preferred embodiment, the combination of COIs, VIGs and the concept-space comprise the Interest-Concept Mapping (ICM) Service Stack Ref. 1704. It should be noted that alternative embodiments can minimize or even eliminate some elements of this stack, and still fall within the approach of the current invention. For instance, in one variation COIs can map directly to the concept space, while in another, the VIGs would maintain direct referents for computer accessible benefits related to their represented interest areas.

FIG. 18 provides examples of hardware deployment of concept spaces, VIGs, and COIs. generalized actor$_1$ Ref. 1801 is communicating only with a proprietary COI Ref. 1803. This is typical of the case where privacy, money, or intellectual property is at stake, and at least one party requires authentication and control of the content or interaction. Note that even though Ref. 1803 is implemented entirely on a proprietary infrastructure, it may still refer to external resources, such as concept groups in a public infrastructure. An example of such a use is in Pharmaceutical development, where a researcher may be a member of a community of interest that is involved with in-house synthesis and testing of promising drugs. It is vital that information about the drug does not become available to competitors prematurely, but it is also important that the in-house researcher have all of the latest relevant publicly available research on hand. generalized actor$_2$ Ref. 1802 is also using Ref. 1803, but additionally, he is directly participating in a public COI associated with 1805. He is also participating in a COI maintained by a single individual expert, generalized actor$_3$ Ref. 1804.

Rationale of Using a Multi Agent System (MAS) Approach

FIG. 19 depicts the rational agents, with a stack of capabilities supporting composition, scalability and robustness. A few of the usages where MAS approaches are most suitable include: large problems that must be decomposed to solve in reasonable time (such as large concept space organization problems); problems whose solution requires cooperation between different software systems, operating under different authorities (such as on-line negotiations between buyer and seller); problems that require interaction between heterogeneous software entities that were developed independently to solve particular sub-problems (such as the composition of systems-biology analytic or modeling systems); problems that require or work best with some local control or access to resources (such as performing datamining at the data source, rather than requiring all sources to send data to a central destination); problems that require online, anytime, or continual solutions (such as continual planning in anticipation of and reaction to real-world events); and maintaining a continuously available system composed of components that are frequently changed, upgraded, or duplicated (such as a 24/7 data center management system, or an open-ended supply chain controller). In human societies, even the greatest thinkers hold but a fraction of all human knowledge, yet the society they comprise "knows" all accumulated of knowledge. This arrangement is productive only as long as members of the society obey some basic conventions—communicate important breakthroughs, promote due-process reasoning, and allow periodic resetting of goals. A multi-agent system allows individual processing entities to specialize by acting on a subset of all available choices, or using a subset of all approaches to achieve their goals, while the behavior of the entire system achieves a solution to some global problem. In the example of FIG. 19, an agent Ref. 1901 is comprised of layers of capabilities, consisting of a scheduler for scheduling agent tasks, a service manager that manages component services of the agent, and a process manager that coordinates ongoing processes in which the agent is involved. On the communication side, a message transport MTP supports the communication manager, which is responsible for all communication between the agent and other entities. Agents are typically implemented on clusters, grid computers, or compute nodes connected by local area networks Ref. 1902 or broadband connections. Note however, that the autonomy of agent in such systems permits the agents to continue working effectively even during interrupted communication. Many different agents typically cooperate in a multi-agent system, some performing domain specific (problem-specific) tasks, while others offer application services, Ref. 1903 to the non-MAS world, and still others perform system functions for the agent society as a whole. A typical system agent role, Ref. 1904, is that of a directory facilitator—that allows agents to discover other agents that would be helpful in accomplishing a particular task.

FIG. 20 illustrates agent-based representation, intermediation supporting the collaboration portal. In this illustration a generalized actor Ref. 2001 interacts with the system by communication with a user agent Ref. 2002. Note that in a preferred embodiment, the user agent can also be positioned behind a thin client that handles the direct interaction. In this case, the user agent Ref. 2002 represents the generalized actor's interests to a proprietary system of services, Ref. 2003. The User agent would typically find the addresses of other agents by querying at lease one directory agent, such as Ref. 1007. The actual information conveyed to Ref. 2003 is the generalized actor's Point of view (POV $P_k$) and the Domain of interest $D_m$. An agent Ref. 2005 within the 2003 infrastructure maintains a community of interest relevant to the generalized actor's interest. The COI agent uses the organization of a particular community of interest, the VIG representation, and the concept space to translate the generalized actor's interests into requests for proprietary computer accessible benefit s Ref. 2009. The COI agent may also become aware, through an info provider agent Ref. 2011, of external public computer accessible benefits related to the generalized actor's POV, and may additionally request those computer accessible benefits. Note that much of the value of this decentralized processing is the combination of flexibility and control that it offers. For instance, the generalized actor Ref. 2001 can be bidding on a technology R&D project, and can be maintaining some details as trade secrets, while they expose some details to the organization that owns Ref. 2003, and may only be willing to share broad price and schedule information with a public match-maker that matches R&D organizations to specific requests for quote (RFQ)s. Ref. 2002 will maintain the generalized actor's secret information, while Ref. 2003 will work within the bounds of the generalized actors usage agreement. In contrast, the info provider Ref. 2011 is completely transparent, and will typically "spill" everything it knows. In the other hand, the value of the public computer accessible benefits Ref. 2012 may be very high, and it may be impractical or impossible for a single organization to replicate the functionality that they offer. It is very important that agents systems in business provide and interrogate authentication, maintain appropriate privacy and control of information, and offer strong guarantees to safeguard the interests of generalized actors. This is particularly important when generalized actors are working collaboratively to develop new intellectual property. The agents must authenticate the source of each new idea, time stamp representations of the idea, and log the interactions so that proper credit and ownership can be maintained. Without such safeguards, many commercial technology organizations will be hesitant to use external collaborative systems, regardless of the benefit.

FIG. 21 shows the structure and aggregation of variable information chromosomes (VIChromes). Variable Information Chromosomes (VIChromes)—for specifying and maintaining data provenance and data quality information. Users desire data provenance information because they want to assess qualities of the data, such as the trustworthiness of the initial data sources, the reliability of those sources, and the also so that they can assess the qualities of information resulting from subsequent derivations. Some areas where data provenance is of particular importance include: the creation and elaboration of new intellectual property, such as inventions, in the form of artifacts such as documents, images, design drawings, and related data; the development of artistically created intellectual property such as logos, music, literature, movies, etc.; the storage and processing of intelligence data; generation, fusing and exploitation of military information; the archiving and (re)examination of scientific data, especially that is produced by large numbers of independent researchers; in maintenance of an electronic paper-trail of financial operations, especially those involving public-trust or regulated companies, and, in the rapidly growing universe of commerce whose business is the collection, organization, assessment, and aggregation of information from a variety of free and for-fee sources. An information frame Ref. 2101, as shown in FIG. 21, is a unit of information holding both the payload Ref. 2103 (an information tuple) and chromosome Ref. 2102 (containing the provenance associated with the payload). A section of the information chromosome can include several fields that represent the pedigree of some item in the payload tuple. For example, a field can hold an identifier of an information source, such as researcher Fred Smith, PhD, working for XYZ Corp., or it can hold an identifier of an information modifier, such as Editor M. Based on the fields configured for the information frame, the chromosome maintains intrinsic provenance about the information. A recipient of the information may specify, based on existing results, additional methods of field selection and quality computation, and may cause these methods to be applied at any point in the derivation tree. An information creator may request as many chromosomes as needed to represent various pedigree aspects of the payload. Mechanisms are provided by invention that allow for configuring the most suitable pedigree aspects as chromosomes. The aspects follow the general model of 3-tuple representation similar to that described in the Resource Description Framework (RDF); such a representation promotes the interoperability and extensibility of the system. The 3-tuples describe the chromosome in terms of the fields, the derivation method, and a singular value depicting the derivation result. The VIChrome section of the information frame includes an index Ref. 2103, a provenance section Ref. 2104, qualities of information, Ref. 2105, and process descriptions of the for provenance derivation Ref. 2106. VIChromes support fast approximate computation of approximate provenance, and approximate information qualities, along with a complete provenance and exact computation of information qualities where needed. Note that approximate provenance and approximate information qualities are sufficient for most uses and that in a preferred embodiment, the generalized actor can dynamically reconfigure a VIChrome to improve the quality of the approximation, ant the cost of more required memory and slower provenance derivation. Some example derivation processes include: maximum; minimum; mean; and pessimistic (mean-1 standard deviation). In a preferred embodiment, qualities of information are computed on a [0 . . . 1] interval. For instance, the quality "reliability of information" is 0 if it has no reliability and 1 if it is totally reliable. Multiple data contributors supply components to be evaluates in the derivation of qualities of information. For instance, if one contributor has a reliability of 0.4, and another contributor has a reliability of 0.8, the derived mean reliability is 0.6, the minimum reliability is 0.4, and the pessimist reliability is 0.317. Note that max and min are conservative qualities—they always provide the exact values, and that average can be configured as a conservative value by keeping a separate sum of input values and count of inputs. On the other hand, the pessimistic reliability would require re-examination of all input values every time a new input is added, so there is a strong motivation to approximate this function by considering only the function applied to a representative sampling of the inputs. Ref. 2107 illustrates the derivation of provenance and quality information that is computed in parallel with the development of derived artifacts.

FIG. 22 outlines agent support Ref. 2202 for maintenance of a network of VIChromes. In a preferred embodiment, provenance agents provide a special stack of services in this environment, including provenance look-up services, provenance streams, generation, publishing and merging of VIChromes, and reasoning services that assess information qualities such as reliability and trust. The provenance management system Ref. 2205 provides both approximate provenance Ref. 2203 and complete, streaming provenance Ref. 2204. Note that in a preferred embodiment, the approximate provenance and complete, streaming provenance provide a synergistic benefit: the presence of approximate provenance reduces the demand for full streaming provenance, and the availability of full streaming provenance permits generalized actors to re-configure approximate provenance processes at any time, if they desire more faithful approximations.

FIG. 23 outlines an example of inferred provenance for artifacts. Inferred provenance is useful when actual provenance information is suspect or missing. The document signature system used in a preferred embodiment is a generalization of the TF/IDF approach that incorporates an evaluation of term proximity, giving the signature some of the strengths of N-gram models without requiring the explosive construction of a nth cross-product of terms. For example, several different reports of new cases of avian influenza in Javanese swine may be generated by various news agencies in Indonesia. We may wish to determine if one report is a copy of another, whether it is an independent report of the same incident, or whether it is a report of a different incident. Consider two artifacts—Artifact$_A$ Ref. 2301, a document with known provenance, and Artifact$_B$ Ref. 2301, a document with unclear or missing provenance. The inferred provenance sub-system works as follows: first highly predictive domain terminology Ref. 2303 is used to extract distinctive tuples from each artifact. In a preferred embodiment, distinctive tuples are rarely-occurring sequences of words that are found closely associated in the documents. For instance, finding "swine" within 8 words of "nuraminidase inhibitors" would produce a highly distinctive (and selective) tuple. In a preferred embodiment, a representative set of domain documents are used to compute inverse document frequencies for terms. Terms with high inverse frequencies are selected for distinctive tuples. To simplify aggregation of term weights, the log of inverse frequencies is computed, so that a metric for the joint probability of rare term X and rare term Y would be computed by $\log(1/(X$ doc frequency$))+\log(1/(Y$ doc frequency$))$ or equivalently the negative logs of document frequencies:

$$-\log(\text{docs containing X/All docs})+-\log(\text{docs containing Y/All docs}).$$

In a preferred embodiment, the system also computes the average number of terms appearing in each document, and adds a "bonus" to each tuple which assesses the likelihood of finding the rare terms at a given distance. For instance, if, for document$_A$, the $-\log_2(\text{DF}$ "nuraminidase"$)$ is 8.64 and the $-\log_2(\text{DF}$ "swine"$)$ is 4.73, and the average document size is 400, and the terms "nuraminidase" and "swine" are found 3 words distant, then the bonus for their proximity is $-\log$ 2(3/400)=7.0. Thus the value (with respect to of matching the entire tuple in document$_A$ is 20.43. Note that, in a preferred embodiment, the value of matching the individual terms in the tuple does not vary (if they are matched at all), but the value of the bonus declines for each extra position beyond the original width of 3 where they were found in document$_A$. In a preferred embodiment, the value of the match declines with the square of extra positions, and the system does not seek to find bonus matches after the bonus has declined below zero. In an alternative embodiment, a linearly declining bonus can be used, which will allow more matches, at the cost of additional computation. It should be noted that this signature system is asymmetric for most comparisons: the score of A compared with B is not the same as the score of B compared with A. This asymmetry typically does not cause a problem, and some arguments hold that there is no apriority reason to require a symmetric match score. On the other hand, if a symmetric score is important for a particular use, it is easy to construct such a score by evaluating the match of B with respect to A and the match of A with respect to B, and assigning the average evaluation to both parties to the comparison. For both documents, the system constructs tuples based on the terms found in the documents. Also for both documents, the system performs a translation Ref. 2306 to concepts 2307, and the resulting concepts are used to construct concept tuples with the same with and bonus as the original term tuples. In a preferred embodiment, two comparisons are now made, comparing the term signatures of A with the term signatures of B and comparing the concept signatures of A with the concept signatures of B. If neither the term signatures nor the concept signatures are a good match, then it is likely that artifact document$_A$ and that artifact document$_B$ actually refer to two separate incidents. If, on the other hand, the concepts match closely, but the terms do not match, than it is likely that the two documents represent independent reports of a single incident. Finally, if the terms match closely (in this case, the concepts MUST match closely) it is likely that one report is at least partially a copy of the other. Note that there are many other applicable term weighting schemes that might usefully be substituted to achieve a similar comparison, and that the general proximity bonus and term-signature versus concept-signature matching approaches could easily be adapted to other schemes that do not start with a basis of TF/IDF. Example of other schemes that could be adapted to this approach include Cummins O'Riordan's cf measure, ntf·idf, TF-ICF; MI; ATC; Okapi, and LTU weighting schemes.

Continuing with FIG. 23, there are many situations where it would be advantageous to assess the match without revealing the contents of one the documents. The signature scheme can be adapted to obscure the terms in the matched document, while still rating the strength of the match and performing most of the processing locally. This adaptation produces a hash of an "anchor" term of each tuple of the document$_A$'s signature, and a hash of "extender" terms. The actual strings from document$_A$ are kept in a secure area, and only the hashes, forming an artifact signal Ref. 2311, are communicated to the community. A sliding window traverses document$_B$, noting positions where a hash from document$_A$'s artifact signal matches a term from document$_B$. If there are very few hash matches, then clearly B is not a match of A. On the other hand, the presence of a hash match does not prove that a particular term matches. The hash modulus may be constructed to be very small, causing many false positives, and, if necessary, a sampling of bogus hash matches can be included in the artifact signal to introduce additional obscurity. If a potential match is indicated by the hashed terms, then document$_B$ can be transmitted to a secure domain for full artifact matching Ref. 2312 and confirmation of the strength of the match. Note that this process could still be "gamed" by an adversary who probes document$_A$ by repeatedly submitting slight variations of documents, and using the resulting feedback to deduce the matching terms. There is a systematic way to make such an approach ineffective: the secure artifact matching Ref. 2312 would maintain a history of potentially matching documents. If a pattern of very similar documents emerges, the secure matcher can refuse to confirm additional (too) similar documents. Finally, after the system has inferred (for instance) that document$_B$ (at least a partial) copy of document$_A$, it can provide that information for the inferred provenance component of the VCHrome. Note that in alternate embodiments, particular sections of documents can be used individually, rather than evaluating the entire document. In fact, many derived documents have recognizable sub-sections that match one or another existing artifact. In another alternate embodiment, additional weight is given to particular sections such as the abstract of an article.

FIG. 24 provides an explanation of Dempster Shafer theory and evidential intervals for information qualities. A Basic Probability Assignment (a BPA, denoted "m") maps each possible state of a frame of discernment to a value on the [0 . . . 1] interval. For a set of N possibilities, there are $2^N$ (the powerset of N) possible states, including the null set $\emptyset$. Given a frame of discernment $\delta=\{T,\sim T\}$, and the powerset: $2\delta=\{\emptyset, \{T\}, \{\sim T\}, \{T, \sim T\}\}$, m maps the powerset $2^\delta$ into the range [0, 1]. M is defined such that there is zero belief that no possibility from the powerset holds, and such that the sum of Probability Assignments over all members of the powerset is 1, as illustrates in the equations of Ref. 2401. Belief is a function Bel(X) that is the lower bound of the belief that X is true, while Plausibility Pl(X) is the upper bound of how much it is believed to be true. Probability Pr(X) lies somewhere between belief and plausibility: $0 \leq Bel(X) \leq Pr(X) \leq Pl(X) \leq 1$. Formulae for Belief and Plausibility are given in Ref. 2402. An evidential interval portrays the spectrum of current partial knowledge about the truth-value of some state. In Ref. 2403, evidential intervals for trust are represented, and it is shown that positive feedback (with respect to trust) raises both the level of plausibility and of belief, while negative feedback diminished both values. Note that in every case, the segment between belief and plausibility represents uncertainty.

FIG. 25 illustrates belief calculus applied to information qualities. Unfortunately, there implausible anomalies sometimes occur in using Dempster Shafer combination rule to combine beliefs. Using a "pignistic" transformation (a function that aims to optimize wagering) rather than a "credal" (belief function), addresses these problems. This leads us to (Smets') Transferable Belief Model (TBM). The pignistic transformation BetPm(X) converts the Dempster Shafer belief function m($\zeta$) to a function that has a consistent probabilistic interpretation, as illustrated in Ref. 2501. It is possible to also define the distance between two transformed BPAs as illustrated in Ref. 2502. A desired quality measure for reliability (r) slowly increases with positive feedback, but falls quickly with negative feedback. For an object d in the TBM, for any parent $s_i$ in the pedigree graph for d, we can derive the reliability $r_i'$ of d with respect to si, based on the difference between $m_{est}$: the estimated trust, and $m_{feed}$ feedback, as is illustrated in Ref. 2503.

The process to propagate feedback proceeds as follows:

```
Initialize (hops) h = 0, updatedParents = { }, currentLevel = { },
nextLevel = { }
Update the reliability of s, where s = owner (d)
updatedParents = {d}; currentLevel = {d}
while h < H do
    while currentLevel ≠ { } do
        For each d_i ∈ currentLevel do
            si = owner(d_i)
            nextLevel = nextLevel ∪ parents(di)
            currentLevel = currentLevel – d_i
            if si ∉ updatedParents then
                Update the reliability for si by Π (r_i, p/2^h)
                updatedParents = updatedParents ∪ {d_i}
            end if
        end for
    end while
    h = h + 1
    For each d_i ∈ nextLevel
        currentLevel = currentLevel ∪ {di}
        nextLevel = nextLevel – {di}
end while
```

This process can be applied and maintained recursively to any derivation graph, with suitable tests for cycles, and may also be applied in a depth-limited version that limits the number of generational "hops".

FIG. 26 outlines stages of concept space initialization, using, as an example terms and topics from a pharmaceutical research drug discovery domain. In this embodiment, initial terms in Ref. 2601 are expanded via a thesaurus Ref. 2602 to a larger set of authoritative terms Ref. 2603. Those terms are used to identify Ref. 2604 the authoritative indices, taxonomies, and universal catalogs that should be considered for a particular domain. In the example of FIG. 26, aimed at support of pharmaceutical research, the thesaurus used is the Wordnet thesaurus, which encodes unique word senses as "synsets". The authoritative indices include the USPTO Current US Classification (CCL) which maps a dotted numeric code into a text classification, the International Classification of Diseases, Ninth Revision, (ICD-9) which maps numeric disease identifiers into text descriptions. Universal catalogs include the Open Directory Project (DMOZ) and Wikipedia categories. All of these indices and catalogs are consulted to provide consensus concepts and terminology of a particular domain of interest, which are collected in Ref. 2605. These terms and concepts are used in turn to identify domain authorities, and to probe those both those authorities and domain document repositories to find construct concept groups. In the example, domain authorities consist of the Medical Subject Headings (MeSH) thesaurus, the National Cancer Institute thesaurus, and the Gene Ontology Consortium's Gene Ontology (GO). Document repositories for the pharmaceutical research domain include the National Library of Medicine's PubMed, the Biomed Central open access publisher, and the FDA Center for Drug evaluation and research (CDER). The concepts ands relations drawn from pharmaceutical-related items and artifacts in these thesauri and repositories are used to construct an initial concept space Ref. 2606. It should be apparent that other, similar sources of terminology and concept relationships would be available for any domain of interest. In some cases, where domains are extremely arcane, human curators would be necessary to steer the system to authoritative sources. In other cases, consultation if broad indices and catalogs would be sufficient to identify the larger set of representative source documents.

FIG. 27 portrays concept space bootstrapping and evolution. Prototypical domain documents, Ref. 2701 and extracted domain terms and domain entities Ref. 2702 are used to construct simulated queries Ref. 2703. These queries are launched versus the current COIs, VIGs, and concept spaces, in an attempt to identify highly related resources to the generating documents. The results are compared to expectation based on the initial documents and terms, and the feedback is used to refine the ICM service stack (mentioned earlier as Ref. 1704). At some point, generalized actors (typically expert human curators) Ref. 2706 use an administrative portal Ref. 2706 to manage the bootstrapping of the ICM service stack Release 0.1.3 Ref. 2704. When the routing an retrieval qualities of the system become acceptable for general use, the system moves to release 1.0.1 Ref. 2701. At this point general users Ref. 2707 employ a conventional portal interface Ref. 2709 to access computer accessible benefits via interaction with the current ICM. At the same time, the very interactions that they perform catalyze the improvement and evolution of the ICM stack.

FIG. 28 shows an example of COPO applied to the pharmaceutical research domain. In this case, a generalized actor Ref. 2801 uses an interface Ref. 2803 to interact with the collaboration portal service Ref. 2804 which is running within the proprietary domain of a pharmaceutical research division. In this case, the portal service is implemented by dedicated agents Ref. 2805 that obtain the appropriate computer accessible benefits for Ref. 2801. The agents use an internal, secure proprietary ICM Ref. 2806 to access both proprietary computer accessible benefit sources Ref. 2807 and working through external, public VIGs and concept spaces Ref. 2808 to access public computer accessible benefit sources Ref. 2809. An example of a proprietary computer accessible benefit source in this domain would be a trade-secret Absorption, Distribution, Metabolism, and Excretion, (ADME) model developed by physiology experts within the company who are familiar with a particular class of compounds. This ADME model may, in turn, refer to ADME approaches that are widely known and vetted publicly in academia, and which would typically be accessible through Ref. 2809. Note that is extremely important to the pharmaceutical research division that internal proprietary models perform at least as well as those generally available in the academic community, as they can safely assume that their competitors have access to the same information. At the same time, proprietary models and systems may be more valuable as trade secrets, as patents, or even as unrestricted technologies, depending on competitive economics, the company's goal of monetizing intellectual property, and the prospect if actually encouraging improvement of the models by accelerating innovation in the area. An example of an intrinsically public computer accessible benefit useful to the company and to Ref. 2801 would be the U.S Food and Drug Administration Center for Drug Evaluation and Research (CDER)—which establishes criteria for drug testing, and publishes reports on drug trials. Through this mechanism, pharmaceutical companies can assess whether new competitive compounds are likely to be successful in the market place, and adapt their own assessments of efficacy and toxicity for related compounds. It should be noted that one of the key benefits of the COPO approach is be to catalyze interaction of experts with shared and especially complementary interests. For example, Ref. 2801 may only become aware of in-house expert Ref. 2802 though interaction with the collaboration portal. After the contact is made, based (for instance) on analysis of the in-house ADME model, Ref. 2801 and Ref. 2802 may elect to collaborate on the creation of additional benefits, such as a method of validating adaptations to the ADME model for new large-molecule compounds. At this point, especially in areas involving intellectual property the VIChromes system that maintains provenance information on derived artifacts becomes particularly important. The company must establish the identities of inventors and the time of invention authoritatively, and the particular participants seek both the credit and monetary rewards for their work. Even though this process requires tight control of information and privacy, especially in the early days of idea development, before a patent has been filed, the pharmaceutical company's internal resources are not the ideal authorities to establish dates of invention. Instead, the COPO used in this domain associates external authenticators and time-stamp services with every new artifact developed in the pursuit of the evolving technology. Typical artifacts include email, technical documents, computerized "chat" records, spreadsheets, database extracts, photographs or electronic captures of whiteboards, and audio and video recordings. By augmenting the provenance maintenance service with Ref. 2810, a service for time-stamping and authenticating artifacts, the collaboration portal can establish evidence of invention though every incremental advancement of an idea. Because users of the system are authenticated, the system also provides a clear record of the identity of inventors for each faced of a new invention. Examples of external services that offer time-stamping and authentication are the commercial DigiStamp, Inc. service, and the United States Post Office electronic Postmark service. Note that these services authenticate a hash signature of the original digital object, —so that the intellectual property is not disclosed at the time of authentication. On the other hand, because any change in the original document would produce a different hash signature, it is impossible to "back-date" a particular data object.

FIG. 29 depicts an example of COPO applied to a software engineer's interface to a software repository. In this case, the portal is integrated into a local interface Ref. 2902 used by the generalized actor Ref. 2901. In this example, some of the COPO functionality is offered by a dedicated service for software provisioning—"candicoded.com" Ref. 2903, which provides an interface to a large body of publicly available source code and libraries, but also remotely manages and secures a customer's proprietary software resources, as a service. The generalized actor Ref. 2901 may be looking for a (model-view-controller (MVC) Framework that supports multi-user interaction with a 3-dimensional virtual reality representation and high-speed interactive communication, all of which he intends to use in project-X being hosted by Ref. 2906. Many of the components can be found on a public COI stack Ref. 2904, which provides an interface to publicly available code and libraries Ref. 2905 from repositories such as Sourceforge.org. As the generalized actor is developing his system, in-house design, In-House Design, Software Development, and even consulting with in-house users. Takes place in a controlled environment, where new requirements, ideas, design artifacts, and code are all maintained securely, documented, and time-stamped in case they culminate in valuable company intellectual property. The management of proprietary information for the generalized actor is actually accomplished by Ref. 2903, using secure, encrypted channels Ref. 2908 and Ref. 2909 to maintain confidential information for Ref. 2901. This "outsourcing" of the management of proprietary development has significant unexpected benefits. For instance, Ref. 2903 can establish universal standards and metrics for code design, software development, code quality, code testing, documentation, credentials of contributors, etc. This is valuable both as an add-on to publicly available software and as a source of process discipline for the generalized actor and his organization. Additionally, Ref. 2903 is in a position to see cases where 2901's work is largely duplicative of existing systems (in which case he'd could save himself the effort) and also in a position to see that some component of 2901's system would be valuable for other developers, and might be marketed to those developers (for a fee, through Ref. 2903) to help defray development costs for 2901. The economic motivation for such a system is profound. Currently, software projects typically create large, monolithic systems aimed at solving a single problem. Many useful components may be created along the way, but they are unavailable to other developers. A COPO-based software provisioning system can provide a much more precise match of components to requirements than is now possible, by fully describing each component. Well-written, re-usable core components will justify a large investment in documentation, testing, code review, etc. and will gain wide popularity. Ref. 2903 can both charge for the service it offers, and pay corporate or independent designers, developers, testers, technical writers, etc. to improve the utility of the available software. Providers of software IP for such a venture can stipulate one or more of several licensing schemes, including flat fees, per-system fees, percent of revenue, amortized percent of contribution, etc. The best fee scheme mixtures encourage innovation while guaranteeing that major contributors to highly successful products are compensated. Beyond licensing of software code, soft ware IP—the assignment of patent rights can be sold with software systems, or "stripped" from them and sold separately, much as financial instruments currently separate the interest and principle from a single financial obligation.

FIG. 30 outlines some of the main objects, services and interface items of the software engineer's COPO. Ref. 3001 shows the initial features available through the portal, while Ref. 3002 illustrates typical portal actions, including reviews, opinions, ratings, annotation, and benchmarking. Ref. 2003 provides an interface to the major artifacts created within or manipulated by the system. Artifacts typically have an associated person Ref. 3004 and or organization Ref. 3005. Additionally, organizations offer products (such as software components) and services (such as support and training) Ref. 3006. Special services offered by an organization Ref. 3007 allow it to host a collaboration portal, or provide information and computer accessible benefits for some external portal. Particular entities of concern to portal services are VIGs Ref. 3011, Concepts Ref. 3010, interests Ref. 3009, and Domains Ref. 3008. Note that a single organization can provide multiple collaboration portals, may provide multiple interfaces to the same portal (e.g. with more capabilities at a higher fee) and may provide a component services for portals hosted by other organizations or even individuals.

FIG. 31 illustrates an example of COPO dedicated to requests for proposal in the area of information technology for energy generation. In this case a software vendor Ref. 3101 is seeking opportunities to provide software technologies for managing energy generation systems. Ref. 3101 uses the collaboration portal Ref. 3103 to find relevant requests for proposal (RFPs). Ref. 3101, through its agent intermediaries Ref. 3104 managers an RFP COI 3105 for the power industry. In turn, 3105 uses virtual interest groups Ref. 3106 that route RFPs from several domains Ref. 3107 to match the interests expressed in 3105. Note that the ultimate source of many computer accessible benefits in this domain is likely to be publicly available sources Ref. 3108 where RFPs are published by organizations such as the National Rural Electric Cooperative Association (NRECA) and the North American Electric Reliability Council (NAERC), but it is impossible for individuals to observe every potentially relevant RFP that is issued. Ref. 3101 satisfies the desire of Ref. 3101 to learn of relevant RFPs in the energy industry, and also provides a venue to find potential partners involved in the same pursuit. For instance, IT services contractor Ref. 3102 can supply training and support to satisfy some RFP requirements that 3101 does not offer; a collaboration among the two generalized actors would allow them to pursue business that neither would be qualified for, individually.

FIG. 32 portrays an example of the Terminology Spectrum, with terminological elements ranked by their in-domain salience. In this example, each individual term or concept as a weight associated with its salience with respect to the domain of epidemiology. In repository 3201, several representative elements are ranked by their salience values with respect to the domain. In general, items with very high in-domain salience are likely to be unique to a single document; as is the case with the first tuple: "immunization practices acip makes recommendations"—this tuple occurs in about 28 locations indexed by google.com; and occurs only once in the epidemiology document base. "cytokine storm" with a lower salience, occurs in about 30,000 google documents, while "and a" occur in about 78,000,00 documents indexed by google. It is significant that the salience values used in developing these tuples were computed from a small sample of only a few hundred documents, but correlate well with tuple occurrence in large repositories. Similar results are achieved by searching for these strings on yahoo.com, msn.com, or other search engines. The terminology spectrum is arrayed as follows: the highest salience tuples are considered indicative of identity, and comprise data stratum 3202. Typically, only a few such fragments are needed to uniquely identify a computer accessible artifact within the accessible information space. Significantly, identity tuples can also be used to identify portions of artifacts that have been extracted or combined with other documents—which provides a useful technique for identifying priority among documents. The next stratum consists of sub-topic tuples and associated artifacts in 3203. These are highly focused sets of computer accessible artifacts within a specialized domain, but one can expect the tuples to exist in more than one document in the domain. Next, are topic artifacts, 3204, and associated tuples. These tuples are common to a topic area, and are strong indicators that a computer accessible artifact is related to the particular topic. Next, in 3205 are domain artifacts and associated tuples; these tuples are common to the domain, and in a preferred embodiment, their presence can be used as a strong indicator that a document belongs to the domain. Finally, in 3206, are omni artifacts and related tuples. These tuples are very common across most domains, so they have little power to recognize domains, topics, or subtopics. In a preferred embodiment, these tuples can be discarded to save space and to avoid unnecessary comparison without significant loss of performance. Note that the lines between domains, topics, and sub-topics are necessarily fuzzy, as specialist generalized actors would consider narrowly defined topics as entire domains, while the public might consider very broadly defined domains to be sub-topics. In a preferred embodiment, COPO does not require crisp definitions to these bands, and can learn the practical extent of the strata form domain documents. In an alternative embodiment, users can specify the identity and bounds of strata within the spectrum. Also note that there is no magic in choosing five levels of specificity. Some domains and uses may require sub-sub-topics, sub-sub-sub-topics, etc. to be most useful to practitioners. The example of five levels in this case is exemplary, and does not limit the invention.

In this example of a preferred embodiment, computation of the salience values is accomplished as follows: The initial term weights in the example are used are logbase2(1/(termfrequency-in-document-collection)), known as TF/IDF values, thus, for instance, the term "pandemic" occurs in $2^{-13.5934}=38.97\%$ of the domain documents. Continuing with this example, Multi-term strings are weighted on two different criteria—their approximate salience with regard to combinations, and their approximate salience with regard to permutations. The number of combinations is taken to be the likelihood of nCr—n things combined r at a time—assuming a typical sentence length of n, with r being the number of terms or concepts in the tuple; nCr is computed as $n!/(n-r)!r!$. In a preferred embodiment, typical sentence lengths range from 5 items to 27 items, depending text from domain collections. The approximate salience with regard to permutations is computed as the likelihood nPr,—n things arranged r at a time, which is computed as $n!/(n-r)!$, again taking n to be a typical sentence length and r to be the number of terms in the tuple. Each of the combination salience values and the permutation salience values are now multiplied by the sum of initial weights for the terms or concepts in the tuples. Note that permutation versions of tuples are more valuable in recognizing specific identity elements and terminological idioms, whereas combination forms are more valuable in recognizing juxtaposition of concepts. Thus, the combination salience of tuples is the better measure to use when terms have been translated to concept identifiers. Note that there are many alternative weighting approaches that may be invoked for different reasons. For instance, in a preferred embodiment, rather than using domain TF/IDF, the tuple-building process uses a rank of the ratio of domain-collection salience to omni-collection salience to choose anchors and to extend terms or concepts around those anchors. This process produces tuples that provide a good balance of emphasizing domain re-enforcing domain terminology, idioms, and concept aggregations, while still providing good discrimination among sub-topic within the domain. Note that in alternate embodiments, many other salience weighting schemes can be used within the scope of the invention. For instance, in alternative embodiments, the Okapi BM25 score can be substituted for the TF/IDF score. Additionally, at least a subset of multi-term probabilities can be learned from analysis of domain documents, and the learned model of salience with respect to multiple terms can be used instead of the combination and permutation weights. The weights shown in the example of FIG. 32. are permutation weights values applied to in-domain TF/IDF salience values. There are also many other methods of obtaining or estimating tuple salience that do not depend strictly on the items in the domain database. One alternative method, is to actually launch a search-engine query for each tuple, and to use the inverse frequency of the "hits" as an estimate of salience with respect to an omni-term database. Another alternative method is to launch a search-engine queries for each tuple against a domain document repository, and again to use the inverse frequency of "hits"— this time as an estimate of domain salience. Additionally, at least one generalized actor may be asked to supply ratings of domain salience for particular terms, and ratings from a group of generalized actors may be combined to provide definitive ratings within an area of specialization.

FIG. 33 shows an example of domain differencing—using an salience derived from unbiased artifacts to determine the terminology that is unique to a domain. In this example, domain documents 3301 pertaining to "bird flu" are obtained from a particular source, a CDC web site. In-domain salience is computed for terms, terminology tuples, or concept tuples, using the methods presented above, producing in 3302 as an example, a domain-salience rating of 0.02 for the term "flu". Additionally, a set of unbiased artifacts 3303 are obtained from a database that has no particular are of specialization, in this case, data used for the Hutter Prize competition, which is compiled from wikipedia articles. Using an unbiased document repository, the unbiased salience for "flu" is compute to be 5.6. In 3305, a the invention uses a function of the unbiased salience and the domain salience to determine the terms, terminology tuples, and concept tuples that are particularly representative of the domain. In a preferred embodiment, ratios of the unbiased salience to the domain salience are computed for each term or tuple, and the terms and tuples are ranked by their value on that scale.

FIG. 34 illustrates an example of terminology extraction, and the process of building of tuples for signatures. In 3401, the procedure is initialized; a map is constructed which holds the position of every term in the document, indexed by terms. The salience of each single term in the document is computed or retrieved. In a preferred embodiment, special terms are marked. One type of special term is a barrier—such as an end-of-sentence marker or a paragraph beginning marker. These are significant in that in a preferred embodiment tuples are not allowed to traverse such barriers. For instance, this prevents a sentence ending with "Dudas" from forming a tuple with a sentence beginning with the word "Impeached". In practice, proper names are typically unrecognized in the domain database, and are mapped to the special term "% unrecognized term %". The salience of unrecognized terms is estimated from the frequency of such terms in the construction of the domain terminology database. In some embodiments of the invention, some terms are marked as "% ignored %". This provides a way of filtering some noise words (such as stop words). In such some configurations of such embodiments, the noise words are also treated as barriers. In a preferred embodiment, all recognized terms are permitted to participate in tuple formation, as even noise words may play a role in some idiomatic constructs. Similarly, in alternative embodiments, stemming or lemmatization is used to permit matching of different forms of words. In a preferred embodiment, stemming and lemmatization is only used in cases where terms are being translated into concepts. At the term level, particular word forms, especially within narrow domains and specialties, are often important signals of domain meaning. At the concept level, the root word is more valuable in identifying the relevant concept. In 3402, a tuple search method is selected. Typically these search methods can be set via system configuration or can be set per intended use of the generated partial signatures. Each search method produces useful tuples for some aspects of identification, matching, categorizing, and filtering computer accessible artifacts. Examples of search methods available in a preferred embodiment include: Highest-to-lowest salience—which begins with the terms having the highest salience of the computer accessible artifact—forming all tuples associates with those tuples, and proceeds to construct tuples from the next highest remaining un-tuppled terms, and so on; Lowest-to-highest salience which works conversely to the first method, starting with the lowest terms and moving up to the highest; Meet-in-the-middle salience—which begins by building tuples from terms at both extreme ends of the salience spectrum, and alternates building downward and building upward; and Start in the middle salience—which begins at the midpoint of all salience values for the computer accessible artifact, and alternates building up from that point and building down from that point. In 3403, a preferred embodiment finds any open position $p_i$ of the term with indicated salience, where the indicated salience depends on the next salience to be examined, given the method from 3402. For instance, if the method is Highest-to-lowest salience, and 3404 is visited for the first time, $p_i$ would be the positions of the highest salience term (or terms) of all terms in the computer accessible artifact. In 3404, for each position $p_i$ denote an anchor term $a_j$, and collect surrounding terms. In 3405, surrounding terms are collected by searching bi-directionally from the anchor term outward, adding terms that are appropriate to the tuple. In a preferred embodiment, this is accomplished by searching terms to the left and right of $a_j$, adding a term to the tuple until the stopping criteria is met. In a preferred embodiment, multiple stopping criteria are used—firstly, there is a bound on the maximum size of tuples, typically set to between four and seven items. secondly, there is a maximum extent of search away from the anchor—typically set to a maximum of three to five items; thirdly, there is a maximum margin of factional salience difference between adjacent items in the tuple, typically in the range of 15% to 60%. So, for instance, assuming a highest-to-lowest method of search and with a margin of 15%, a term Y with a salience of 6.9 can be added to an term X with a salience of 8, but a term Z with a salience of 6.7 could not be added to term X, because 6.7<8.0*(1.0−0.15). Note that ideally, the margins and maximum stopping criterion should be chosen so that the margins typically dictate the contents of tuples, while the maximum tuple size, or maximum search widths only occasionally are the effective stopping criteria. This is a subtle but important aspect of ANY tuple formation strategy, as it guides the canonical formation of tuples, and renders the tuples invariant to arbitrary positioning within the document. Many other canonical tuple formation strategies can be developed, given the framework of the instant invention, which are clearly within the scope of the invention, including use of log ratios rather than ratios, use of an aggregate measure of all tuple components constructed so far, or use of criteria based on multiple independent scales of salience. Additional stopping criteria include barrier terms (indicating ends of terminological or conceptual sequences) and adaptive stopping criteria, which become more stringent or more permissive throughout the construction of tuples. Note that in a preferred embodiment, the rank of omni-salience to domain salience ratios is used for tuple construction in a: Highest-to-lowest salience search method. In 3406, the all of the selected terms of the tuple are removed from open positions, and the salience scores of the entire tuple are calculated, and the tuple is stored as a partial signature of the computer accessible artifact. In a preferred embodiment, both combination and permutation scores are calculated for the tuple, based on in-domain TF/IDF salience scores. Note that it is entirely reasonable, as has been discussed, to construct tuples based on one set of salience values, but score them based on another. The tuple formation method is restricted only in that it performs a canonical translation of the computer accessible artifact terms to representative tuples that are used as partial signatures. Note also that it is reasonable to store any number of different varieties of tuples for a set of computer accessible artifacts, as long as comparisons are made with the compatible methods to the ones that were used to score them. For instance, it is possible to construct one set of signatures best suited to topic recognition and a different set if signatures best suited to information provenance inference. In most of the above discussion, terms can be replaced by concept identifiers, to construct concept partial signatures components and full concept signatures of a computer accessible artifact. Additionally, in an alternate embodiment, the position of the partial signatures within the document is also encoded, in discretized form, which is especially useful for representation of concept proximity. For instance, in this alternate embodiment concept tuple A, occurring in the first 25% of the document d1 matches concept tuple A also occurring in the first 25% of the document d2, but does not fully match concept tuple A that only occurs after 67% of document d3. Yet another alternative treats the tuples themselves as a ground level in the recursive formation of meta-tuples, to any level set by configuration. Practically, there is little value in performing this meta-tuple formation at more than a few levels.

FIG. 35 presents an example of tuple comparison using singleton, combination, permutation (SCP) vectors. In a preferred embodiment, starting with 3501, the procedure is initialized by: obtaining A-tuples from source A (e.g. a topic); obtaining B-tuples from source B (e.g. a document); optionally expanding tuples to every implied tuple (by constructing tuples of all proper substrings of the tuples); Permutation and Combination, and Singleton versions of each tuple are constructed, scores, and placed in hash-structures, to be used as vectors, resulting in salience-weighted Vectors $S_A, C_A, P_A$ and $S_B, C_B, P_B$. The vector contents are Hash indices of respective Singletons, Combinations, and Permutations. In 3502, the cosine of each pair of vectors $V_A$ and $V_B$ is computed. In 3503, of the example a preferred embodiment constructs a weighted, normalized score by aggregating $\cos(\theta_S)$, $\cos(\theta_C)$, and $\cos(\theta_P)$. The score is used to estimate the degree of relatedness of A and B (for instance—that B is a document belonging to topic A) and also to rank sets of documents with regard to relatedness to a topic. In a preferred embodiment, cut-off scores for inclusion of a document to a topic are learned via optimizing a margin (or if infeasible, minimizing the intersection) between a set of positive examples, and a set of negative samples. There are many alternative methods of constructing inclusion criteria, given the sets of partial signatures, and the vector cosine values as calculated above, including construction of an optimally weighted combination of $\cos(\theta_S)$, $\cos(\theta_C)$, and $\cos(\theta_P)$, and using the components partial signatures of Vectors $S_A, C_A, P_A$ and $S_B, C_B, P_B$ for ensemble learning and prediction; additional methods include use of logistic regression models, use of Bayesian predictive models, use of kernel learning models, and use of clustering models, including k-means and k-means hierarchical models.

FIG. 36 shows an example of using Information Retrieval (IR) metrics on singleton, combination, permutation (SCP) comparisons, in the Pandemic Influenza (PI) domain. TP represents true positives, FP false positives, TN true negatives, FN false negatives, with precision, recall, and $f_B$ defined as is standard for information retrieval metrics. Note that the inclusion of Permutation (P scores) and Combination (C scores) significantly improves the precision of the of the system.

FIG. 37 illustrates an example of an alternative approach to learning of optimal acceptance thresholds, starting with 3701, initialization, which includes choosing an IR metric (e.g. F.5 score) 1; creating sub-populations of artifacts, including N sample sets and at least one validation set; optionally constructing the sample sets may by re-sampling the non-validation items, or may be re-combined to create synthetic artifacts, if insufficient training data is available. Next, in 3202, the procedure develops component (S, C, P) scores for all individual artifacts versus each target. Then, in 3703, using a general nonlinear optimizer capable of optimizing models composed of discontinuous functions, the system finds the threshold of weighted combination of scores, over all sample sets, that optimizes the IR metric w/r/t each target. Then, in 3704, the system calculate expected IR Metric values, and variation (variation from the multiple sample sets), which should be predictive of IR values for subsequent validation data sets. Lastly, in 3795, the system calculates the actual IR Metric values on the validation set, given the optimal thresholds. These values can be compared to the predicted IR values to determine whether reasonably representative samples and sample sizes are being used, and also to determine whether more elaborate sample set generation strategies are needed.

FIG. 38 shows an example of learning significant fields of arbitrary web sources, and constructing an information extractor via inferring the site interaction. protocol. In 3801, an initial web page is examined protocol indicators, these are typically POST and GET statements, forms, buttons, and java script constructs to dynamically add choices to the page interaction. In the example, an arbitrary internet information source, g11gle.com, is sent an initial query that has the constructed format of: "?hl=en&q=X+Y&btnG=g11gle+Search", where X and Y are term variables. In 3802, a test query is issued, filling BIRD, FLU for X, Y. The response to the query is cataloged, and analyzed for placement of results, as depicted graphically in 3803. Note that in a preferred embodiment, the response is parsed as html fields, or converted to an XML representation and stored as entities and attributes of an XML page. A useful way to implement this procedure, for acquiring the pages, for translation to XML representation and for parsing the resulting XML constructs, is to use the web-harvest system to fetch, parse and store pages. An alternative embodiment, which uses a human-in-the-loop constructs a visible rendering of the different elements of the response, and renders them as shown in 3803 to inform the generalized actor and to provide for human-in-the-loop manipulation. In 3804, the preferred embodiment issues no-op change to the previous query. In this case the addition of an empty string to the previous query causes the respondent to respond to a semantically identical query, note that "++" denotes the empty string: "?hl=en&q=BIRD+FLU++&btnG=g11gle+Search". This causes a semantically identical request to be sent to the site. The response is cataloged as illustrated in 3805. Note that this response is identical to the response of 3803, except that the frame of advertisements, designated as 3809, has changed. Next, in 3806, a semantically meaningful change, still within the same domain of inquiry, is issued as: ?hl=en&q=SARS&btnG=g11gle+Search", this causes the arbitrary web source to produce the response that is depicted in 3807, which is added to the catalog of responses. Note that in 3807, changes have taken place both in the advertising frame (ADV 5 and ADV 6) and also in the information frame that is designated by 3810. From this series of interactions, a preferred embodiment can infer that the semantically unimportant responses are contained in frame 3809, while the semantically important responses are contained in frame 3810. Given this information, a preferred embodiment can automatically construct a web query and parsing mechanism to interrogate the arbitrary information source. Note that this protocol inference technique can now be repeated for every arbitrary information source found in the cataloged responses. In a preferred embodiment, the construction and use of query formatters proceeds dynamically, as information is pursued by the bootstrapping and maintenance phases of COPO. Initial domain terms, or terms extracted from initial domain artifact examples, are used to query well-known starting points, such as search engines, directories, and domain repositories. The responses from these initial queries indicate additional information resources, for which additional query formatters are constructed. At each phase, the set of domain terms or domain concepts is re-examined, and the system develops a consensus set of the terminology and concepts indicative of the domain. Additionally, specific concept mapping systems are deliberately queried to obtain multiple indices relating terms to concepts. These concept mapping sources include: an index that maps terms in a given language to numeric concept IDs; an index that maps terms in a given language to symbolic concept IDs; an index that maps terms in a first language to concept IDs in a second language; an index that maps terms from a first domain to concept IDs in a second domain; wordnet categories; Roget thesaurus categories; DMOZ Open Directory categories; Wikipedia categories; Dewey decimal system categories; the Bliss bibliographic classification system categories; the Library of Congress Classification system categories; the Nippon Decimal Classification system categories; the Chinese Library Classification system categories; the Korean Decimal Classification system categories; the Colon classification system categories; the Cutter Expansive Classification system categories; the Universal Decimal Classification system categories; the Brinkler Classification system categories; EDGAR Standard Taxonomies categories; contextual indexing and faceted taxonomic access system categories; SUMO categories; Yahoo categories; Google categories; the USPTO patent classification system categories; the WIPO patent classification system categories; ACS PubChem categories; NIH Mesh Term categories; International Classification of Disease codes; Concept Map encodings; British American Scientific International Commercial (BASIC) English encodings; Caterpillar Technical English encodings; VOA Special English encodings; Ogden's basic English encodings; and Universal Language Dictionary categories; and combinations thereof. This allows COPO to iteratively expand and refine both the terminology of a domain and the concepts of a domain via an iterative process known as "outsembling"—incrementally constructing an ensemble (known as an "outsemble") from external resources via ensemble techniques such as multiple classification systems; aggregate classification systems; plurality voting systems; range voting systems; boosting; bagging; random forest classification; and logistic regression.

FIG. 39 illustrates an example of building query a formatter for arbitrary web source. In 3901 is the optional step obtaining an HTML entry artifact from arbitrary web source. As an alternative, a generalized actor may supply this initial artifact. In 3902 is s second optional step of cleaning the HTML and convert to approximate XML representation. In this example, the web-harvest system has been used to obtain and convert the artifact, which is depicted as 3902A. Next, in 3903, a search of the XML nodes of 3902A is performed to identify sections, links, text, forms, scripts, and extract protocol indicators. Note that the xpath expression depicted in 3903A extracts the form depicted in 3903B. Next, in 3903C, is a beanshell script that extracts key-binging pairs that function as parameters for queries of the arbitrary web source. Now that the format and parameters of web queries are known, 3904 constructs a protocol wrapper to be used in posting arbitrary queries to the web source, as is depicted in 3904A. Next, the protocol wrapper can be tested with a set of benchmark or exploration queries, and refined, as needed. Additional parameters, such as control over the output volume, layout, and degree of censorship may also be inferred by the procedures of FIG. 38 and FIG. 39. It should also be noted that, in a preferred embodiment, the system provides a repository to store and retrieve cookies associated with each arbitrary web source and query parameterization, so that those parameters can be supplied appropriately for a given query. Lastly, in 3906, the generalized actor may optionally review the query formatter, observe the results of test queries, make manual changes if needed, or invoke additional phases of protocol inference.

FIG. 40 illustrates an example of bootstrapping domain terminology and concepts. In a preferred embodiment, this process begins with 4001, obtaining initial terms from a generalized actor or from sample documents indicated by a generalized actor. Next, in 4002, the system queries general sources, actor-designated sources, or a combination thereof, to obtain additional candidate terminology. Then in 4003, the system performs extraction of terms and concepts from initial artifacts that are over-represented w/r/t unbiased artifacts. Next, in 4004, the system develops an (initial) consensus terminology, using the outsemble techniques mentioned earlier. Then, in 4005, a preferred embodiment uses the current consensus terminology to drive additional iterations of expansion and refinement, continually or until stopping conditions are met. Note that in a preferred embodiment, the stopping conditions are at least one selected from the set of: elapsed time; time duration; sufficient number of sources; sufficient match of sources to quality measures; exhaustion of an allocated number of computational resources; no additional sources available to be added; ratings of additional sources falling below a minimum threshold; aggregate value of one alternative path of the convergent crawl is lower than some threshold; and aggregate value of one alternative path of the convergent crawl is higher than some threshold.

FIG. 41 provides an example of permutation-salience scored tuples from the pandemic influenza (PI) domain. Note that the tuples are scored by their domain salience, and that tuples marked "i" are implied. That is, they are not stored directly in the signature database, rather, they are expanded from parent tuples only when needed for comparisons. Additionally, note that terms marked with an asterisk (*) are unrecognized terms, such as unique numbers. The strings produced by this system can be launched directly to many web information systems that permit wildcard matching.

FIG. 42 shows an example of using the terminology spectrum for scalable routing. In this case, a computer accessible artifact, 4101, which is an online news article, passes a first filter by processor set 4102, and is routed to intermediate node 4103. Node 4103 performs additional comparison and matching, then routes the artifact to 4104, a node specializing in human disease. 4104 now routes the artifact to a terminal node, 4105, which represents all information related to the topic of "human cases of significant infectious diseases", then, given the interest profile of generalized actor 4106, the artifact is routed to that recipient, as it matches his interest profile. Note that the filtering, sensing, and routing criteria for this domain can be unrolled and distributed over a very large number of processors, and, if needed, may be distributed in a redundant way, to allow processors to participate in local resource balancing. There are many alternative embodiments for distribution of filtering, sensing, matching and routing within this framework, including: segmenting the a first set of signatures into a plurality of subsets; identifying at least one first common subset of a set of signatures, wherein the first common subset is common to more than one interest, sub-topic, topic, or domain; arranging for recognition of the first common subset to take place on a particular processor or virtual machine, or on a particular subset of processors or virtual machines; optionally mapping subsets of signatures to prime numbers, and using prime number factorization to determine the location of common subsets of signatures to subsets of processors or virtual machines, optionally mapping subsets of signatures to prime numbers, where lower numbers indicate more commonly shared subsets, and using prime number factorization to determine the location of common subsets of signatures to subsets of processors or virtual machines, and optionally mapping subsets of signatures to prime numbers, where lower numbers indicate more fundamental terms or concepts, and using prime number factorization to determine the location of common subsets of signatures to subsets of processors or virtual machines.

We have shown how the Collaboration Portal makes appropriate computer accessible benefits available to a large number and variety of generalized actors in a wide array of domains. The system offers scalability, security, robustness, and strong guarantees of authentication and proof of primacy for intellectual property. Example variations of the invention have been described, but many alternatives in configuration, component processes, distribution, and interfaces are obviously possible within the scope of the invention, and would be advantageous for many alternative uses of the system.

We claim:

1. In a computer system, having one or more processors or virtual machines, one or more memory units, one or more input devices and one or more output devices; a network and shared memory supporting communication among the processors, a computer implemented method for constructing scaleable topic and interest networks using terminology signatures or concept ID signatures related to a topic, domain or universe of terminology or concept IDs comprising the steps of:
  a) obtaining a first set of terminology signatures or concept ID signatures related to a topic, domain, or universe of terminology or concept IDs;
  b) obtaining a plurality of subsets of the first set of signatures;
  c) distributing the plurality of subsets to a plurality of processors or virtual machines;
  d) using the distributed subsets of signatures to a plurality of processors or virtual machines to recognize terminology or concepts related to the first set of terminology signatures or concept ID signatures;
  e) using the distributed subsets of signatures to a plurality of processors or virtual machines to recognize terminology or concepts not related to the first set of terminology signatures or concept ID signatures;
  f) constructing a network distributed subsets of signatures assigned to a plurality of processors or virtual machines;
  g) arranging the network for communicating a computer accessible artifact or a reference to computer accessible artifact by a first processor or virtual machine to a second processor or virtual machine;
  h) configuring the a first processor or virtual machine to a computer accessible artifact or a reference to computer accessible artifact when there is indicates at least a partial match of the computer accessible artifact to the subset of signatures assigned to first processors or virtual machine;
  i) segmenting a first set of signatures into a plurality of bands of subsets;
  j) wherein each band specialization represents a different level of specialization with respect to the terminology or concepts;
  k) distributing plurality of bands of subsets to different groups of processors or virtual machines;
  l) arranging for the least specialized bands of subsets to be initial nodes in the network; and
  m) arranging for the most specialized bands of subsets to be terminal nodes in the network.

2. The method of claim 1 further comprising the steps of:
  a) segmenting a first set of signatures into a plurality of subsets;

b) identifying at least one first common subset of a set of signatures, wherein the first common subset is common to more than one interest, sub-topic, topic, or domain;

c) arranging for recognition of the first common subset to take place on a particular processor or virtual machine, or on a particular subset of processors or virtual machines;

d) mapping subsets of signatures to prime numbers, and using prime number factorization to determine the location of common subsets of signatures to subsets of processors or virtual machines, e) mapping subsets of signatures to prime numbers, where lower numbers indicate more commonly shared subsets, and using prime number factorization to determine the location of common subsets of signatures to subsets of processors or virtual machines, and mapping subsets of signatures to prime numbers, where lower numbers indicate more fundamental terms or concepts, and using prime number factorization to determine the location of common subsets of signatures to subsets of processors or virtual machines.

3. The method of claim 1 further comprising the steps of:
a) constructing a network distributed subsets of signatures assigned to a plurality of processors or virtual machines;
b) arranging the network for communicating a computer accessible artifact or a reference to computer accessible artifact by a first processor or virtual machine to a second processor or virtual machine; and
c) configuring the a first processor or virtual machine to communicate a computer accessible artifact or a reference to computer accessible artifact when there is at least a partial match of the computer accessible artifact to the subset of signatures assigned to first processors or virtual machine.

4. The method of claim 1 further comprising the steps of:
a) constructing a network distributed subsets of signatures assigned to a plurality of processors or virtual machines;
b) configuring a first processor or virtual machine to communicate a computer accessible artifact or a reference to computer accessible artifact to a second processor or virtual machine when there is at least a partial match of the computer accessible artifact to the subset of signatures assigned to first processors or virtual machine;
c) arranging the network so that some nodes act as filters, rejecting computer accessible artifacts that do not meet some minimum match criteria;
d) arranging the network so that some nodes act as sensors, detecting computer accessible artifacts that should be routed to nodes associates with particular interests, sub-topics, topics, or domains; and
e) arranging the network so that some nodes act as sinks, collecting all computer accessible artifacts or reference to computer accessible artifacts that relate a particular interest, sub-topic, topic, or domain.

5. In a computer system, having one or more processors or virtual machines, one or more memory units, one or more input devices and one or more output devices, a network, and shared memory supporting communication among the processors, and having access to a searchable external network of information resources, a computer implemented method for obtaining terminology signatures or concept ID signatures related to an interest, sub-topic, topic or domain comprising the steps of:
a) obtaining a mapping relationship or mapping procedure for mapping terms to concept IDs;
b) using the mapping relationship or mapping procedure to map terms from computer accessible artifacts to concept IDs;
c) obtaining a first result by querying at least one first information resource of the external network of information resources for terminology or concept IDs related to the first interest, sub-topic, topic or domain;
d) obtaining a second result by querying at least one second information resource of the external network of information resources for terminology or concept IDs related to the first interest, sub-topic, topic or domain;
e) selecting at least one subset of terminology or concept IDs the first result and the second result that is common to first result and the second result;
f) constructing terminology signatures or concept ID signatures from the from the at least one subset of terminology or concept IDs;
g) selecting at least one subset of terminology or concept IDs the first result and the second result that is representative of the first result and the second result via at least one method selected from the group consisting of:
ensemble techniques; multiple classification systems; aggregate classification systems; plurality voting systems; range voting systems; boosting; bagging; random forest classification; logistic regression; and
h) using the representative subset of terminology or concept IDs to construct terminology signatures or concept ID signatures.

6. The method of claim 5 further comprising using at least one external information resource selected from the group consisting of:
a public information retrieval system; search engines; metasearch engines; online directories; online-databases; online libraries; web sites; the worldwide web; the internet; intranets; and online newspapers.

7. The method of claim 5 further comprising the steps of:
a) obtaining a method for building a model associating data with features;
b) obtaining a first set of terminology signatures or concept ID signatures from a computer accessible artifact;
c) obtaining a first set of features of the computer accessible artifact;
d) using the model building method to build a model associating the of terminology signatures or concept ID signatures with the first set of features; and
e) obtaining the first set of features by at least one method selected from the group consisting of:
intrinsic feature extraction from the computer accessible artifact;
tacit feature association via analysis of the information source of the computer accessible artifact;
constructing an aggregated feature extraction method from an ensemble of individual feature extraction methods; and
extracting at least one of source, author, organization, location, or date information from the same source as the computer accessible artifact by examination of metadata or other descriptors associated with the computer accessible artifact.

8. In a computer system, having one or more processors or virtual machines, one or more memory units, one or more input devices and one or more output devices, a network, and shared memory supporting communication among the processors, and having access to a searchable external network of information resources, a computer implemented method for obtaining computer accessible artifacts or information about computer accessible artifacts related to an interest, sub-topic, topic or domain comprising the steps of:

a) obtaining a mapping relationship or mapping procedure for mapping terms to concept IDs;

b) using the mapping relationship or mapping procedure to map terms from computer accessible artifacts to concept IDs;

c) obtaining a first result by using a first variation of query for at least one first information resource of the external network of information resources;

d) obtaining a second result by using a second variation of query for the information resource of the external network of information resources;

e) constructing a description of the difference between the first result and second result;

f) examining the results for structures that indicate the required format of additional queries; and g) using the description of the difference between the result of the a first variation of query and the result of the second variation of query to configure a procedure for extracting information from s third result that is generated by a third query to the first information resource via the indicated structures;

h) configuring a procedure for extracting information generated by a at least one fourth query;

i) obtaining references to at least one additional information resources in the results of at least one fourth query;

j) using steps using steps a) through g) again for to configure a second procedure for extracting information from the at least one additional information resources; and k) repeating the steps h) through j) until a convergent crawling stopping criterion is achieved; wherein the stopping criterion is at least one criterion selected from the group consisting of: elapsed time; time duration; sufficient number of sources; sufficient match of sources to quality measures; exhaustion of an allocated number of computational resources; no additional sources available to be added; ratings of additional sources falling below a minimum threshold; aggregate value of one alternative path of the convergent crawl is lower than some threshold; and aggregate value of one alternative path of the convergent crawl is higher than some threshold.

9. The method of claim 8 further comprising the steps of:

a) using semantically equivalent queries to determine which components of the result vary regardless of the query; and b) using semantically different queries to determine which components of the result vary as a result of the semantic content of the query.

10. The method of claim 8 further comprising constructing the second variation of query by at least one method selected from the set consisting of:

adding a semantically empty item to the first variation; adding an empty string to the first variation; replacing the first variation with a semantically related query; replacing the first variation with a unrelated query; and replacing the first variation with a query drawn randomly from an unbiased set of possible queries.

11. The method of claim 8 further consisting of configuring a procedure for extracting results from additional queries to the first information resource via the indicated structures wherein the structures consist of at least one type selected from the group consisting of:

http get structures; http post structures; http cookie structures; xml structures; rdf structures; Web Ontology Language (OWL) structures; web forms; JavaScript Object Notation (JSON) structures; Xquery structures; Xpath structures; XQL structures; SQL structures; Common Query Language (CQL) structures; Datalog structures; Object Query Language (OQL) structures; SPARQL Protocol and RDF Query Language (SPARQL) structures; OPath structures; Multidimensional Expressions (MDX) structures; and Multidimensional Expressions (MDX) structures.

12. In a computer system, having one or more processors or virtual machines, one or more memory units, one or more input devices and one or more output devices, a network, and shared memory supporting communication among the processors, and having access to a searchable external network of information resources, a computer implemented method for creating and maintaining communities of interest to inform generalized actors and to obtain computer accessible benefits for generalized actors, with respect to a sub-topic, topic or domain comprising the steps of:

a) obtaining a mapping relationship or mapping procedure for mapping terms to concept IDs;

b) using the mapping relationship or mapping procedure to map terms from computer accessible benefits to concept IDs;

c) obtaining a first interest profile containing references to a first set of sub-topics, topics or domains from a first generalized actor;

d) using the first interest profile to infer a first set of interests the interests of the first generalized actor as represented by terms or concept IDs;

e) obtaining a second interest profile containing references to a second set of sub-topics, topics or domains from a second generalized actor;

f) using the second interest profile to infer a second set of interests of the second generalized actor as represented by terms or concept IDs;

g) performing matching or association between the a first set of interests and the second set of interests;

h) using the degree of matching or association between the a first set of interests and the second set of interests to explicitly inform the first generalized actor or the second generalized actor;

i) using the degree of matching or association between the a first set of interests and the second set of interests to implicitly inform the first generalized actor or the second generalized actor;

j) obtaining a rating system for rating the level of expertise of a generalized actor regarding a particular first sub-topic, topic, or domain, based on elements of the first interest profile;

k) using the rating system for obtaining a rating for the first generalized actor regarding the first sub-topic, topic, or domain;

l) using the rating system for obtaining a rating for the second generalized actor regarding the first sub-topic, topic, or domain;

m) using the ratings of the generalized actors to construct a weighted interest profile of an expert generalized actor for the first sub-topic, topic, or domain;

n) using the expert interest profile in obtaining additional computer accessible benefits related to the first sub-topic, topic, or domain; and o) providing the explicit expert interest profile to a third generalized actor in reference to the first sub-topic, topic, or domain.

13. The method of claim 12 further comprising obtaining a first interest profile by requiring at least one specific input from the generalized actor, wherein the input is at least one item selected form the groups consisting of:

text field; text input; numeric field; numeric input; menu selection; button selection; checkbox selection; region selection; textual region selection; graphical region selection; calendar selection; map selection; picture region selection; network graph selection; folder selection; twisty selection; slider selection; mouse selection; touchpad selection; trackball selection; touchscreen selection; pedal selection; speech selection; vocal selection; gesture selection; gaze selection and blink selection.

14. The method of claim 12 further comprising obtaining a first interest profile by using at least one implicit interest indicators wherein the interest indicators is at least one indicator selected form the groups consisting of:

amount of time spent observing a particular result; number of keystrokes typed in response to a particular result; number of subsequent queries sharing at least one common terms or concept IDs with a particular result; number of times a particular result is reviewed; number of messages sent including a reference to a particular result; amount of scrolling activity spent in reviewing a particular result; number of eye saccades spent in reviewing a particular result; number of eye fixations spent in reviewing a particular result; physiological changes occurring during the review of a particular result; and inferable cognitive changes occurring during the review of a particular result; the degree of similarity among successive queries; and the degree of sub-topic, topic, or domain consistency among successive queries.

15. The method of claim 12 further comprising the steps of:
a) obtaining information provenance regarding at least one computer accessible artifact associates with a computer accessible artifact by at least one information provenance derivation method selected from the groups consisting of:
   approximate information provenance derivation; provenance stream queries; information provenance inference; and exact information provenance tracking; and
b) using the information provenance for at least one activity selected from the group consisting of:
   rating the reliability of the computer accessible benefit; rating the timeliness of the computer accessible benefit; rating the independence of the computer accessible benefit; rating the honesty of the computer accessible benefit; rating the trustworthiness of the computer accessible benefit; and rating the ability of the computer accessible benefit.

16. The method of claim 12 further using a method to compute or maintain a rating for the degree of belief with respect to a first proposition regarding a particular sub-topic, topic, or domain; wherein the proposition is encoded as a tuple of terms or a concept ID from the particular sub-topic, topic, or domain; and the method is used to combine different ratings of the proposition by at least one method selected from the set consisting of:

a recursive pignistic transformation belief calculus; Dempster-Shafer belief calculus; a Transferable Belief Model (TBM); a cautious belief model; a Bayesian belief system; a certainty factor belief system; a reasoning with uncertainty module (RUM); a fuzzy logic system; an evidential interval reasoning system; a triangular norm model; situation calculus; and an iterated belief revision system.

17. The method of claim 12 further comprising the steps of:
a) obtaining at least one public computer accessible benefit from a computer accessible benefit source consisting of a public service, repository or internet domain wherein the computer accessible benefit source is at least one selected from the group consisting of:
   a public information retrieval system; search engines; metasearch engines; online directories; online-databases; online data warehouses; online libraries; web sites; the worldwide web; the internet; online newspapers; blogs; wikis; content management systems; and public file systems;
b) obtaining at least one non-public computer accessible benefit from a computer accessible benefit source consisting of a public service, repository or internet domain wherein the computer accessible benefit source is at least one selected from the group consisting of:
   an intranet; an internal information retrieval system; an internal data warehouse; an internal search engines; an internal metasearch engine; an internal online directories; an internal online-database; an internal online libraries; an internal web site; an internal blog; an internal wiki; an internal content management system; or an internal file system; collaborative design systems; manufacturing design systems;
c) providing an encrypted communication channel to maintain confidentiality of proprietary information;
d) providing the capability of generalized actors to mark some computer accessible benefits as proprietary and to provide limited access policies or access lists with respect to those computer accessible benefits;
e) providing time-stamping, authentication, and non-repudiation services generalized actors with respect to designated computer accessible benefits.
f) directly acting as a trusted third party to facilitate property-safe and credit-safe interaction among a plurality of generalized actors;
g) providing access to additional trusted third party systems that offer independent facilitation of property-safe and credit-safe interaction among a plurality of generalized actors; and
h) any combination of steps a) through g).

18. The method of claim 12 further comprising performing novelty analysis by finding by sets of terms or concept IDs that have the least occurrence within the interest profiles of generalized actors.

19. The method of claim 12 further comprising the steps of using a plurality of interest profiles obtained from a the first generalized actor and the second generalized actor to construct an online service providing computer accessible benefits to the second generalized actor or a third generalized actor with respect to a sub-topic, topic or domain, wherein the online service provides at least one computer accessible benefit selected from the set consisting of:

information; publications; new items; scientific papers; scientific findings; health information; government publications; available government services; intellectual property information; patent publications; trademark publications; financial reports; market information; items offered for sale; items requested for purchase; items offered for auction; bids offered for items; employment offers; employment requests; contract offers; contract requests; available software; desired software; collaborative work opportunities; collaborative investment opportunities; requests for proposal (RFP); requests for information (RFI); product ratings; company ratings; consumer ratings; insurance policies; insurance requests; grant offerings; grant allocations;

grant requests; capital offerings; capital requests; debt offerings; debt requests; equity offerings; equity requests; option offerings; option requests; futures offerings; futures requests; commodity offerings; and commodity requests.

20. The method of claim 12 further comprising the steps of:
a) using the first interest profile to inform the second generalized actor about the a first set of sub-topics, topics or domains;
b) using the first interest profile to inform the second generalized actor about computer accessible benefits related to the a first set of sub-topics, topics or domains;
c) obtaining meta information supplied by the first generalized actor or inferred from the first generalized actor related to the first interest profile;
d) using the meta information to inform the second generalized actor about the a first set of sub-topics, topics or domains; wherein the meta information includes at least one selected from the group consisting of:
the identity of the first generalized actor; the level of training or education of the first generalized actor; the degrees earned by the of the first generalized actor; the certifications owned by the of the first generalized actor; the recency of the interest profile of the first generalized actor; and the willingness of the first generalized actor to collaborate in joint knowledge discovery;
e) using a combination of the references to a first set of sub-topics, topics or domains from the first interest profile and references to a second set of sub-topics, topics or domains from the second interest profile to determine a likely match of interests between the first generalized actor and the second generalized actor, wherein a likely match can be constructed based on at least one criterion selected from the set consisting of:
commonality of interest; shared expertise; shared goals; complementation of expertise; or complementation of interest; and
f) using the likely match to inform the second generalized actor of the degree of match and matching criterion relating the first generalized actor to the second generalized actor.

21. The method of claim 20 further comprising using the first interest profile; along with explicit or inferred provenance information related to computer accessible benefits created by the first generalized actor for attributing intellectual property ownership to the first generalized actor.

22. The method of claim 20 further comprising using the likely match to inform the second generalized actor of computer accessible benefits associates with the first generalized actor, or the likely match to inform the second generalized actor about computer accessible benefits associated with the interest profile of the first generalized actor.

* * * * *